(12) United States Patent
Werner et al.

(10) Patent No.: US 9,752,800 B2
(45) Date of Patent: Sep. 5, 2017

(54) NODE, SUPPORT FRAME, SYSTEM AND METHOD

(71) Applicants: Craig Roy Werner, Lake Forest, IL (US); John Funai, Lake in the Hills, IL (US)

(72) Inventors: Craig Roy Werner, Lake Forest, IL (US); John Funai, Lake in the Hills, IL (US)

(73) Assignee: Werner Extrusion Solutions LLC, Lake Forest, IL (US)

( * ) Notice: Subject to any disclaimer, the term of this patent is extended or adjusted under 35 U.S.C. 154(b) by 0 days.

(21) Appl. No.: 14/514,110

(22) Filed: Oct. 14, 2014

(65) Prior Publication Data

US 2015/0027970 A1 Jan. 29, 2015

Related U.S. Application Data

(60) Division of application No. 12/927,812, filed on Nov. 24, 2010, now Pat. No. 8,863,448, which is a
(Continued)

(51) Int. Cl.
*E04B 7/08* (2006.01)
*F24J 2/54* (2006.01)
(Continued)

(52) U.S. Cl.
CPC . *F24J 2/54* (2013.01); *F24J 2/14* (2013.01); *F24J 2/5201* (2013.01); *F24J 2/5233* (2013.01); *F24J 2/5239* (2013.01); *F24J 2/5243* (2013.01); *F24J 2/541* (2013.01); *H02S 20/00* (2013.01); *F24J 2002/1085* (2013.01); *F24J 2002/5281* (2013.01); *F24J 2002/5462* (2013.01);
(Continued)

(58) Field of Classification Search
CPC .. F24J 2/54; F24J 2/5201; F24J 2/5239; F24J 2/5243; F24J 2/541; F24J 2/14; F24J 2/5233; F24J 2002/5475; F24J 2002/5462; F24J 2002/1085; F24J 2002/5281; H01L 31/0422; H02S 20/00; Y10T 403/44; Y10T 29/53; Y10T 29/49826; Y10T 403/70; Y02E 10/47; Y02E 10/45
USPC ............................ 52/81.3, 633, 648.1, 653.1
See application file for complete search history.

(56) References Cited

U.S. PATENT DOCUMENTS 3,563,580 A * 2/1971 Black ........................... 403/172
3,564,783 A * 2/1971 Dunne ............................ 52/38
(Continued)

*Primary Examiner* — Basil Katcheves
*Assistant Examiner* — Joshua Ihezie
(74) *Attorney, Agent, or Firm* — Ansel M. Schwartz

(57) ABSTRACT

A node for connecting together at least a first support element, a second support element and a third support element of a support frame such as a solar frame which supports solar reflectors. A method for connecting together at least a first support element, a second support element and a third support element of a solar frame which supports solar reflectors. A system for supporting solar reflectors includes a first support frame upon which the solar reflectors are disposed. A method for forming a support frame for solar reflectors. A system for constructing a support frame from parts, including chords, for solar reflectors. A method for constructing a support frame for solar reflectors. A support frame for solar reflectors.

15 Claims, 70 Drawing Sheets

Related U.S. Application Data continuation-in-part of application No. 12/583,787, filed on Aug. 26, 2009, now Pat. No. 8,887,470.

(60) Provisional application No. 61/283,386, filed on Dec. 3, 2009, provisional application No. 61/190,573, filed on Aug. 29, 2008.

(51) Int. Cl.
   *F24J 2/14*    (2006.01)
   *F24J 2/52*    (2006.01)
   *H02S 20/00*   (2014.01)
   *F24J 2/10*    (2006.01)

(52) U.S. Cl.
   CPC ........ *F24J 2002/5475* (2013.01); *Y02E 10/45* (2013.01); *Y02E 10/47* (2013.01); *Y10T 29/49826* (2015.01); *Y10T 29/53* (2015.01); *Y10T 403/44* (2015.01); *Y10T 403/70* (2015.01)

(56) References Cited

U.S. PATENT DOCUMENTS

| | | | |
|---|---|---|---|
| 3,973,370 A | 8/1976 | McAllister | |
| 3,999,351 A | 12/1976 | Rensch | |
| 4,069,832 A | 1/1978 | Bingham | |
| 4,122,646 A | 10/1978 | Sapp | |
| 4,211,044 A * | 7/1980 | Gugliotta et al. | 52/200 |
| 4,247,218 A | 1/1981 | Jeannin | |
| 4,312,326 A * | 1/1982 | Johnson, Jr. | 126/606 |
| 4,449,843 A | 5/1984 | Wendel | |
| 4,460,288 A * | 7/1984 | Schaff | 403/27 |
| 4,483,118 A | 11/1984 | Betschart | |
| 4,569,165 A | 2/1986 | Baker et al. | |
| 4,577,449 A | 3/1986 | Celli | |
| 4,633,566 A | 1/1987 | Coppa | |
| 4,765,114 A * | 8/1988 | Wesselski | 52/646 |
| 4,835,932 A | 6/1989 | Leete et al. | |
| 4,838,003 A | 6/1989 | Zeigler | |
| 4,904,108 A | 2/1990 | Wendel | |
| 5,059,056 A | 10/1991 | Banthia et al. | |
| 5,224,320 A | 7/1993 | Mai | |
| 5,289,665 A * | 3/1994 | Higgins | 52/655.1 |
| 5,435,110 A | 7/1995 | Stol et al. | |
| 6,205,739 B1 * | 3/2001 | Newlin | 52/655.1 |
| D476,880 S | 7/2003 | Segall | |
| 6,675,546 B2 * | 1/2004 | Coles | 52/655.1 |
| 6,892,502 B1 | 5/2005 | Hubbell et al. | |
| 7,007,431 B2 | 3/2006 | Schubert | |
| 7,310,920 B2 | 12/2007 | Hovey, Jr. | |
| 7,530,201 B2 | 5/2009 | Reynolds et al. | |
| 7,578,109 B2 | 8/2009 | Reynolds et al. | |
| 7,587,862 B2 | 9/2009 | Reynolds et al. | |
| 7,802,404 B2 | 9/2010 | Wolfram | |
| 7,823,347 B1 | 11/2010 | Blinn | |
| 7,823,583 B2 | 11/2010 | Allen et al. | |
| 8,071,930 B2 | 12/2011 | Wylie et al. | |
| 2001/0036024 A1 | 11/2001 | Wood | |
| 2004/0226249 A1 | 11/2004 | Wang | |
| 2005/0072103 A1 | 4/2005 | Hopwood | |
| 2005/0144884 A1 | 7/2005 | Moriya | |
| 2006/0053726 A1 | 3/2006 | Reynolds et al. | |
| 2007/0011983 A1 * | 1/2007 | Reynolds et al. | 52/633 |
| 2007/0261355 A1 | 11/2007 | Carlisle et al. | |
| 2008/0072516 A1 | 3/2008 | Reynolds et al. | |
| 2008/0204352 A1 | 8/2008 | Reynolds et al. | |
| 2009/0113816 A1 | 5/2009 | Kling | |
| 2010/0005752 A1 | 1/2010 | Hawkins et al. | |
| 2012/0217209 A1 | 8/2012 | Marcotte et al. | |

\* cited by examiner

AREA CUT AWAY FOR CHORD
S.E.P. ATTACHMENT

| APPROX AXIAL LOAD (LBS) | TYPE | NODE DESIGN GRAPHIC | NODE WEIGHT (LBS/FT) | NODE CIRCLE SIZE (IN) | APPROX PRESS SIZE (IN) REQ'D | MAX. DEFL. (IN) |
|---|---|---|---|---|---|---|
| 1,000 | TC-LL | | 5.2 | 6.6 | 8 | |
| 10,000 | TC-ML |  | 9.8 | 9.1 | 11 | 0.0097 |
| 20,000 | TC-HL | | 20.3 | 11.9 | 15 | |
| 1,000 | SC-LL | | 2.6 | 4.1 | 7 | |
| 10,000 | SC-ML |  | 7.3 | 6.3 | 9 | 0.0027 |
| 20,000 | SC-HL | | 14.3 | 8.5 | 11 | |

LL, ML & HL = LOW, MEDIUM AND HIGH LOADS
TC = THROUGH CHORD, SC = SEGMENTED CHORD

TABLE 1: THROUGH VS SEGMENTED CHORD NODE

NODE, SUPPORT FRAME, SYSTEM AND METHOD

CROSS-REFERENCE TO RELATED APPLICATIONS

This is a divisional application of U.S. patent application Ser. No. 12/927,812 filed Nov. 24, 2010, now U.S. Pat. No. 8,863,448, which is a non-provisional application of U.S. provisional application Ser. No. 61/283,386 filed Dec. 3, 2009, and is a continuation-in-part of U.S. patent application Ser. No. 12/583,787 filed Aug. 26, 2009, which is a non-provisional of U.S. provisional application Ser. No. 61/190,573 filed Aug. 29, 2008, all of which are incorporated by reference herein.

FIELD OF THE INVENTION

The present invention is related to support frames, nodes, rolling rib drive and assembly methods for frames. (As used herein, references to the "present invention" or "invention" relate to exemplary embodiments and not necessarily to every embodiment encompassed by the appended claims.) More specifically the present invention is related to support frames for solar reflectors formed of struts and segmented chords. Alternatively, the present invention is related to support frames for solar reflectors utilizing a rolling rib. Alternatively, the present invention is related to construction techniques for building the support frame.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

WES's first three patent applications (Ser. Nos. 12/583,787, 12/587,043 and 12/798,757, respectively, all of which are incorporated by reference herein) may help the reader to understand terminology used herein.

Ser. No. 12/583,787 Overview:

Solar frame design with specific emphasis on the use of the strut end piece technology Ser. No. 12/587,043 Overview:

Rolling Rib and mirror cleaning design details

Ser. No. 12/798,757 Overview:

Specific design details regarding strut end piece concepts including the guided insertion system, sleeve single fin, sleeve hollow fin and various enhanced strut extrusion designs (apple design, box design).

Problems that the Present Inventions Solve:

Through Chord Designs:

Existing designs rely on very long length single piece chords which must be handled, transported and assembled. Existing designs rely on nodes which require very large extrusion presses for production (large circle size and weight/ft); very few large presses are available, while many smaller presses have capacity for designs which could be placed on them.

Existing Node Designs:

Existing designs rely on nodes which due to their nature induce deflections into the final system when under load; reduced deflections can lead to more efficient structures and optical performance of the solar frame.

Rolling Rib Drive:

Existing CSP solar frames are driven by common drives turning multiple frames. The frames closer to the drives drive the frames further from the drives. The frames closest to the drive thus must withstand higher torques than other frames, requiring the frame members to be sized accordingly and creating more deflection (less optical performance) than the frames further from the drive.

Assembly Methods:

Reducing CSP solar frame installed cost will increase the use of solar power. These costs can be reduced by reducing member sizes, cost of members or through improved fabrication, transportation and final assembly costs. Existing system final assemblies are done using a great deal of manual effort to gather parts, orient the frame, etc. . . . . . Creating more of an engineered assembly methodology will reduce final installed frame cost.

Segmented Chord: allows the use of multiple, shorter chords with simplified, more flexible assembly/fastening.

Solid Node: improves the ability to source the extrusion from a greater number of possible producers through reduction in weight and circle size & improves the deflection results under load.

Rolling Rib Drive: reduces frame weight and improves optical performance.

Assembly methods: improve assembly efficiency, reducing installed cost of solar field.

BRIEF SUMMARY OF THE INVENTION

The present invention pertains to a node for connecting together at least a first support element, a second support element and a third support element of a solar frame which supports solar reflectors. The node comprises an elongate portion having a first end configured to removably attach to the first support element, a second end configured to removably attach to the second support element and a middle portion disposed between the first end and second end having a fin extending outward from the middle portion configured to removably attach to the third support element.

The present invention pertains to a method for connecting together at least a first support element, a second support element and a third support element of a solar frame which supports solar reflectors. The method comprises the steps of removably attaching the first support element to a first end of an elongate portion. There is the step of removably attaching the second support element to a second end of the elongate portion. There is the step of removably attaching the third support element to a fin extending outward from the middle portion disposed between the first end and second end.

The present invention pertains to a node for connecting together at least a first support element, a second support element and a third support element of a support frame. The node comprises an elongate portion having a first end configured to removably attach to the first support element, a second end configured to removably attach to the second support element and a middle portion disposed between the first end and second end having a fin extending outward from the middle portion configured to removably attach to the third support element.

The present invention pertains to a method for connecting together at least a first support element, a second support element and a third support element of a support frame. The method comprises the steps of removably attaching the first support element to a first end of an elongate portion. There is the step of removably attaching the second support element to a second end of the elongate portion. There is the step of removably attaching the third support element to a fin extending outward from the middle portion disposed between the first end and second end.

The present invention pertains to a system for supporting solar reflectors. The system comprises a first support frame upon which the solar reflectors are disposed. The system comprises a rolling rib to which the frame is attached. The system comprises a drive mechanism engaged with the rib to move the rib to move the frame. The system comprises a first pylon attached to a first side of the frame. The system comprises a second pylon attached to a second side of the frame. The system comprises a second support frame having a first side attached to the second pylon with the second pylon disposed between the first and second frames.

The present invention pertains to a method for forming a support frame for solar reflectors. The method comprises the steps of building cross-sectional slices of the frame at a first location. There is the possible step of transporting the slices to a second location remote from the first location. There is the step of hanging the slices from a strongback on a support structure. There is the step of connecting struts and segmented chords between the slices to form a completed frame. There is the step of lifting the strongback with the completed frame of the support structure. There is the step of placing the completed frame at a third location.

The present invention pertains to a system for constructing a support frame from parts, including chords, for solar reflectors. The system comprises an assembly platform upon which assemblers stand to attach parts to build the frame. The system comprises a moving mechanism to which the chords of a partially assembled frame are attached, the moving mechanism moving the chords relative to the platform to reposition the partially assembled frame to allow the assemblers on the platform to attach parts to the partially assembled frame.

The present invention pertains to a method for constructing a support frame for solar reflectors. The method comprises the steps of attaching parts to a partially assembled support frame by assemblers standing on an assembly platform or on the ground. There is the step of moving the partially assembled frame with a moving mechanism by moving chords of the partially assembled frame relative to the platform to reposition the partially assembled support frame. There is the step of attaching additional parts to the partially assembled support frame by the assemblers standing on the assembly platform and possibly on the ground after the partially assembled support frame has been repositioned.

The present invention pertains to a node for connecting together at least a first support element and a second support element of a solar frame which supports solar reflectors. The node comprises an elongate portion having a first end configured to removably attach to the first support element, a second end and a middle portion disposed between the first end and second end having a fin extending outward from the middle portion configured to removably attach to the second support element.

The present invention pertains to a support frame for solar reflectors. The frame comprises struts. The frame comprises a first segmented chord. The frame comprises a second segmented chord separate and distinct from the first segmented chord. The frame comprises a plurality of nodes. At least one of the nodes removably attaches at least one of the struts and the first segmented chord and the second segmented chord together.

The present invention pertains to a support frame for solar reflectors. The frame comprises struts. The frame comprises a first segmented chord. The frame comprises a second segmented chord separate and distinct from the first segmented chord. The frame comprises a plurality of attaching means, at least one of the attaching means removably attaches at least one of the struts and the first segmented chord and the second segmented chord together. The attaching means may be a node.

The alternative strut, strut end piece and node designs of the present invention allows the designer more design flexibility, both in terms of final product geometry/construction and in fabrication means for producing the various parts.

BRIEF DESCRIPTION OF THE SEVERAL VIEWS OF THE DRAWINGS

In the accompanying drawings, the preferred embodiment of the invention and preferred methods of practicing the invention are illustrated in which.

DETAILED DESCRIPTION OF THE INVENTION

Figure 1:
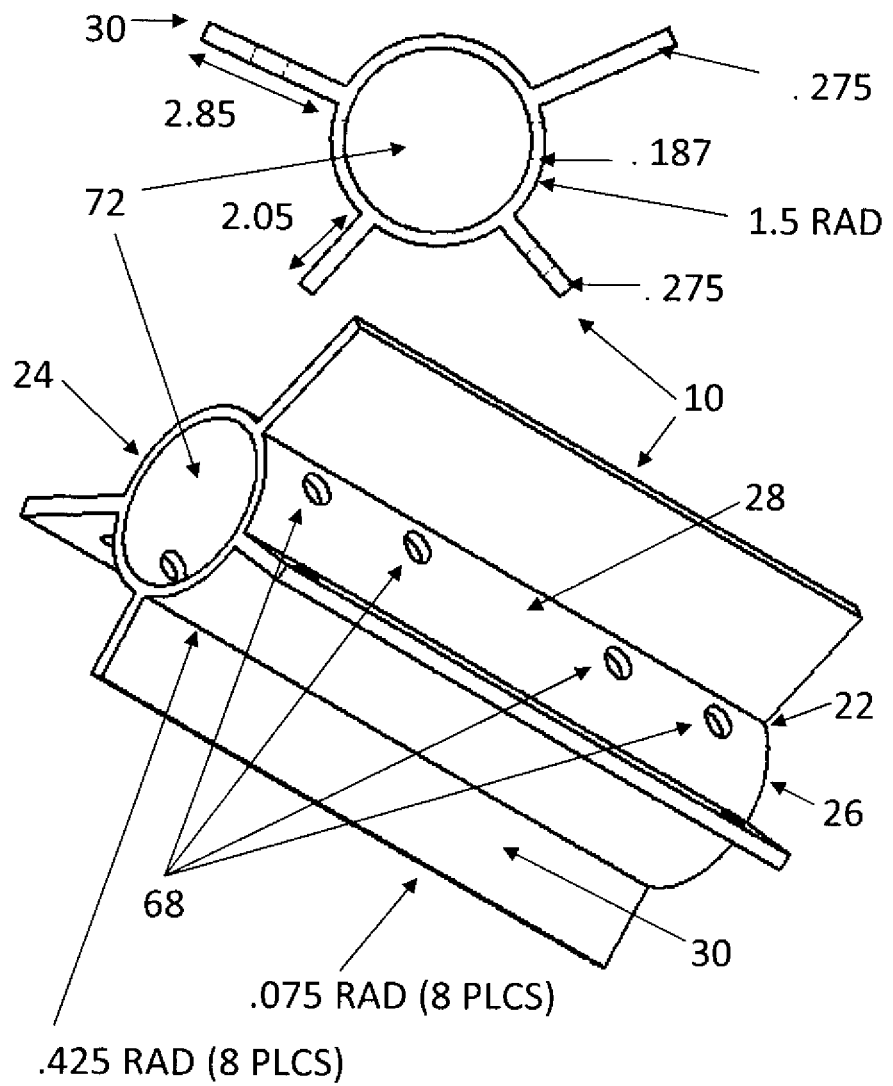
FIG. 1 shows a hollow node 10 "A"—ISO and End views.

Referring now to the drawings wherein like reference numerals refer to similar or identical parts throughout the several views, and more specifically to FIGS. 1, 22, 23 and 69 thereof, there is shown a support frame for solar reflectors 20. The frame comprises struts 52. The frame comprises a first segmented chord 62. The frame comprises a second segmented chord 64 separate and distinct from the first segmented chord 62. The frame comprises a plurality of nodes 10. At least one of the nodes 10 removably attaches at least one of the struts 52 and the first segmented chord 62 and the second segmented chord 64 together.

Throughout this document "removably attached" refers to the attachment of the strut end pieces (SEPs) 78 or chord end pieces (also 78, 82 and 84), which are separate and distinct from the actual long struts 52. The SEPs or chord end pieces 78, 82 and 84 are fastened to the struts via fasteners 80 (pins, bolts, rivets or other means) or in other ways (adhesively bonded for example); see FIG. 23.

Figure 15:
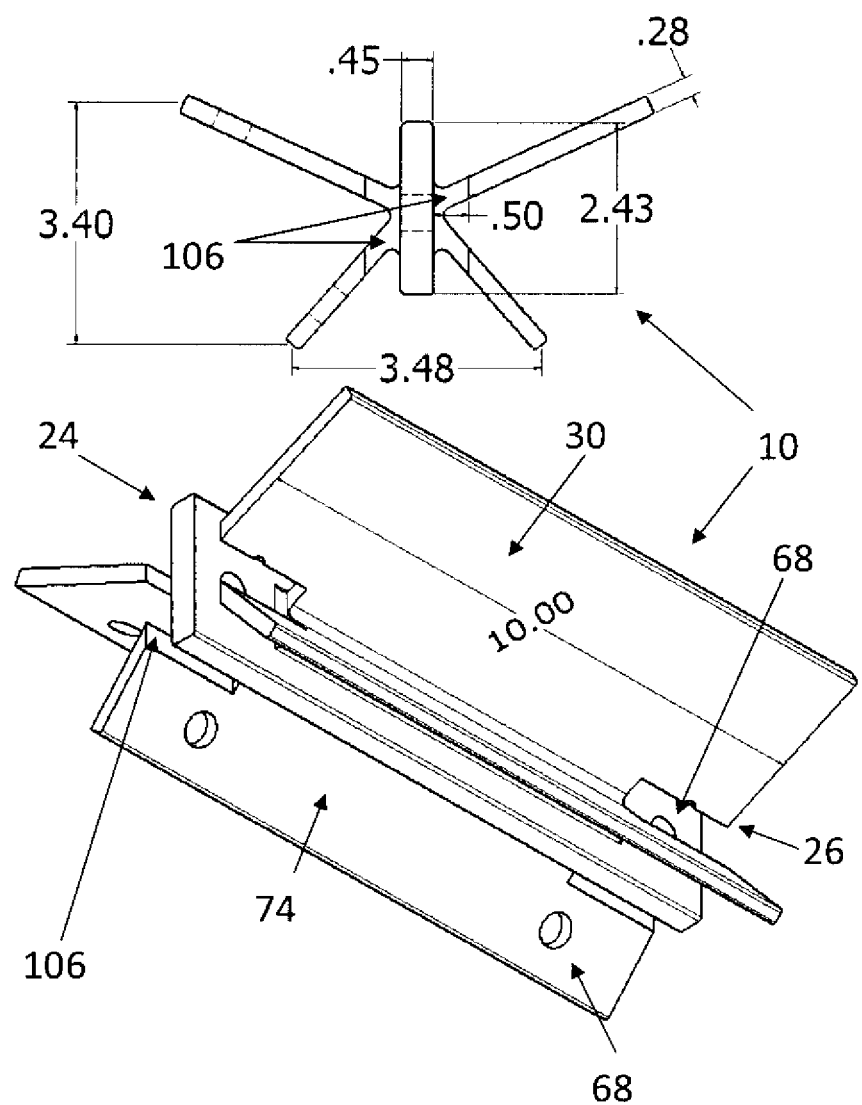
FIG. 15 shows a solid node 10 "A"—ISO and End views.

The one node 10 may have an elongate portion 22 having a first end 24 configured to removably attach to the first segmented chord 62, a second end 26 configured to removably attach to the second segmented chord 64 and a middle portion 28 disposed between the first end 24 and second end 26 having a fin 30 extending outward from the middle portion 28 configured to removably attach to the strut 52. The one strut 52 may have a strut end piece 78 and a primary strut 52 portion separate and distinct from the strut end piece 78. The strut end piece 78 is removably attached to the primary strut portion and the fin 30 with fasteners 80. The elongate portion 22 may be a sleeve 70, at least a portion of which is hollow, and which has a sleeve opening 72 extending along the sleeve's central axis. The first segmented chord 62 and the second segmented chord 64 is disposed in the sleeve opening 72. The sleeve's outer surface may be curved. Alternatively, the elongate portion 22 may be solid, as shown in FIG. 15.

The first segmented chord 62 may be a first segmented chord end piece 82 and a first primary segmented chord portion 86 separate and distinct from the first segmented chord end piece 82. The first segmented chord end piece 82 is removably attached to the first primary segmented chord portion 86 and the first end of the elongate portion 22 with fasteners 80. The second segmented chord 64 has a second segmented chord end piece 84 and a second primary segmented chord portion 88 separate and distinct from the second segmented chord end piece 84. The second segmented chord end piece 84 is removably attached to the second primary segmented chord portion 88 and the second end 26 of the elongate portion 22 with fasteners 80.

Figure 2:
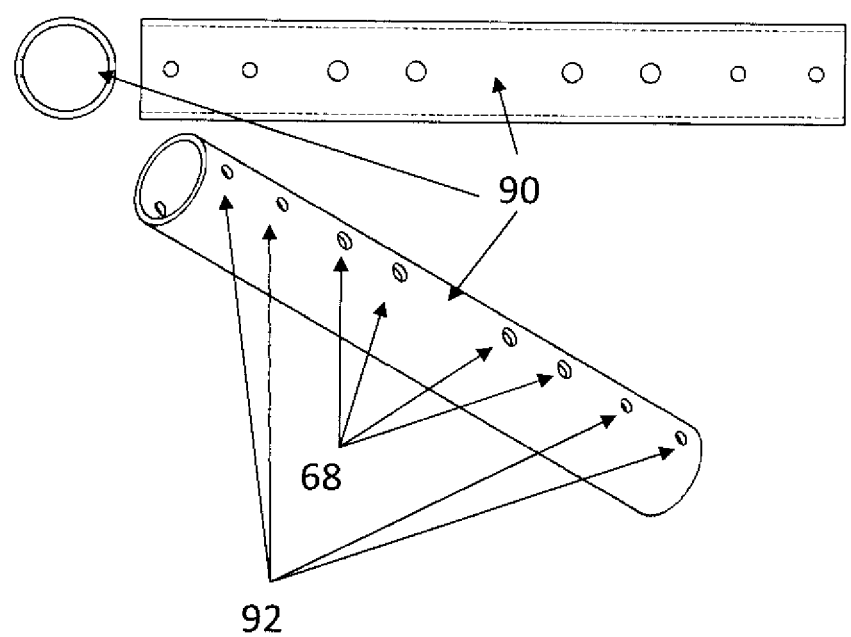
FIG. 2 shows a segmented chord coupler 90—End, Side and ISO views.
Figure 3:
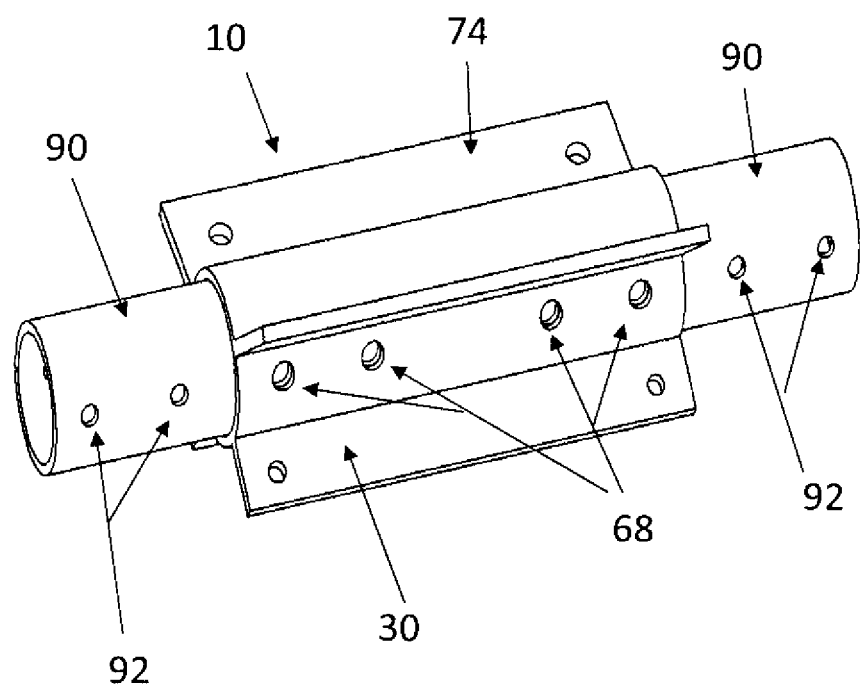
FIG. 3 shows a single segmented chord coupler 90 and node 10 assembly (single thru coupler)—ISO view.

The frame may include a coupler 90, as shown in FIGS. 2 and 3, disposed in the one node 10 that extends out from the one node 10. The first segmented chord 62 is removably attached to the first side 46 of the coupler 90 and second segmented chord 64 removably attached to the second side of the coupler 90 with fasteners 80. The first side 46 and the second side of the coupler 90 may be separate and distinct from each other.

Figure 4:
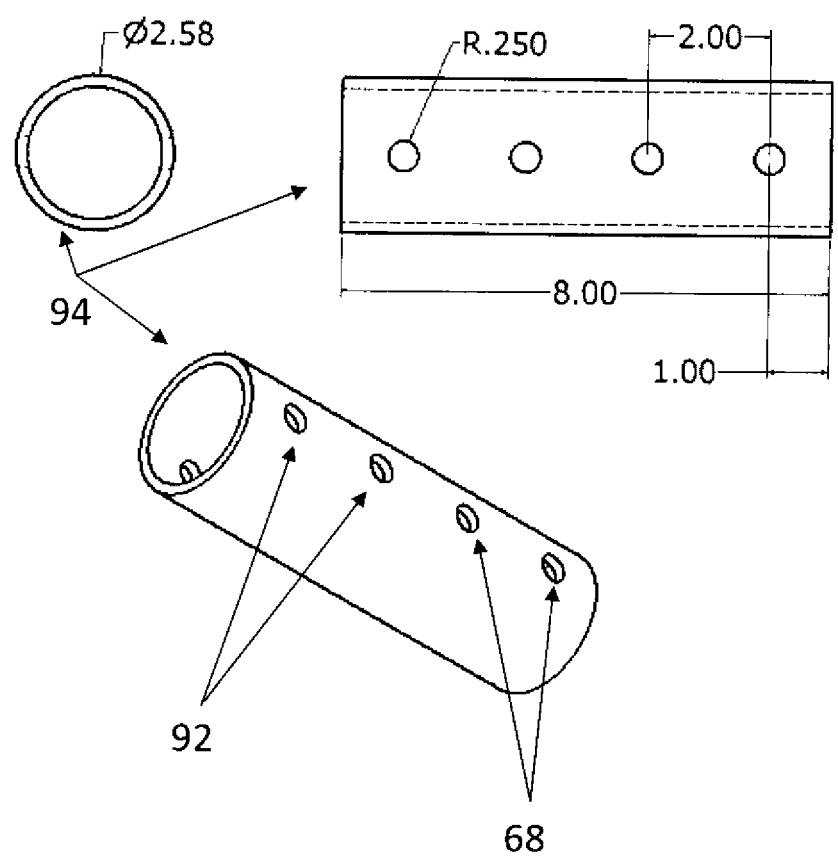
FIG. 4 shows a Split (2 pc) coupler 94—ISO, End and Side views.
Figure 5:
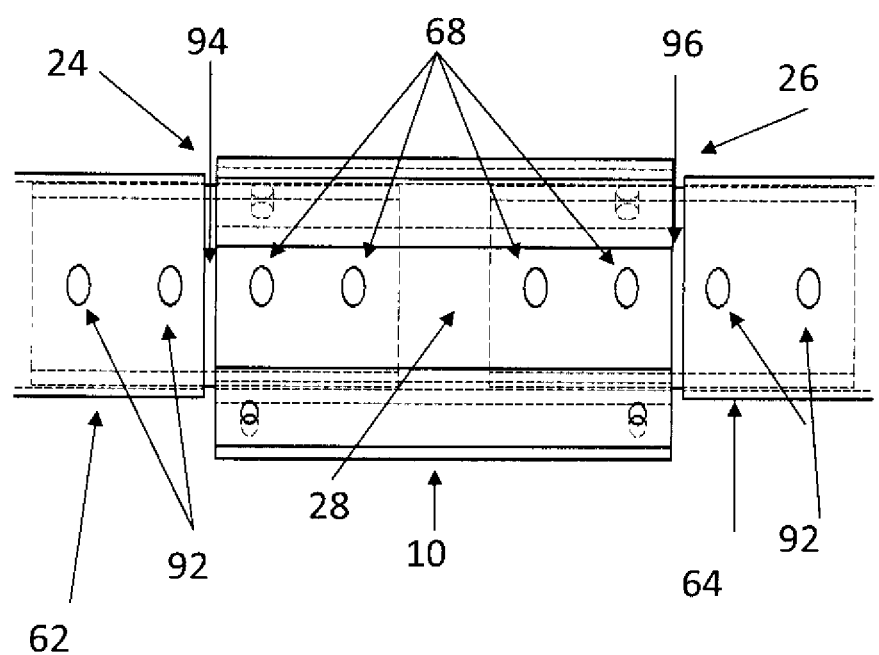
FIG. 5 shows a Split (2 pc) coupler 94 and 96 assembly with a hollow node 10 and segmented chords 62 and 64—Side view.

The frame may include multiple couplers 94 and 96, as shown in FIGS. 4 and 5, disposed in the one node 10 that extends out from the one node 10. The first segmented chord 62 is removably attached to the end of the first coupler 94 and second segmented chord 64 removably attached to the end of the second coupler 96 with fasteners 80.

The present invention pertains to a node 10 for connecting together at least a first support element 12, a second support element 14 and a third support element 16 of a solar frame 18 which supports solar reflectors 20. The node 10 comprises an elongate portion 22 having a first end 24 configured to removably attach to the first support element 12, a second end 26 configured to removably attach to the second support element 14 and a middle portion 28 disposed between the first end 24 and second end 26 having a fin 30 extending outward from the middle portion 28 configured to removably attach to the third support element 16.

The present invention pertains to a method for connecting together at least a first support element 12, a second support element 14 and a third support element 16 of a solar frame 18 which supports solar reflectors 20. The method comprises the steps of removably attaching the first support element 12 to a first end 24 of an elongate portion 22. There is the step of removably attaching the second support element 14 to a second end 26 of the elongate portion 22. There is the step of removably attaching the third support element 16 to a fin 30 extending outward from the middle portion 28 disposed between the first end 24 and second end 26.

The present invention pertains to a node 10 for connecting together at least a first support element 12, a second support element 14 and a third support element 16 of a support frame. The node 10 comprises an elongate portion 22 having a first end 24 configured to removably attach to the first support element 12, a second end 26 configured to removably attach to the second support element 14 and a middle portion 28 disposed between the first end 24 and second end 26 having a tin 30 extending outward from the middle portion 28 configured to removably attach to the third support element 16.

The present invention pertains to a method for connecting together at least a first support element 12, a second support element 14 and a third support element 16 of a support frame. The method comprises the steps of removably attaching the first support element 12 to a first end 24 of an elongate portion 22. That is the step of removably attaching the second support element 14 to a second end 26 of the elongate portion 22. There is the step of removably attaching the third support element 16 to a fin 30 extending outward from the middle portion 28 disposed between the first end 24 and second end 26.

The present invention pertains to a system 32 for supporting solar reflectors 20. The system 32 comprises a first support frame 42 upon which the solar reflectors 20 are disposed. The system 32 comprises a rolling rib 34 to which the frame is attached. The system 32 comprises a drive mechanism 36 which may be engaged with the rib to move the rib to move the frame. The system 32 comprises a first pylon 38 attached to a first side 46 of the frame by a torque plate 125. The system 32 comprises a second pylon 40 attached to a second side of the frame by a torque plate 125. The system 32 comprises a second support frame 44 having a first side 46 attached to the second pylon 40 by a torque plate 125 with the second pylon 40 disposed between the first and second frames which are attached by torque plates 125 spanning the pylons 38 or 40.

The present invention pertains to a method for forming a support frame for solar reflectors 20. The method comprises the steps of building cross-sectional slices 48 of the frame at a first location. There is the possible step of transporting the slices to a second location remote from the first location. There is the step of hanging the slices from a strongback on a support structure. There is the step of connecting struts 52 and segmented chords 54 between the slices to form a completed frame. There is the step of lifting the strongback with the completed frame of the support structure. There is the step of placing the completed frame at a third location.

The present invention pertains to a system 56 for constructing a support frame from parts, including chords, for solar reflectors 20. The system 56 comprises an assembly platform 58 upon which assemblers stand to attach parts to build the frame. The system 56 comprises a moving mechanism 60 to which the chords of a partially assembled frame are attached, the moving mechanism 60 moving the chords relative to the platform to reposition the partially assembled frame to allow the assemblers on the platform to attach parts to the partially assembled frame.

The present invention pertains to a method for constructing a support frame for solar reflectors 20. The method comprises the steps of attaching parts to a partially assembled support frame by assemblers standing on an assembly platform 58 or on the ground. There is the step of moving the partially assembled frame with a moving mechanism 60 by moving chords of the partially assembled frame relative to the platform to reposition the partially assembled support frame. There is the step of attaching additional parts to the partially assembled support frame by the assemblers standing on the assembly platform 58 after the partially assembled support frame has been repositioned.

The present invention pertains to a node 10 for connecting together at least a first support element 12 and a second support element 14 of a solar frame 18 which supports solar reflectors 20. The node 10 comprises an elongate portion 22 having a first end 24 configured to removably attach to the first support element 12, a second end 26 and a middle portion 28 disposed between the first end 24 and second end 26 having a fin 30 extending outward from the middle portion 28 configured to removably attach to the second support element 14.

The second end 26 may oppose and be in spaced relationship with the first end 24. The elongate portion 22 may be an extrusion. The elongate portion 22 may be a one-piece extrusion. The elongate portion 22 may be a one-piece extrusion of aluminum.

The present invention pertains to a support frame for solar reflectors 20. The frame comprises struts 52. The frame comprises a first segmented chord 62. The frame comprises a second segmented chord 64 separate and distinct from the first segmented chord 62. The frame comprises a plurality of attaching means 66, at least one of the attaching means 66 removably attaches at least one of the struts 52 and the first segmented chord 62 and the second segmented chord 64 together. The attaching means 66 may be a node 10.

In the operation of the invention, the WES concepts described herein take exceptional advantage of the attributes of aluminum extrusions and technologies for creating structures from these extrusions while avoiding designs which, while structurally sound, would be difficult to tool, extrude, fabricate or assemble.

High level overview of what is described herein:

"Strut only" ("Segmented chord") and fabricated node designs for space frames and other applications. Replacing the "through" chords of prior designs entirely with struts 52 (a "strut only" space frame design (also called "segmented chords" 54 instead of struts, where chords normally are collinear-vs-struts which can be at angles to each other)).

Incorporation of rolling rib 34 drive—the effect that this has on frame design and optical accuracy.

Assembly methods for conventional, non-segmented CSP frames and for "strut only" CSP frames. NOTE: CSP frames refers to "Concentrated Solar Power" frames, but the concepts can be applicable to CPV ("Concentrated Photo Voltaic") and other designs.

"Strut Only" ("Segmented Chord") CSP Frame and Fabricated Node Designs:

While the development of the CSP technologies using WES designs is further enhanced by the concepts herein, many of the design concepts would be applicable to structures well beyond the scope of just CSP frames or even of solar power frames more generally. The extruded/fabricated node 10 non-hollow (solid profile) designs and capabilities for these nodes 10 to be used with struts 52 directly or through the use of struts 52, and strut end pieces 78 (or segmented chords 54 directly or through the use of segmented chords 54 and chord end pieces 78) are applicable to CSP applications and to other applications with much broader use.

While the examples and discussions revolve around the use of extruded (and often fabricated) aluminum struts 52, chords, sleeve 70, nodes 10, etc. . . . fastened with pins, bolts, rivets or other means, materials other than extruded aluminum could be used (cast or forged aluminum, steel or other materials, structural steel, roll formed parts, fiberglass reinforced plastics, other materials . . . ) and fastening means could include adhesive bonding, welding or other means.

Incorporation of Rolling Rib 34 Drive—the Effect that this has on Frame Design and Optical Accuracy:

Conventional solar field design for CSP relies on drive units rotating multiple frames. Each central drive unit is located in the center of 2, 4, 6, 8, 10 or more frames, driving 1, 2, 3, 4, 5 or more frames on either side of the drive unit. The frames nearest the drive unit are turned by the drive unit and the successive frames moving out from the drive unit are attached to the first, $2^{nd}$ or later frames. The first frame is thus subject to the torque created by the wind and other forces, such as the dead weight of the frame, acting on that frame, but ALSO on the "applied torque" of the wind's and other forces' torque creation on frames 2, 3, 4, 5 etc. . . . beyond the drive frame.

Analysis of the optical accuracy of the frames under load, as measured by the mRadians RMS of "slope error" expected from the frames' effect on the mirrors mathematically proves that the induced torque on the frame and subsequent frames has a larger effect on optical accuracy than purely deflection from wind.

By using either individual rolling rib 34 drive units 36 or rolling ribs 34 for each frame which are driven by a common "torque tube" drive shaft 121, each frame is only subject to the torque induced from the wind on that sole frame. In addition, but driving the frame rotation from a "rolling rib"

34 mounted to the longitudinal center of the frame, the torque extending left and right of center are further reduced, leading to more frame optical accuracy. The concept of the rolling rib 34 drive mechanism 36 allows for the design and implementation of a frame with MUCH greater optical accuracy for the same unit weight, and thus lower manufactured cost as well as greatly enhanced electrical power generation.

Assembly Methods for Conventional, Non-Segmented "Through" CSP Frames and for Segmented-Chord CSP Frames:

Full length ("through") Chord: Included herein is an explanation and expanded discussion of the frame assembly methodology originally discussed in patent application Ser. No. 12/583,787 and of a frame assembly methodology for the segmented chord 54 design described previously.

Strut Only (Segmented Chord) and Alternative Node Designs

"Strut only" 52 ("segmented chord" 54) space frame design: An efficient assembly method to fabricate, subassemble and final assemble the frame using the strut 52 only CSP frame design is documented herein. In particular, the strut 52 only (segmented chord 54) concept combined with the frame geometry proposed (other geometries will share in this advantage as well), allows for shorter members (segmented chords 54-vs-full frame length chords) to be manufactured, transported and handled and allows for a "slice" along the longitudinal CSP frame to be designed, fabricated and sub-assembled. These "slices" or portions of "slices" can then be hung from assembly stations (see details below) and with struts 52 and can be efficiently assembled into whole parabolic CSP frames, optimizing the combination of factory subassembly cost, shipping cost and final field assembly cost.

Many current CSP parabolic frames are designed with "chords" which extend the full length of the solar frame 18. These frames are typically 8 or 12 meters long (other lengths of frame have also been produced and/or are under development and testing). Extruding, fabricating, packaging, shipping, handling and assembling these long chord members, sliding connection "sleeves" 70 onto them, etc. . . . can be cumbersome and expensive. The concept here is to totally eliminate the use of these "through chords", and utilize a "strut 52 only" (segmented chord 54) CSP frame design ("strut" like members replace chords, utilizing "connection nodes" 10 between them).

The concept of a strut only CSP frame design also expands the capabilities of the structural system to use different "node connectors" 10 than hollow sleeves 70, and allows the excessively long, straight "chords" to be replaced with smaller struts 52 (segmented chords 54) taking the place of these "through chords"; these struts 52 do NOT necessarily need to be placed in a straight line, end to end with "node connectors" 10 joining them. The concept is to separate the use of a single "chord" into likely shorter struts 52 (segmented chords 54) of a space frame—whether the particular "struts" 52 are end-to-end in a line or at angles to each other.

Fabricated Node Design and Strut Only Frame Design:

A simple method of accomplishing this would be to use the existing hollow sleeves 70, into each end of which a short "strut" slips in and is fastened or a sleeve 70 with a single piece coupler 90 or two piece "coupler" 94/96 inserted into it and fastened with the short "struts" 52 slipping over or into and fastened to the "coupler". While it is possible that the "strut" 52 could fit INTO the "coupler" and be fastened, in many applications due to compressive buckling being a likely failure mode, larger diameter "struts" 52 or segmented chords 54 may be preferred—this is best supported by slipping the "strut" OVER the "coupler". Some smaller diameter "struts 52" (segmented chords 54) fitting INTO the "coupler" are also possible for some parts of the design depending on the member properties required in the loading calculations.

Because the "chords" generally need to provide excellent structural support, and since a common failure mode of these is in compressive buckling, the chords generally have a larger diameter than would be required for simple tensile loading. Prior to the concept of the "segmented chord" 54, the conventional "sleeves" 70 must be sized to fit OVER the "through chords", with fins 30 or other connection means; this can lead to a rather large shape (circumscribing circle size is often a limitation on the ability to extrude parts such as this—competitive designs were approaching a 14" circle size). There are a large number of smaller diameter aluminum extrusion presses available in the US and throughout the world; as the press diameter increases, there are VERY few of the largest (greater than 10" diameter) sizes). WES's $3^{rd}$ provisional patent shows means to minimize this "circle size" to about 10", but the "strut 52 only" CSP frame system designed around the segmented chord 54 system, utilizing the non-hollow (solid profile) node 10 provides design flexibility to allow a MUCH smaller diameter circle size and weight/ft coupled with enhanced deflection performance as predicted by FEA analyses (see FIG. 25B).

By combining the "strut 52 only" concept with the "strut end piece" 78 concept from earlier WES designs and described in previously filed patent applications, there is no longer the need for the sleeve 70 to fit AROUND the "chord". Because of this, the sleeve 70 can now be thought of as a "node 10 connector". The specific designs detailed in the remainder of this document show some of the ways that the designs could proceed.

These "node 10 connectors" allow the axial forces from the struts 52 and segmented chords 54 to be aligned to common central forces, eliminating bending moments that would occur were these lines of force to be offset. By no longer requiring hollow "sleeves" 70, the overall "node 10 connectors" can be MUCH smaller circle sized and much lighter (less expensive and easier to tool on a great variety of different extrusion presses). This is a tremendous advantage to this design concept.

Because it is no longer necessary to use a hollow sleeve 70, the "node 10 connector" extrusion tooling and productivity can be greatly improved (hollow dies generally are much more expensive and run slower (more heat generated in the extrusion process due to the deformation of the metal in the hollow dies).

By combining the "strut 52 only" (segmented chord 54) concept with the "strut end piece" 78 concept and using "node connectors", it is no longer necessary for the "chord" to be a straight line piece. The "strut end piece" 78 and "node 10 connector" allows easy connection of aluminum extrusions (or other materials) to each other to create space frame applications from struts 52, whether for CSP solar mirror frames or for any other use. The non-hollow (solid profile) node 10 is a particularly advantageous design.

The "strut 52 only" design replaces conventional "through chords" with shorter struts 52, likely joined to nodes 10 with strut end pieces 78 or couplers 90, 94/96. At various times the terms "struts 52", "strut only" or "segmented chords" 54 may be used. "Strut End Piece" 78 may be used interchangeably with "Chord End Piece".

Eliminating the "through chord" by going to a "strut only" (alternately could be called a "segmented chord" 54).

Changes the overall design from what may typically be called a "double layer grid" to more of a conventional space frame using struts 52 and connection nodes 10. No need to have very long extrusions fabricated, shipped (equipment to fabricate them can be expensive and they can be hard to handle and ship).

This can be accomplished by using "through couplers" 90, "split couplers" 94/96 or replacing the hollow "sleeves" 70 with non-hollow (solid profile) "connecting nodes" 10.

Solid connection nodes 10 are lighter, stronger, smaller circles size (able to be extruded on a greater variety of extrusion presses), will yield higher extrusion productivity with lower tooling costs (solid-vs-hollow), have improve deflection results-vs-loading and may be easier to fabricate.

Hollow connection nodes 10 are possible with "strut end pieces" 78 or other technologies and couplers 90, 94/96, whether single or multiple piece.

"Strut only" CSP frame can be much easier to assemble.

Some geometries allow cross sectional "slices" to be factory assembled and then joined with struts 52 in the field more efficiently.

FIG. 1 shows a hollow node 10 "A" with 4 fastener holes 68 allowing the node 10 to be fastened to the chord with fasteners 80, segmented chords 54 or struts 52 or to one or two piece couplers 90, 94 and 96. Four (4) node fins 30 are shown. This hollow node 10 could be utilized with a "through chord", multiple segmented chords 54 or struts 52 or with one or two piece couplers 90, 94, 96. The hollow node 10 may be in the form of a circular tube with the fins extending outward from the outer surface of the tube. The fins may form planes that intersect essentially at or about the central axis of the tube. The fins may be rectangular and extend partially or entirely along the length of the tube.

FIG. 2 shows a segmented chord single coupler 90. This coupler 90 can be inserted into the node 10 and fastened to the node 10 through holes 68 with fasteners 80. Chord attachment holes 92 which extend outside the node/coupler interface can be used to fasten to segmented chords 54 or struts 52 with fasteners 80. The coupler 90 may be a circular hollow tube that conforms to the shape of the hollow node 10.

FIG. 3 shows a single segmented chord coupler 90 and node assembly (single thru coupler). The coupler 90 can be inserted into the node 10 and fastened to the node 10 by the matching fastener holes 68 and fasteners 80. Chord attachment holes 92 extending outside the node/coupler interface can be used to fasten to segmented chords 54 or struts 52 while holes 68 within the interface can connect the coupler 90 to the node 10 with fasteners 80. The struts 52 or segmented chords 54 can slip over the coupler 90 or inside the coupler 90, depending on the diameter required for the application and can be fastened with fasteners 80.

FIG. 4 shows one (often two will be used) Split (2 pc) coupler 94 or 96. Holes 68 can be used to fasten the node 10 to the coupler 94 with fasteners 80 and chord attachment holes 92 extending outside the node/coupler interface can be used to fasten to segmented chords 54 or struts 52 slipped over or into the coupler 94 or 96, depending on the diameter required for the application, with fasteners 80. The split couplers 94, 96 may each be a circular hollow tube that conforms to the shape of the hollow node 10.

FIG. 5 shows a Split 2 pc coupler assembly. One or two of the couplers 94 and 96 can be inserted into the node 10 and fastened to the node 10 via fastener holes 68 and fasteners 80. Chord attachment holes 92 extending outside the node/coupler interface can be used to fasten to segmented chords 54 or struts 52 (shown slid over couplers 94 and 96), although the segmented chords 54 or struts 52 could be slid inside the couplers 94 and/or 96 depending on the diameter required for the application; fasteners 80 are used to connect the parts.

Figure 6:
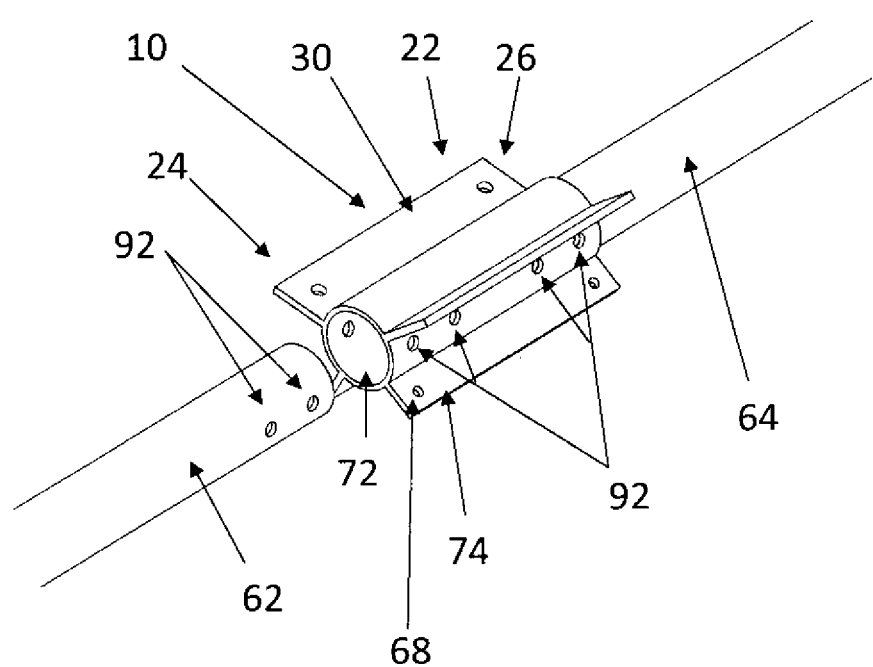
FIG. 6 shows two segmented chords 62 and 64 and a hollow node 10 without coupler—ISO view.

FIG. 6 shows a segmented chord 54 direct attachment to node 10—no coupler. One or two segmented chords 54, such as a first and second segmented chord 62, 64 can be fastened to the node 10 with fasteners 80 through chord attachment holes 92.

Figure 7:
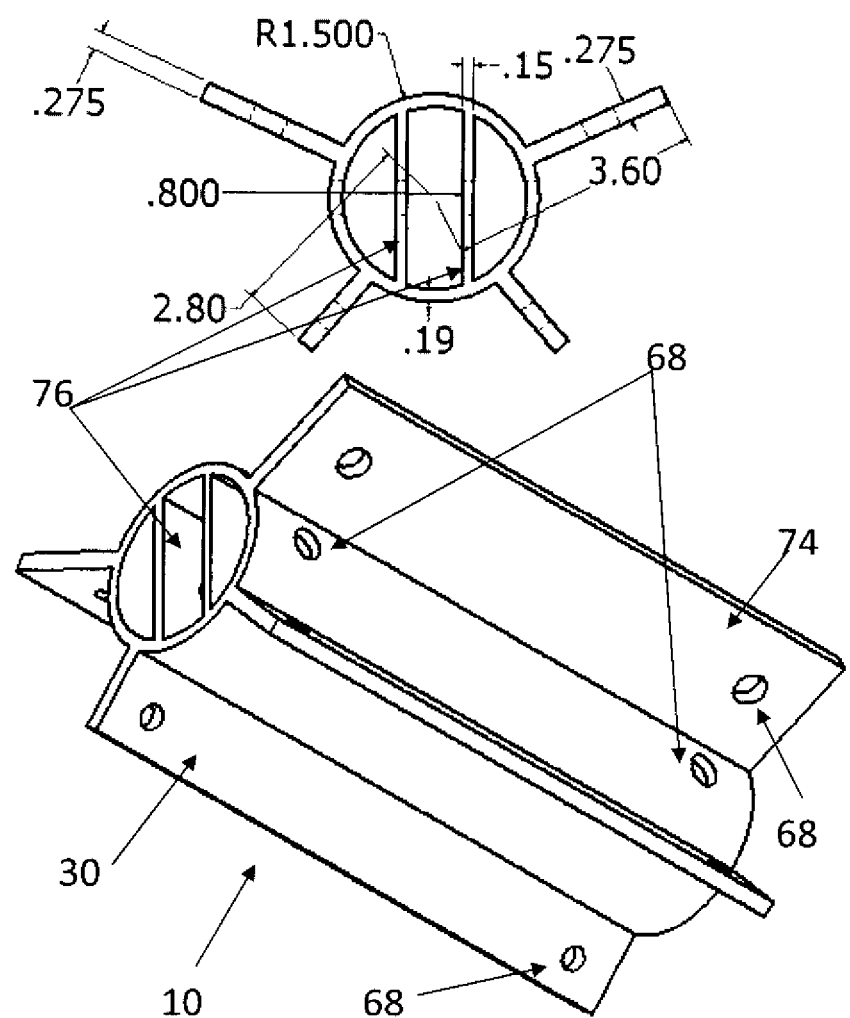
FIG. 7 shows a hollow node 10 "B" with vertical bars 76—ISO and End views.

FIG. 7 shows a hollow node 10 "B" with fastener holes 68. The fastener holes 68 can allow use of this node with a "strut end piece" 78 (in this use, it can also be called a "chord end piece") fastening the segmented chord 54 or strut 52 to the vertical bars 76 on node 10 with fasteners 80; the node 10 elongate portion 22 connects to the end piece 78 with fasteners 80, which in turn connects to the chord (or strut) 54 with fasteners 80. Access holes 68 through the node outer wall elongate portion 22 to the vertical bars 76 can be used as part of the connection means or simply for access to fasteners 80 as the design requirements dictate. It should be noted that the strut end piece 78 or segmented chord end piece can be of the same design, the term that applies depends on whether the structure is being fastened to a segmented chord 54, where it is a chord end piece, or to a strut 52, where it is a strut end piece 78. The vertical bars 76 may be disposed inside the hollow node 10 and extend from one portion of the inner surface of the hollow node 10 to another portion of the inner surface of the hollow node 10. The vertical bars 76 may be rectangularly shaped and extend entirely, or partially, or partially at each end of the node 10 along the length of the node 10.

Figure 8:
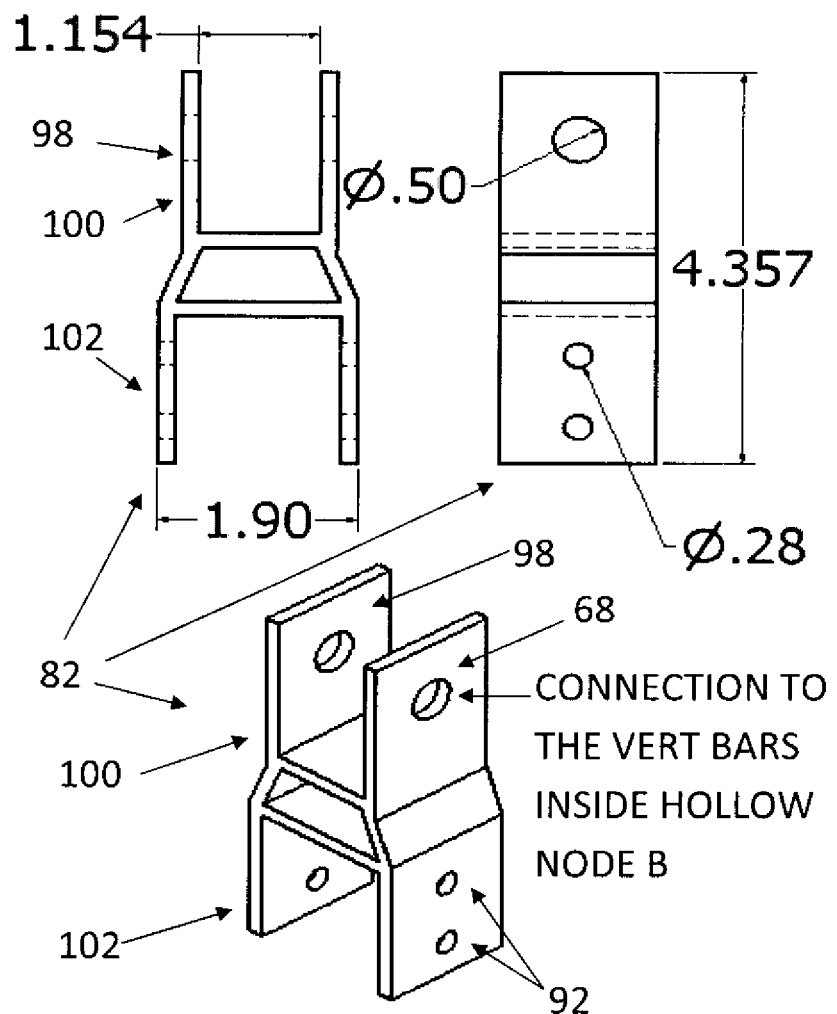
FIG. 8 shows a strut end piece (SEP) 78 for use with the node 10 from FIG. 7—ISO, End and Side views.

FIG. 8 shows a strut end piece (SEP) 78 for segmented chord 54 (or strut 52) to hollow node 10 "B". The upper fins 100 of the strut end piece 78 or segmented chord end piece connect to the vertical bars 76 inside elongate portion 22 with fasteners 80. The lower fins 102 of the strut end piece 78 or segmented chord end piece connect with fasteners 80 to the inside of the primary segmented chord portion using chord attachment holes 92 and fasteners 80. The segmented chord 54 (or strut 52) connects to the SEP 78, which in turn connects to the node 10 with fasteners 80.

Figure 9:
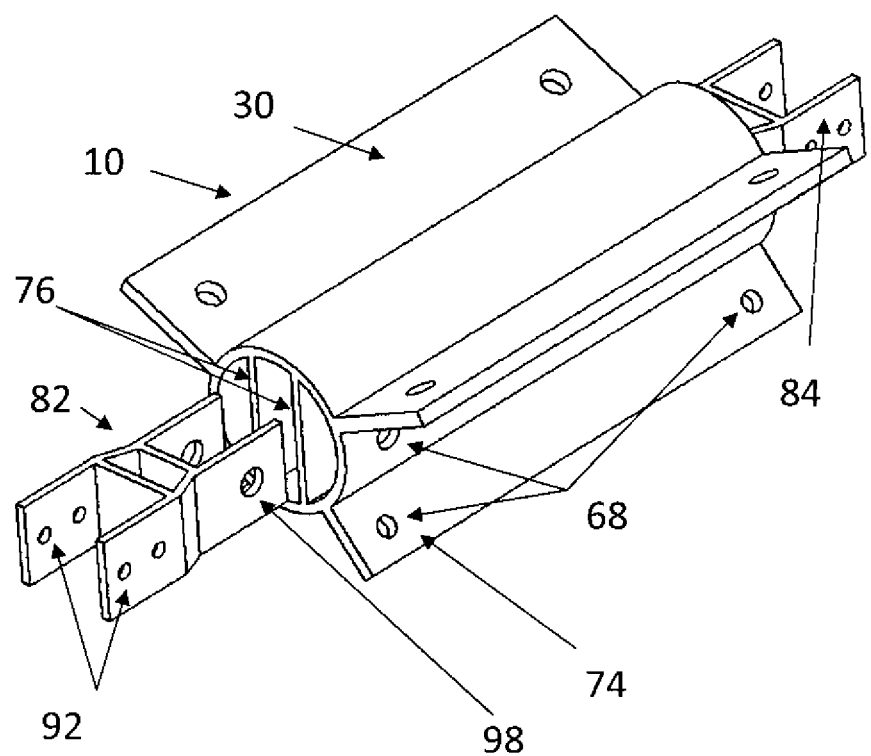
FIG. 9 shows two SEP's 82 and 84 and one hollow node 10 "B" assembly constructed from the parts from FIGS. 7 and 8—ISO view.

FIG. 9 shows two SEP's 82 and 84 and one hollow node 10 "B" assembly with two vertical bars 76 for spreading the load from the fasteners 80 attaching the node 10 to the strut end piece's (SEP's) 82 and 84. The SEP's 82 and 84 will be fastened to the segmented chord 54 (or strut 52) via chord attachment holes 92 and fasteners 80; the SEP's 82 and 84 will be fastened via fasteners 80 to the node 10 via fastener holes 68 in the segmented chord end piece 78 fin 98 or other means.

Figure 10:
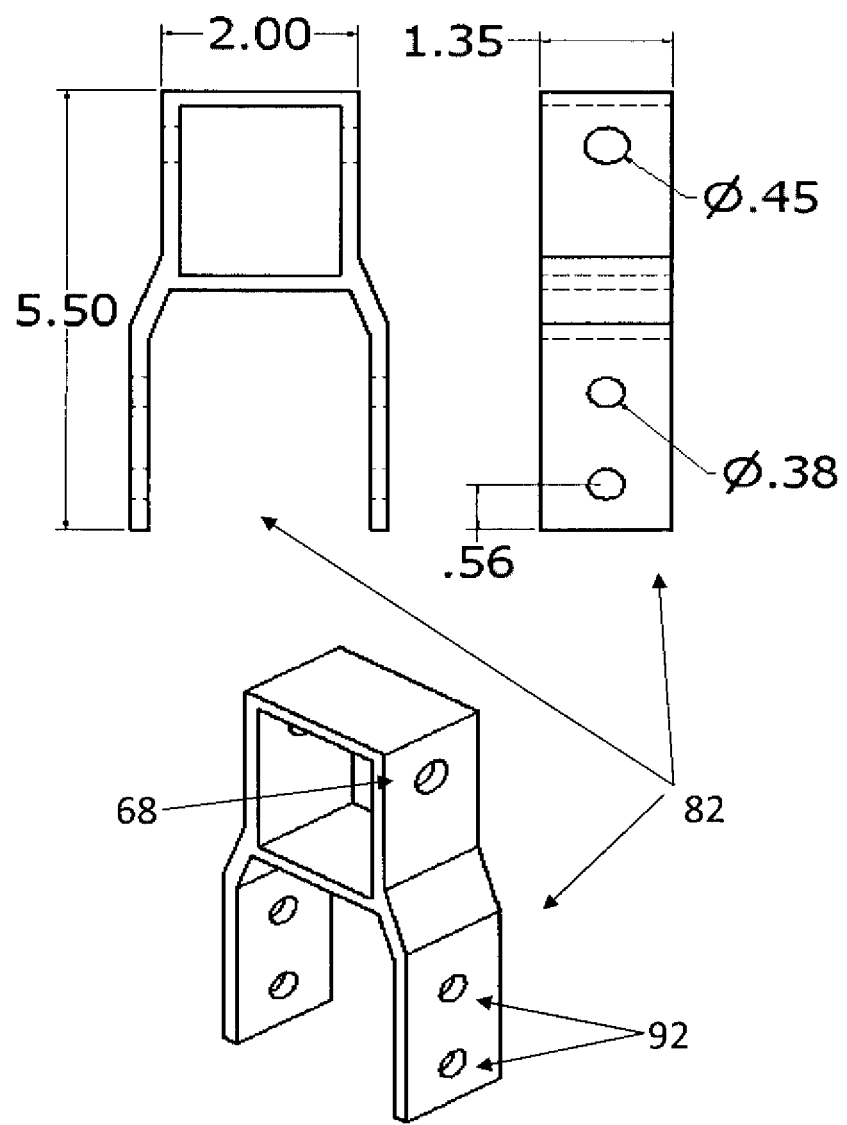
FIG. 10 shows a SEP 78 (can also be noted as 82 or 84) for segmented chord 54 (or strut 52) to hollow node 10 "C" in FIG. 11—ISO, End and Side views.

FIG. 10 shows a SEP 78 (can also be noted as 82 or 84) for segmented chord 54 (or strut 52) to hollow node 10 "C". The SEP 78 to segmented chord 54 (or strut 52) connection is via chord attachment holes 92 and fasteners 80.

Figure 11:
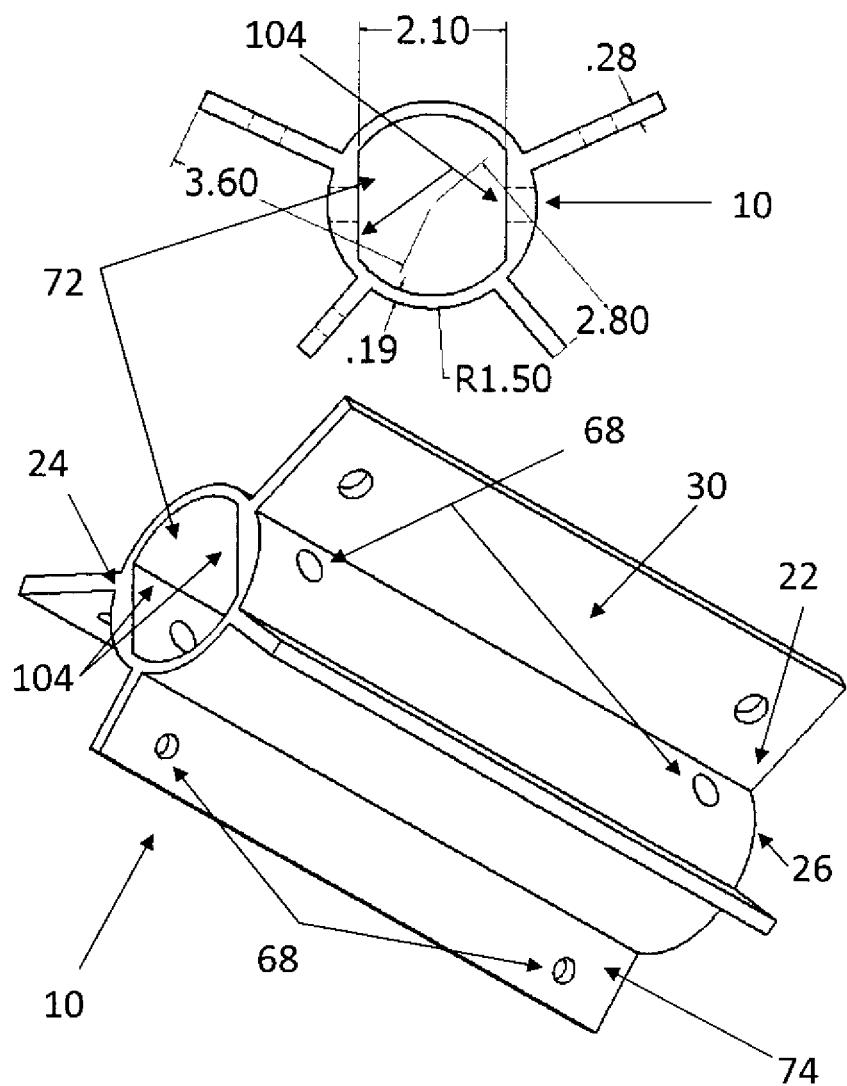
FIG. 11 shows a hollow node 10 "C" ISO and End views.

FIG. 11 shows a hollow node 10 "C". The elongate portion 22 shown in FIG. 11 is an alternative embodiment, where the vertical fins 76 from FIG. 9 are replaced instead with flat interior walls 104 which essentially conform with the shape of the Strut end piece 78 fin(s) (a single hollow fin as referenced by FIG. 10) so there are essentially no gaps to diminish the structural integrity formed from their attachment. Attachment is through fastener holes 68 with fasteners 80.

Figure 12:
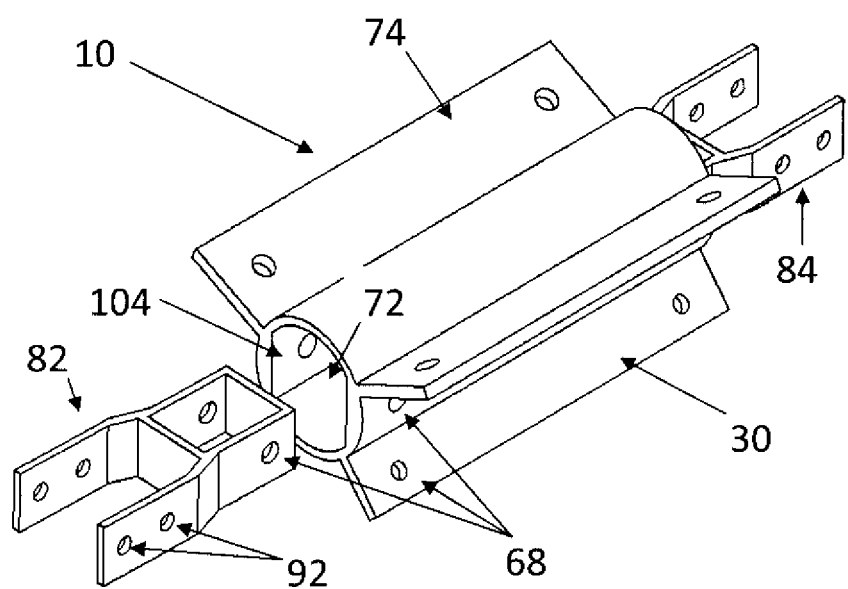
FIG. 12 shows two SEP's 82 and 84 and hollow node 10 "C" assembly constructed from the parts from FIGS. 10 and 11—ISO view.

FIG. 12 shows two SEP's 82 and 84 and hollow node 10 "C" assembly. Segmented chords 54 (or struts 52) would attach to the SEP's 82 and 84 via chord attachment holes 92 and fasteners 80. Fastener holes 68 and fasteners 80 can be used to attach other SEP's 78 to node fins 74 or the chord end piece 82 or 84 to the node 10 through fastener holes 68.

Figure 13:
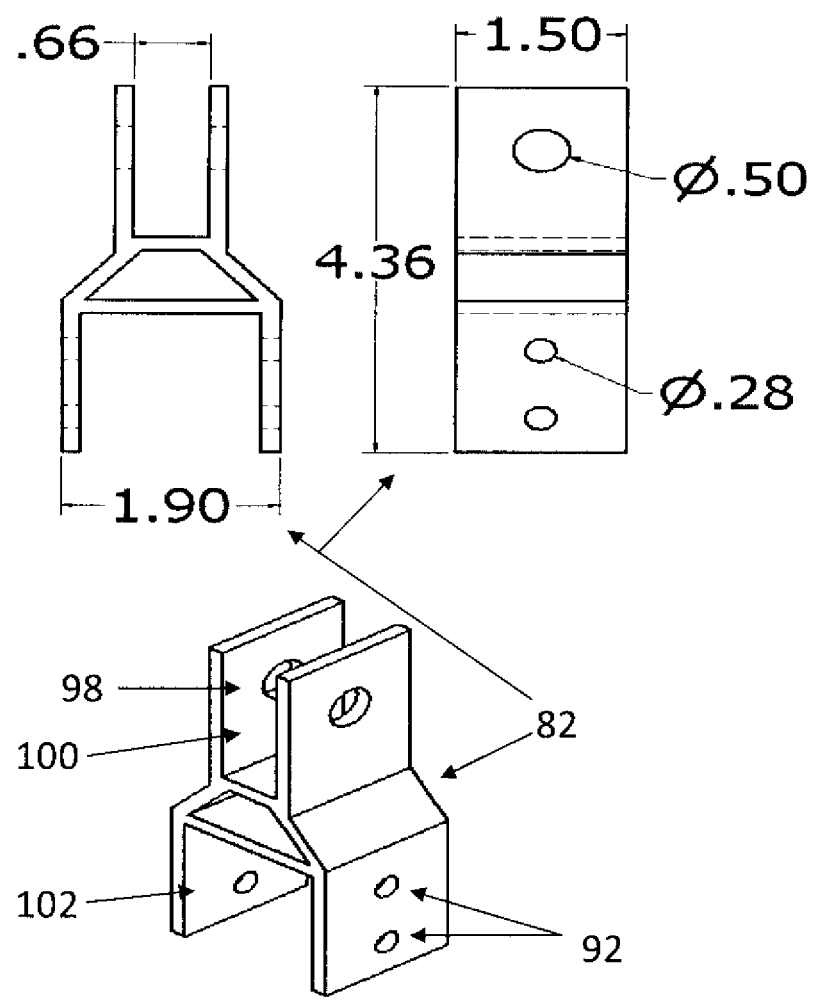
FIG. 13 shows a SEP 78 (can also be noted as 82 or 84) for segmented chord(s) 54 (or struts 52) to hollow node 10 "D"—ISO, End and Side views.

FIG. 13 shows a SEP 82 (or 84) for segmented chord(s) 54 (or struts 52) to hollow node 10 "D". The chord attachment holes 92 and fasteners 80 will be used to attach the SEP 82 or 84 to the segmented chord 54 (or strut 52). The segmented chord end piece fin 98 will be used to attach the SEP 82 or 84 to the node 10 with fasteners 80.

Figure 14:
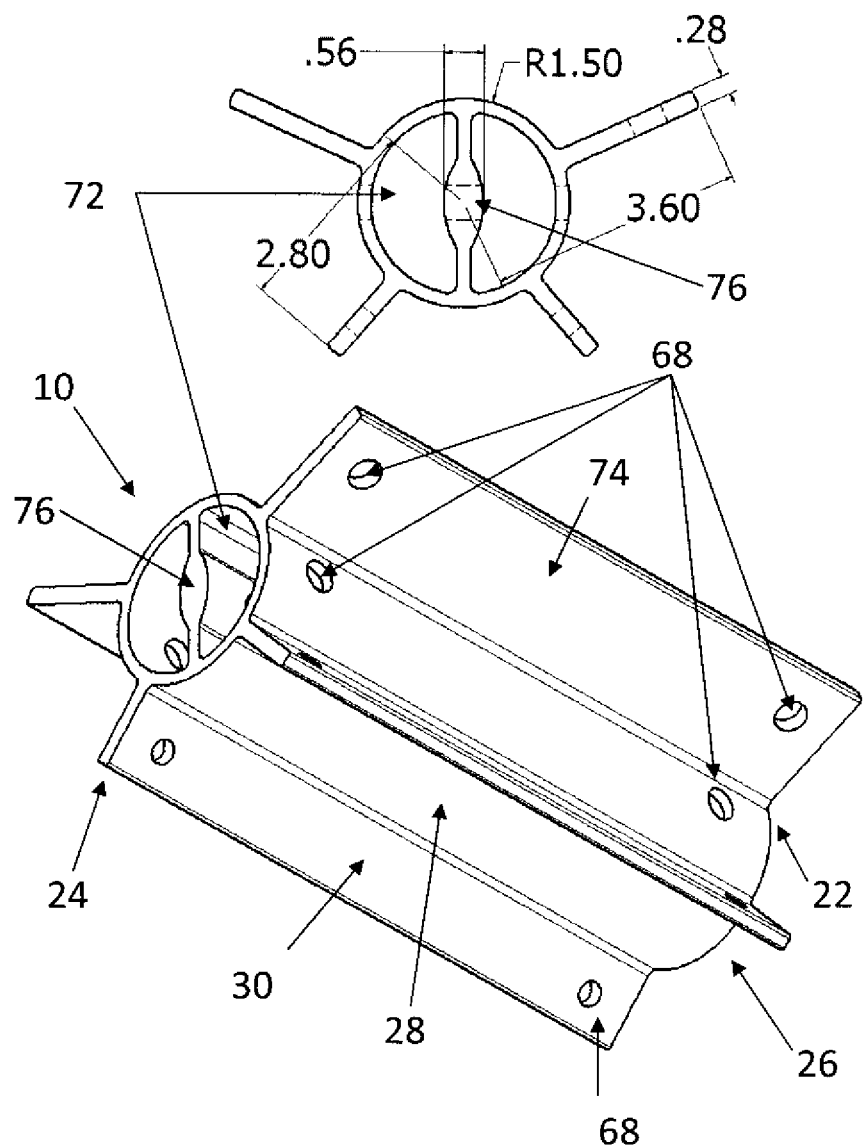
FIG. 14 shows a hollow node 10 "D" with a "guided insertion" type profile for SEP's—ISO and End views.

FIG. 14 shows a hollow node 10 "D" with a "guided insertion" type profile SEP 78 on the inner vertical bar 76 (which acts like a "fin") of the node 10 "D". The guided insertion connection is described in patent application US 2010/0258702 A1. The curved surface of the vertical bars 76 of the node 10 can interface with straight or curved surfaces of the SEP fins 98 of the SEP 78 (or segmented chord end piece) (see FIG. 13). The extra clearance provided by the interface of the curved surfaces facilitates easier manual insertion/positioning of the strut 52/SEPs 78 assembly (segmented chord assembly) with the node's 10 vertical bars 76.

FIG. 15 shows a non-hollow (solid profile) node 10 "A". The node 10 is fabricated to allow SEP's 78 to connect to it via fasteners 80 through fastener holes 68, facilitating the connection of segmented chords 52 or struts 52 with fasteners 80. Fabrication of the node 10 to create the first end 24 and the second end 26 could be performed by passing each end of the node 10 over dual rotating saw blades configured to create the necessary slots, by milling cutters or by other means. SEP's could then be connected to the node first end 24 and second end 26 via chord attachment holes 92 and fasteners 80, while struts 52 could be attached to the node 10 fins 30 and 74 (for example) via fastener holes 68 and fasteners 80. FIG. 15 is the embodiment wherein the elongate portion 22 is of a solid profile, there is a slot 106 disposed in proximity to the first end 24 and the second end 26 to receive the strut end piece 78 or the chord end piece which will be fastened via fasteners 80. The solid profile may be of a solid rectangular shape with the fins extending radially outward from solid profile. The fins may define planes which intersect at or about a central longitudinal axis of the solid profile.

Figure 16:
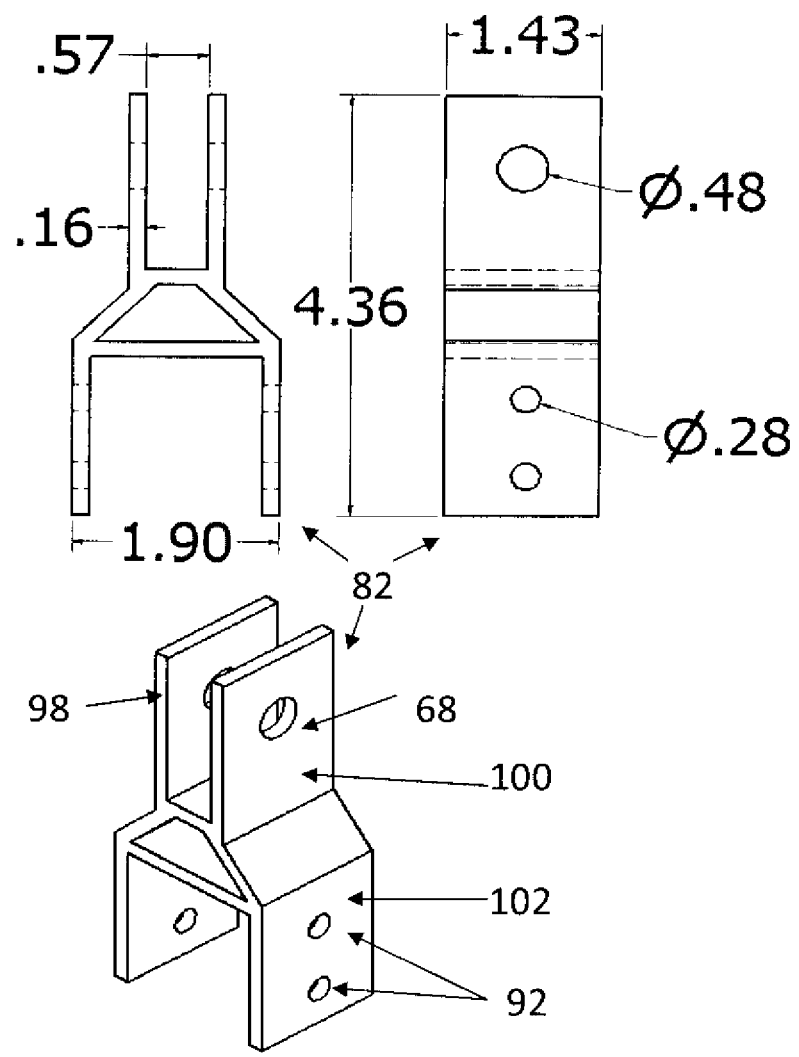
FIG. 16 shows a SEP 78 (could also be noted as 82 and 84) for segmented chord 54 (or strut 52) to solid node 10 "A"—ISO, End and Side views.

FIG. 16 shows a SEP 78 for segmented chord 54 (or strut 52) to non-hollow (solid profile) node 10 "A" with chord attachment holes 92 and fasteners 80. Note: hollow nodes can also be called "sleeves".

Figure 17:
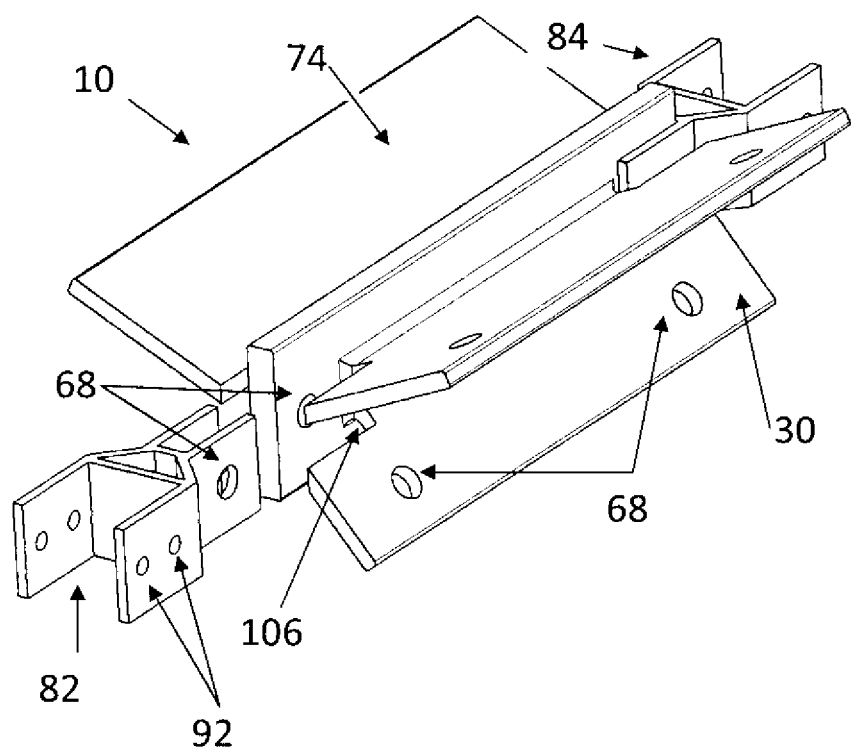
FIG. 17 shows two SEP's 82 and 84 and solid node 10 "A" assembly made from the parts in FIGS. 15 and 16—ISO view.

FIG. 17 shows two SEP's 82 and 84 and non-hollow (solid profile) node 10 "A" assembly. The slot 106 is fabricated into the node 10 fins 30 on both sides via sawing, milling or other means to allow for the SEP's 82 and 84 to slide onto the ends of the node and to be fastened to it via fasteners 80 with the SEP fins.

Figure 18:
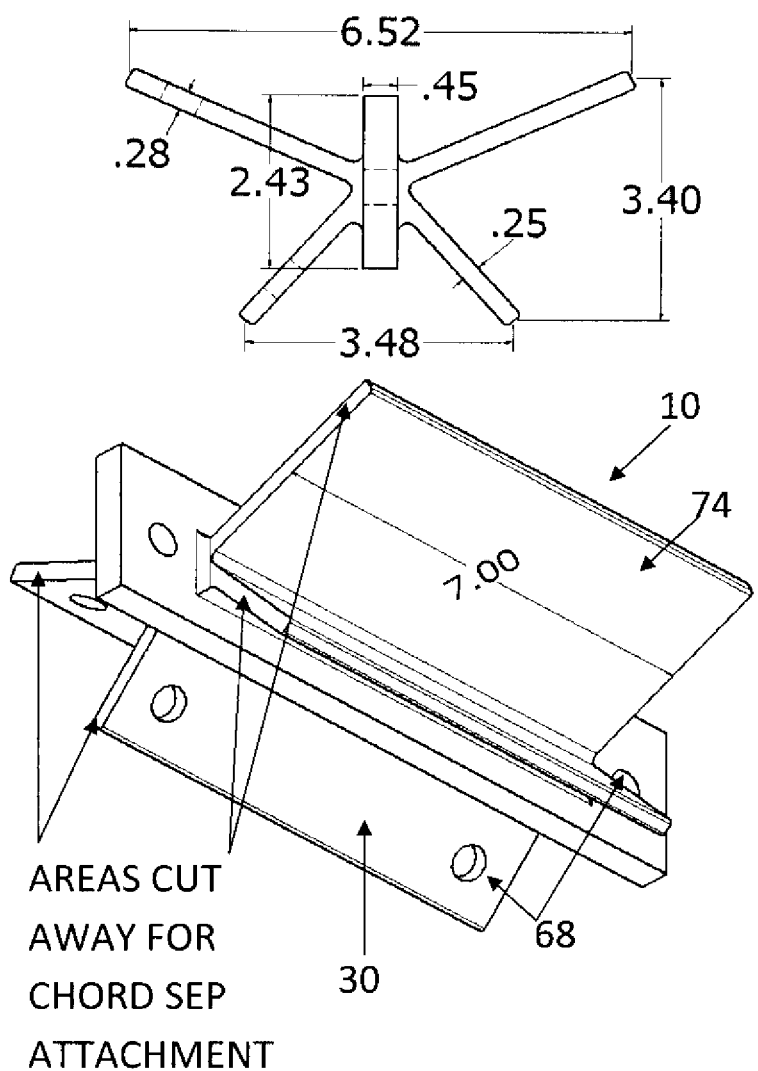
FIG. 18 shows a solid node 10 "B" with different fabrication means than FIG. 15—ISO and End views.

FIG. 18 shows a solid node 10 "B" where the node 10 fins 30 and 74 (for example) are fabricated to allow the strut end piece 78 for the segmented chord 54 (or strut 52), attached via chord attachment holes 92 and fasteners 80, to attach to the non-hollow (solid profile) node 10 end(s) 24 and/or 26 with fasteners 80 through fastener holes 68.

Figure 19:
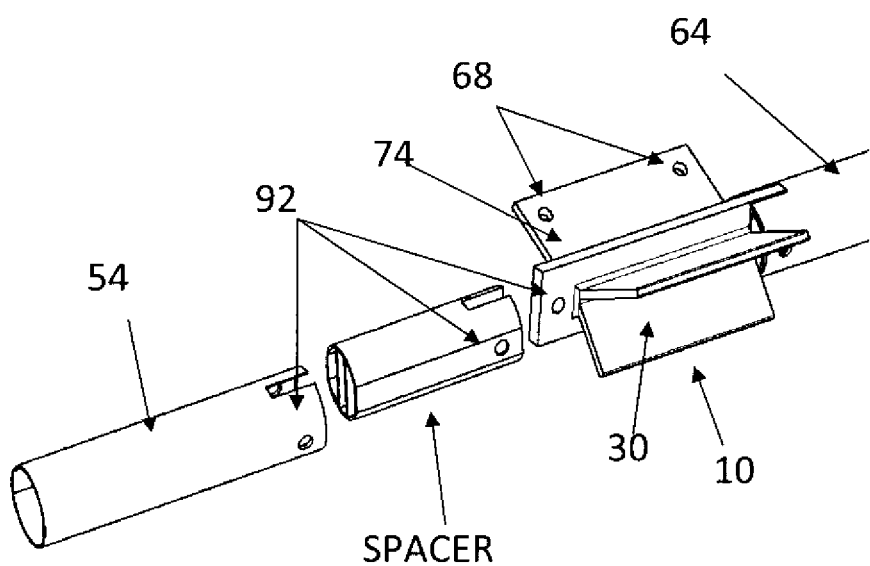
FIG. 19 shows segmented chords 54 and 64 (or struts 52), spacer and solid node 10 "B" assembly—ISO view.

FIG. 19 shows a segmented chord(s) 54 (64) (or struts 52), spacer and non-hollow (solid profile) node 10 "B" assembly. The chord may fit over the spacer which engages with the first end 54 (and/or second end 64) of the solid node 10, through slots of the spacer that fit over the end of the solid node 10 (first end 24 and second end 26), with the slots of the solid node 10 receiving the end of the spacer. Fasteners 80 are then used to fasten the spacer, solid node 10 and segmented chord 54 together.

Figure 20:
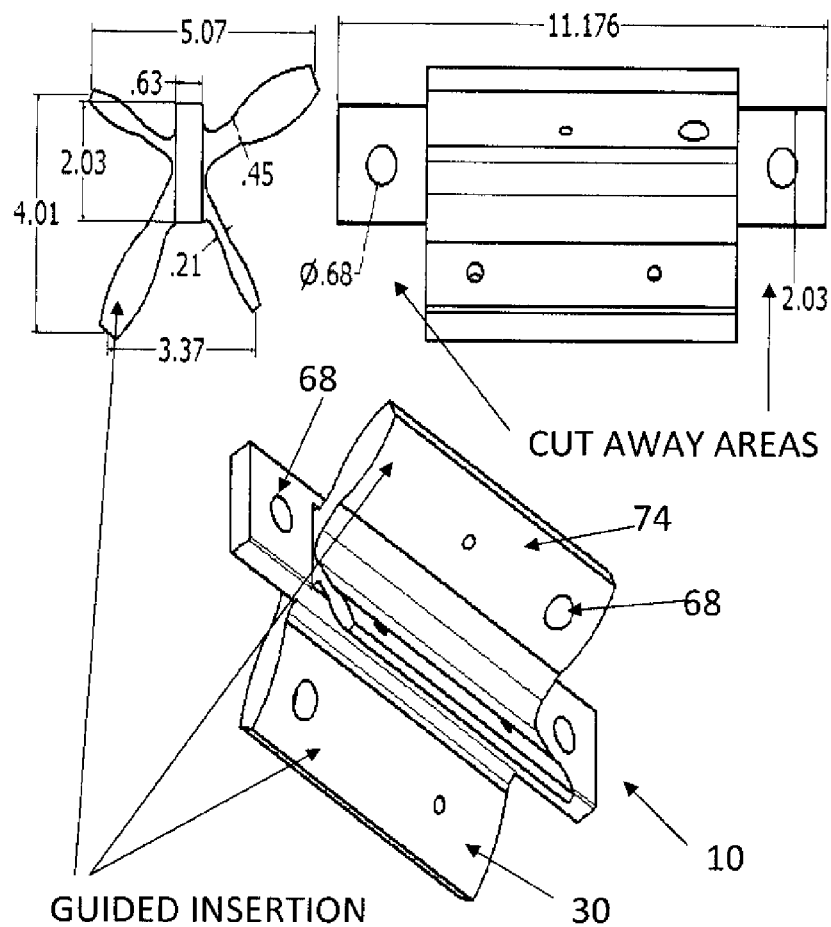
FIG. 20 shows a solid node 10 "C" with guided insertion fins (74 and 30, for example) and SEP 78 cut away areas—ISO, End and Side views.

FIG. 20 shows a non-hollow (solid profile) node 10 "C" with guided insertion fins (74 and 30). The guided insertion connection is described in Patent application US 2010/0258702 A1. The curved surface of the vertical bars 76 of the node 10 can interface with straight or curved surfaces of the SEP fins 98 of the SEP 78 (or segmented chord end piece) (see FIG. 13). The extra clearance provided by the interface of the curved surfaces facilitates easier manual insertion/positioning of the strut 52/SEPs 78 assembly (segmented chord assembly) with the node's 10 vertical bars 76 and SEP 78 cut away areas for fastening the SEP(s) 78 to the non-hollow (solid profile) node 10 via fastener holes 68 and fasteners 80; segmented chords 54 (or struts 52) will attach via these chord attachment holes 92 and fasteners 80. Struts 52 with strut end piece(s) 78 will attach to one or more node 10 fins 30 and 74 using fastener holes 68 and fasteners 80. Strut fins 100 and 102 can be removed via sawing, milling or other means to allow the strut end piece 78 (chord end piece) connections.

Figure 21:
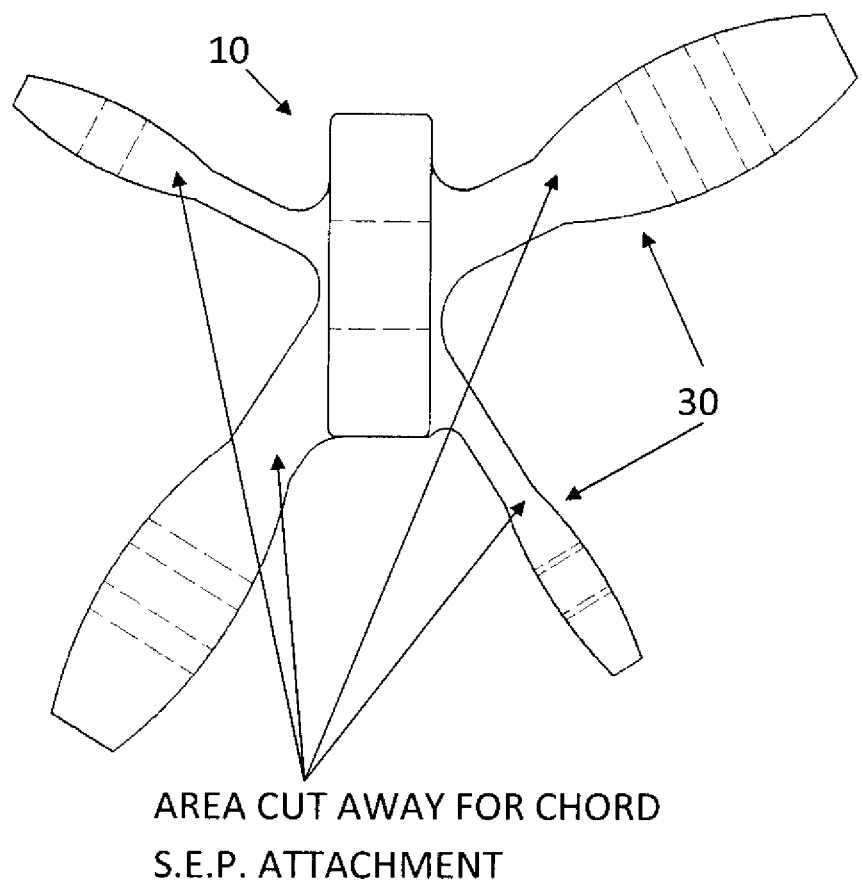
FIG. 21 shows a solid node 10 "C" showing SEP 78 cut away areas—End view.

FIG. 21 shows a non-hollow (solid profile) node 10 "C" front view showing SEP 78 cut away areas of the fins 30. The arrows show the areas cut away from the non-hollow (solid profile) node 10 fins 30 to allow the strut end piece 78 or chord end piece to fit onto either the first end 24 or the second end 26 (or both) with fasteners 80.

Figure 22:
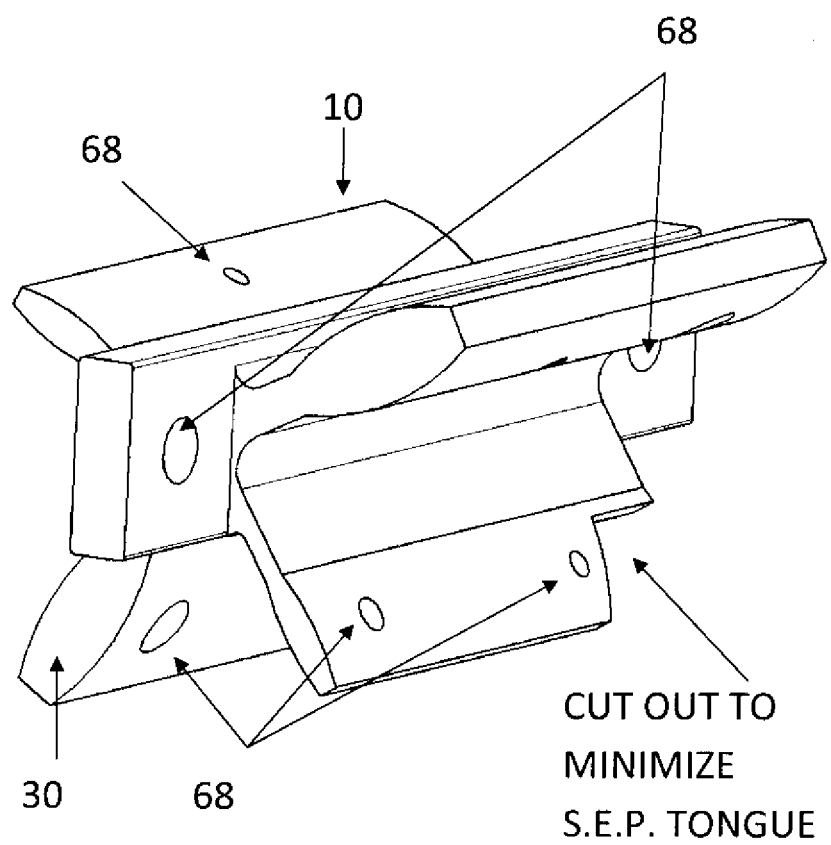
FIG. 22 shows a solid node 10 "C" side view showing attachment holes 92 and cut outs on SEP 78—ISO view.

FIG. 22 shows a non-hollow (solid profile) node 10 "C" ISO view showing attachment holes 68 and cut outs from fins 30. Node 10 is fabricated to allow fastener holes 68 and fasteners 80 to be used to fasten SEP(s) 78 on segmented chord(s) 54 or strut(s) 52. Strut(s) 52 attach to node 10 fin(s) 30 using fastener holes 68 and fasteners 80. Note that fin 30 is notched in this example in one place (noted as "Cut out to minimize S.E.P. tongue") so that when the angled strut 52 SEP 78 is fastened to the fin 30, it does not interfere with the fin 30 when angled.

Figure 23:
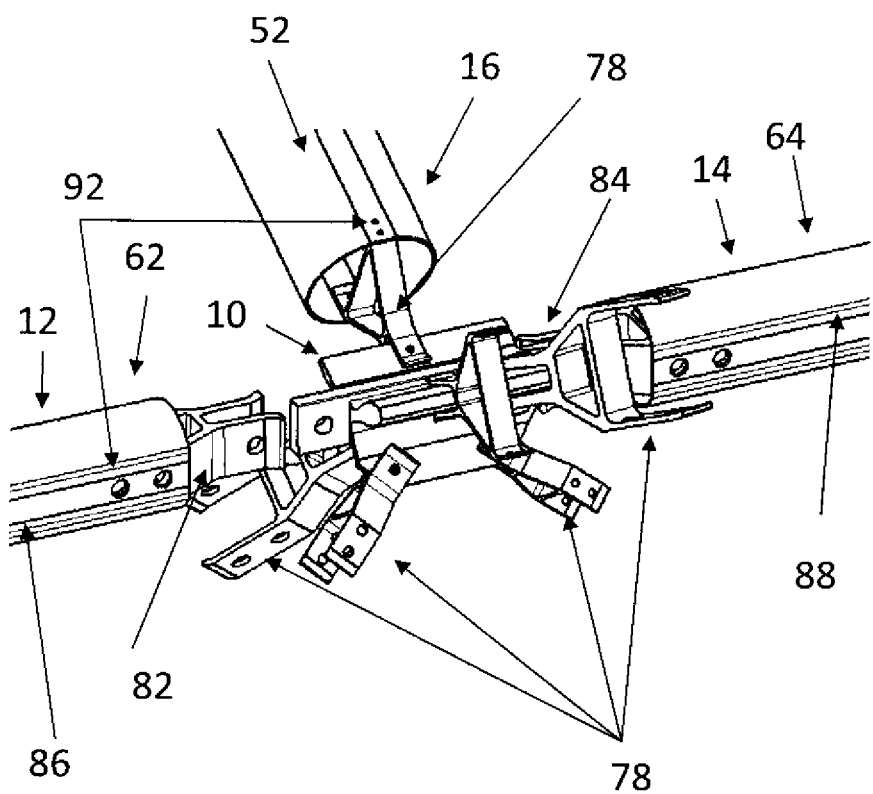
FIG. 23 shows a solid node 10 "C" and SEP's 78 assembly showing various components which could fasten to the node 10—ISO view.

FIG. 23 shows a non-hollow (solid profile) node 10 "C" and SEP 78 assembly showing various components which could fasten to the node 10 with fasteners 80: segmented chords 86 and 88 fastened via chord attachment holes 92 to segmented chord strut end pieces 82 and 84 which are in turn fastened to the solid node 10 "C"s fabricated ends, strut 52 shown fastened to strut end piece 78 which is fastened to node 10 "C"s fin 30, other SEPs 78 shown without their associated struts 52 (graphic could be confusing to the viewer with all of the struts 52 shown).

Figure 24:
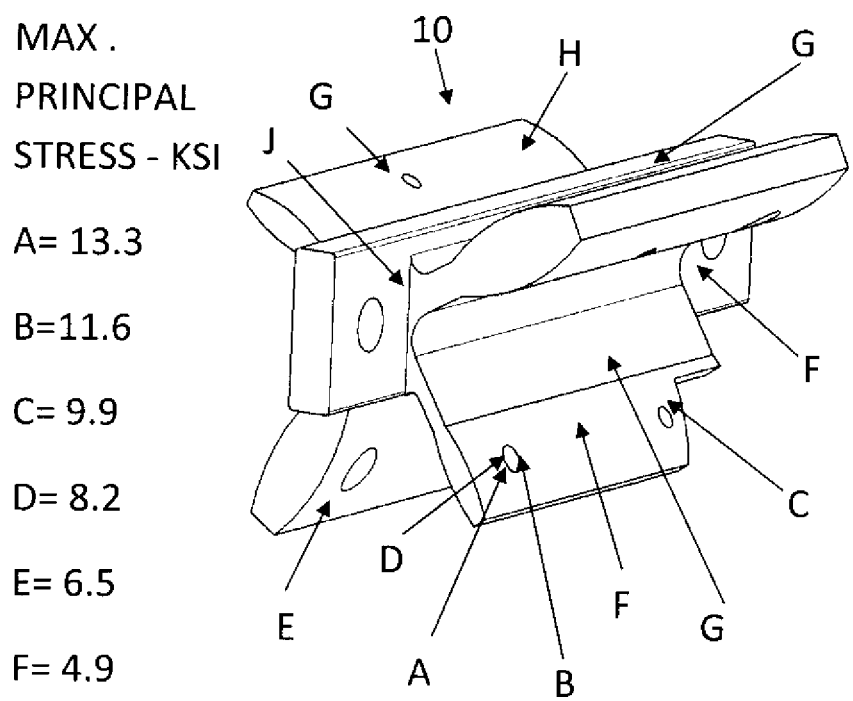
FIG. 24 shows a solid node 10 "C" FEA—Stress distribution—ISO view.

FIG. 24 shows a non-hollow (solid profile) node 10 "C" FEA—Stress distribution. The principal stress under part loading as expected in worst case use is shown; note that 19.4 KSI is allowable per Aluminum Design Manual 2010 design rules for the alloy/temper (6005/T5) in the example, utilizing appropriate safety factors. When compared to earlier design/patent work FEA's, this shows how much more efficient the non-hollow (solid profile) node 10 "C" is at carrying the axial loads. The worst case principal stress is less than or equal to the indicated stress.

Figure 25:
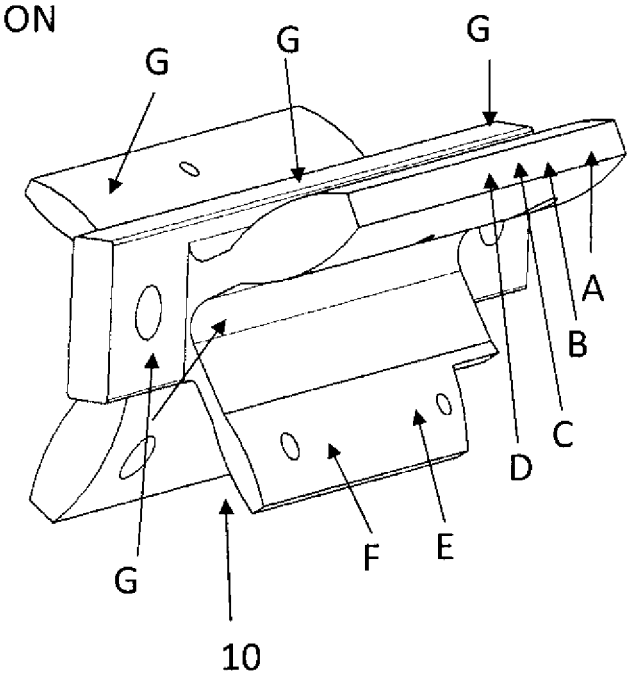
FIG. 25 shows a solid node 10 "C" FEA—Deformation—ISO view.

FIG. 25 shows a non-hollow (solid profile) node 10 "C" FEA—Deformation under part loading as expected in worst case use is shown. That is, the worst case deformation is less than or equal to the indicated deformation.

Figure 25B:
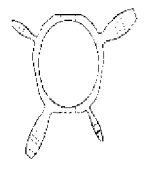
FIG. 25B is a chart comparing a solid node 10 and a hollow node 10 "C" designed to carry the same threes loading cases.
Figure 25B:
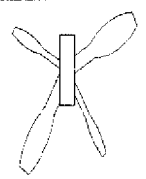

FIG. 25B is a chart comparing a non-hollow (solid profile) node 10 to a hollow node 10 designed to carry the same three loading cases. The top part of the chart shows a configuration of a hollow node 10, where the node 10 is designed to withstand maximum compressive or tensile loads on the fin 30 and node 10 ends 24 and 26 for three different loading cases: 1,000 lbs, 10,000 lbs and 20,000 lbs., where the hollow node utilizes a "through chord." The bottom part of the graph shows the 1,000 lbs, 10,000 lbs and 20,000 lbs loadings of a similar node 10 joint designed around a non-hollow (solid profile) node 10 concept. The node 10 was referenced as a "sleeve" in prior patent work (applicable to hollow nodes 10) and in this FIG. 25B text. This table shows how the newer design of frame with the non-hollow (solid profile) node 10 results in lower node 10 (sleeve) weights and extrusion circle sizes than what is possible with hollow node 10 designs. The resultant required sleeve (node 10) weight (lbs/ft), sleeve (node 10) circle size (in) [the smallest circumscribing circle which can surround the profile: smaller=able to be extruded on a smaller extruder=less expensive] and resulting approximate extrusion press size (billet diameter in inches) shows that the non-hollow (solid profile) node 10"C" is a design improvement over the hollow node 10 design. The table is an adaptation from an earlier WES patent application showing lightly loaded, medium loaded and very highly loaded strut 52 assemblies. Note that, for example, even for a node 10 designed to handle a maximum axial force of 10,000 lbs, the segmented chord 54 design can do so with a weight or only 7.3 lbs/ft. and a circle size of 6.3 in.-vs-the hollow node 10 design requirement of 9.8 lbs/ft and a circle size of 9.1 inches. For a 10,000 lb maximum axial force design, for example, the segmented chord 54/non-hollow (solid profile) node 10 "C" would require a 9" diameter extrusions press while the hollow node 10 design would require at least an 11" diameter press. There are MANY more 10" and smaller presses available than larger presses, allowing for more production flexibility and cost competitive pricing.

Figure 26:
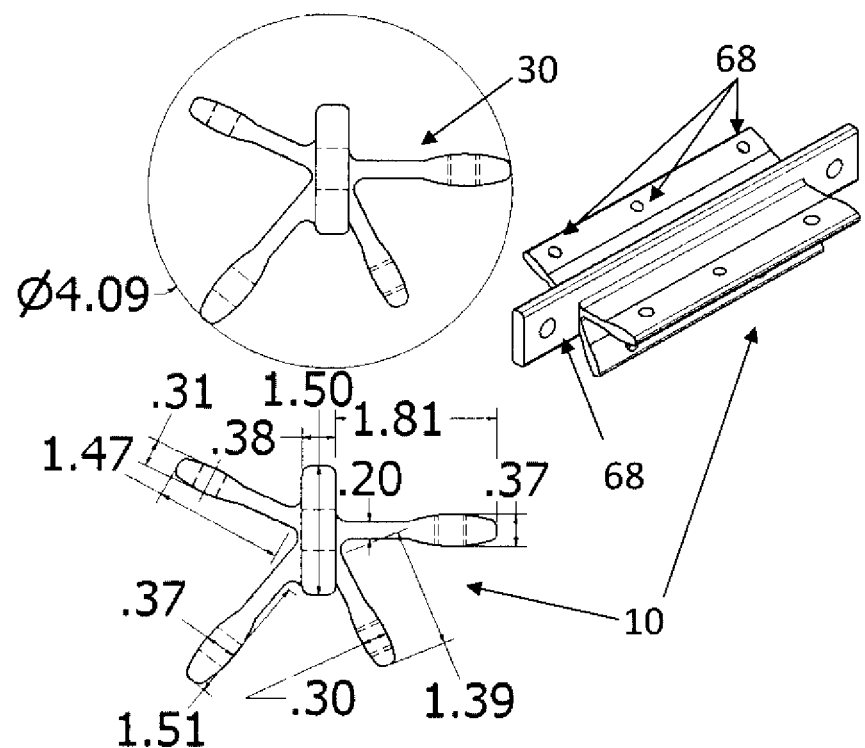
FIG. 26 shows an example of a 1,000 lb. capacity solid node 10 "C" with dimensions of various parts of the profile—ISO, and End views.

FIG. 26 shows an example of a 1,000 lb. capacity non-hollow (solid profile) node 10 "C" with dimensions of various parts of the profile in inches.

Figure 27:
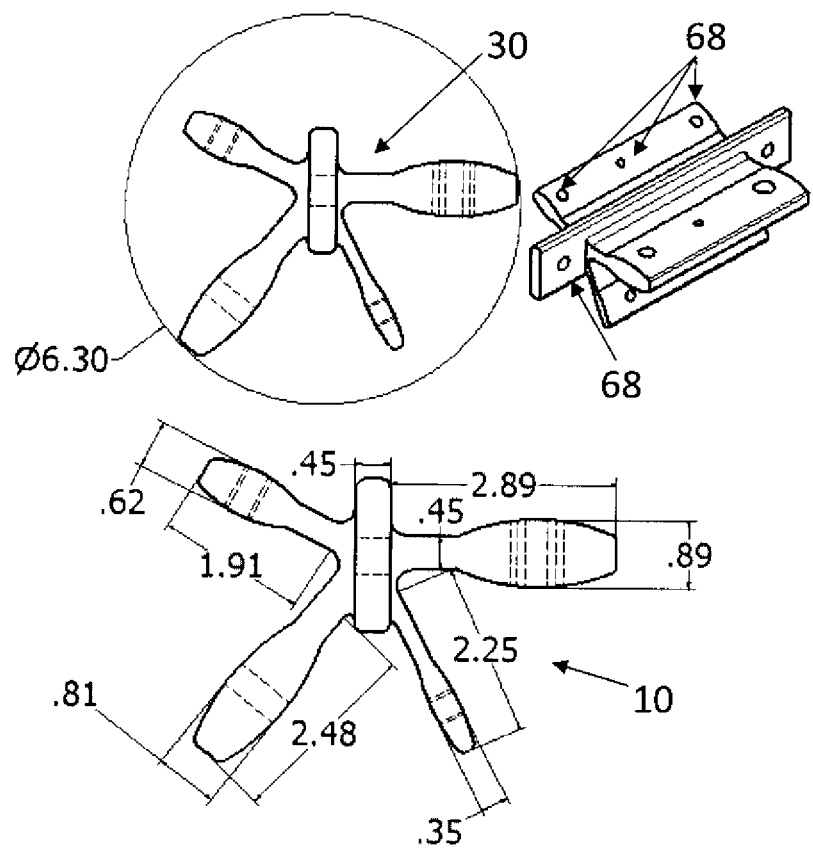
FIG. 27 shows an example of a 10,000 lb. capacity solid node 10 "C" with dimensions of various parts of the profile—ISO and end views.

FIG. 27 shows an example of a 10,000 lb. capacity non-hollow (solid profile) node 10 "C" with dimensions of various parts of the profile in inches.

Figure 28:
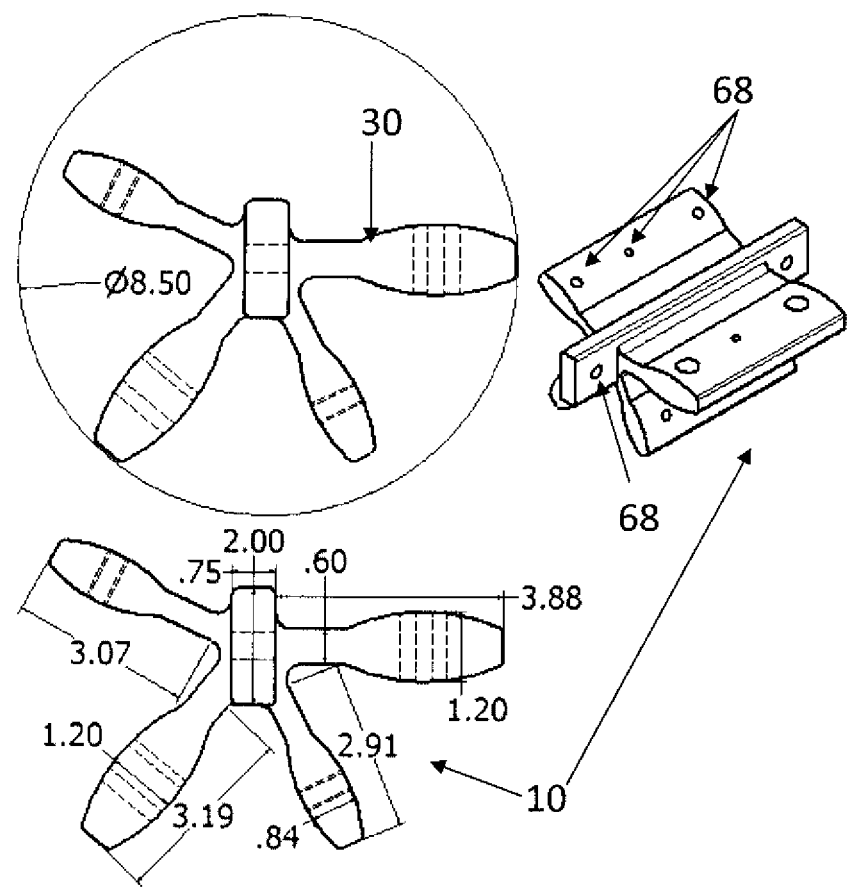
FIG. 28 shows an example of a 20,000 lb. capacity solid node 10 "C" with dimensions of various parts of the profile—ISO and end views.

FIG. 28 shows an example of a 20,000 lb. capacity non-hollow (solid profile) node 10 "C" with dimensions of various parts of the profile in inches.

Figure 29:
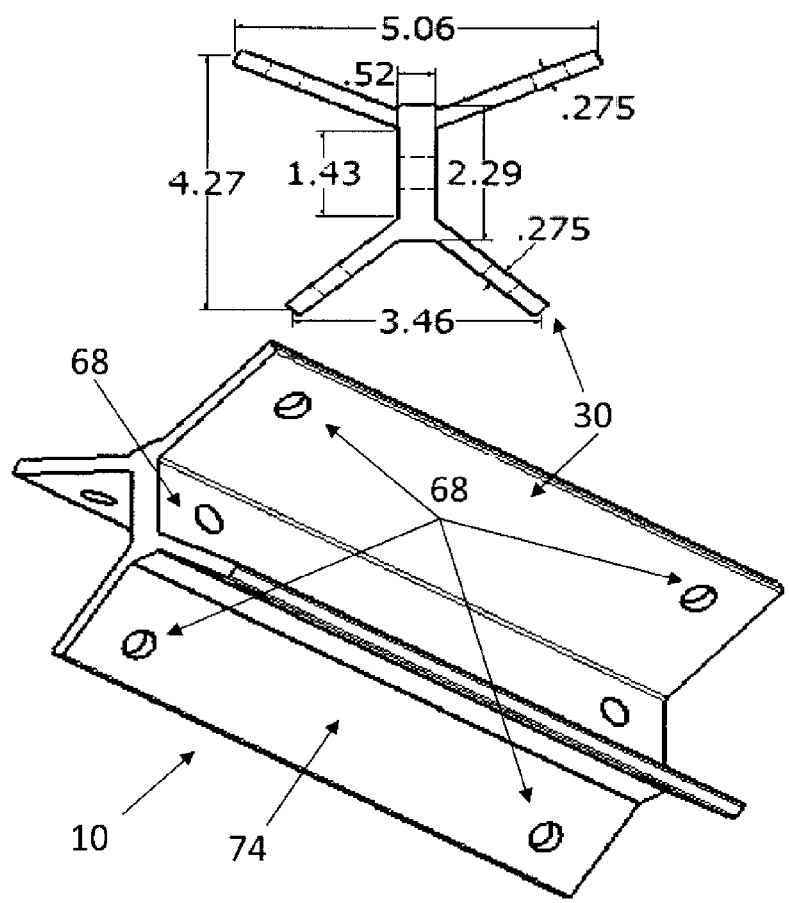
FIG. 29 shows a Solid Node 10 "D"—ISO and End views.

FIG. 29 shows a non-hollow (solid profile) Node 10 "D". This type of extruded profile will NOT require the node 10 "B" or "C" fabrication (removal of portions of the fins 30 to allow attachment of the chord end pieces 82 and 84 which were necessary for non-hollow (solid profile) nodes "B" and "C"). However, the lines of axial force from the struts 52 and segmented chords 54 will not necessarily, converge at a common point which can cause some induced loading (moments) in the part (node 10). Depending on the loads and profile design of the node 10, this may or may not be acceptable; if acceptable, this design would offer less fabrication costs than for non-hollow (solid profile) node 10 designs "B" or "C". The dimensions are in inches.

Figure 30:
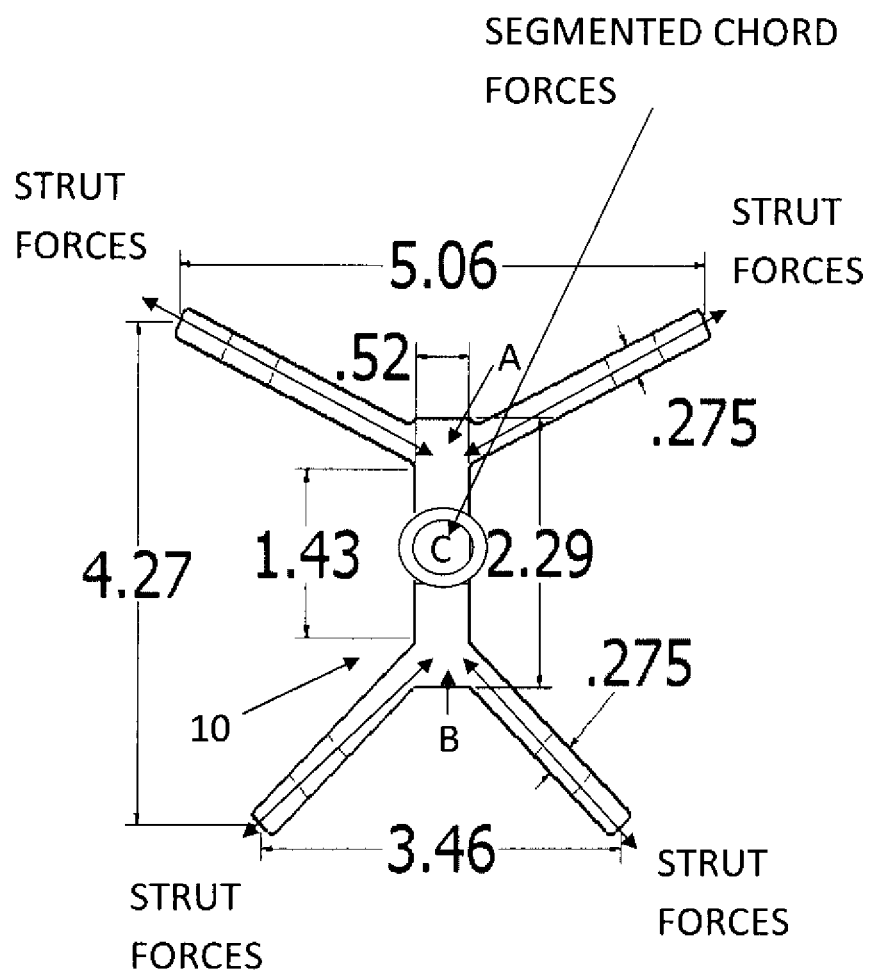
FIG. 30 shows a Solid Node 10 "D" showing strut 52 and segmented chord 54 axial forces, and showing dimensions (in) of the various parts of the profile—End Views.

FIG. 30 shows a Solid Node 10 "D" showing strut 52 and segmented chord 54 axial forces, and showing dimensions (in) of the various parts of the profile. This type of extruded profile will NOT require node 10 fabrication (removal of portions of the fins 30 to allow attachment of the chord end pieces 82 and 84 which were necessary for solid node "B" and "C". The lines of axial force from the struts 52 and segmented chords 54 will not, however, converge at a common point ("C") which can cause some induced loading (moments) in the part; NOTE: "C" shown in the FIG. 30 is the attachment axis of the segmented chords 54 (62 and 64)—NOTE: the axial forces shown on the solid node 10 fins 30 do NOT converge at this point—the forces from the upper fins 30 shown converging at point "A" while those of the lower fins 30 are shown as converging at point "B", neither of which are coincident with point "C". Depending on the loads and profile design of the node 10, this may or may not be acceptable; if acceptable, this design would offer less fabrication costs than for solid nodes "B" or "C". The dimensions are in inches.

Figure 31:
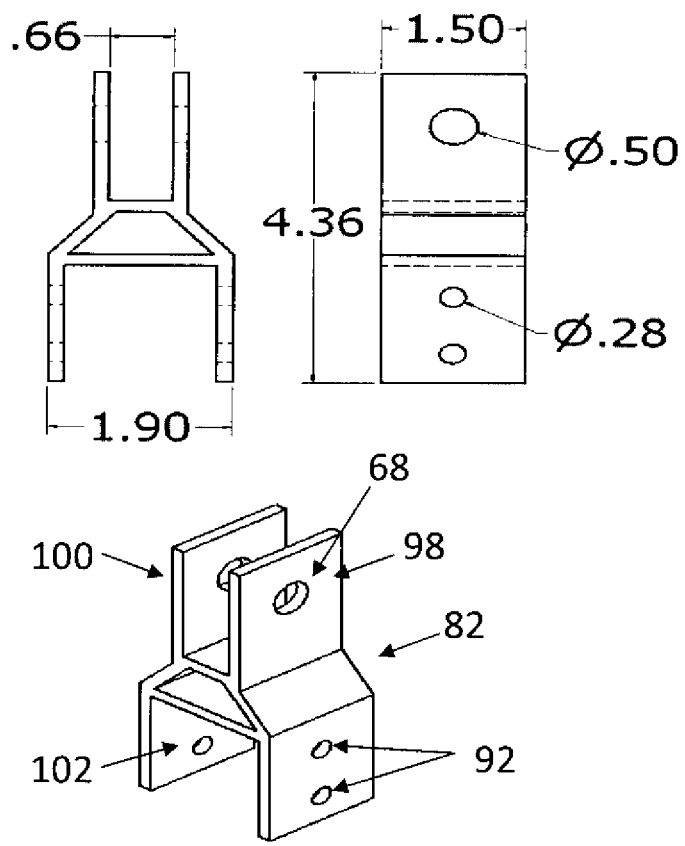
FIG. 31 shows a Strut End Pc (SEP) 78 for Solid Node 10 "D" segmented chord 54—ISO, End and Side views.

FIG. 31 shows a Strut End Pc (SEP) 78 for Solid Node 10 "D" segmented chord 54. The dimensions are in inches.

Figure 32:
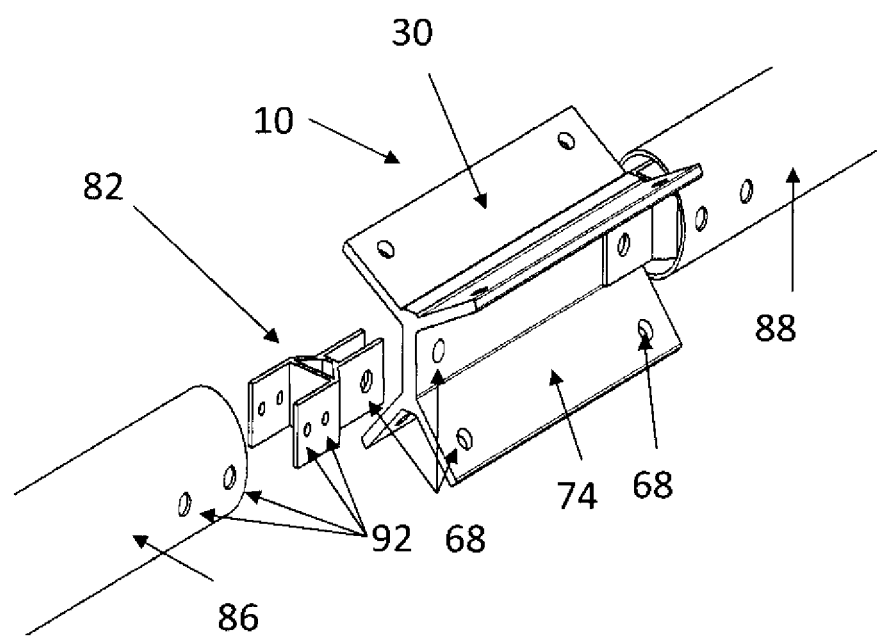
FIG. 32 shows a Solid Node 10 "D", SEP 78 (82 and 84), and strut 52 (86 and 88) assembly constructed from parts in FIGS. 29, 30 and 31—ISO view.

FIG. 32 shows a Solid Node 10 "D", SEP 78 (82), and strut (52/86 & 88) assembly.

Rolling Rib Drive Description

Use of "Rolling Rib" 34 drive system to dramatically improve CSP solar frame 18 system 32 performance (weight-vs.-optical accuracy):

CSP frames rely on extremely accurate optical alignment to yield high efficiency conversion of the sun's rays to heat, and thus to electricity. The alignment of the parabolic mirrors to the collection tube defines the optical accuracy, and this is affected by the frame design, frame deformation under wind loads and torque and mirror accuracy.

Frame designs are tested in a "VShot" device which compares the optical performance of the frame and mirror combination to ideal by using a laser and measuring the alignment of the reflection of the beam. At least one customer specifies the required optical alignment as "milliradians of slope error, RMS". WES checked with technical experts at NREL (the National Renewable Energy Lab), which runs VShot tests on various frames; it is confirmed that the following method of estimating expected optical performance would likely be consistent with their methodology, understanding and test methods:

WES designs the basic frame geometry and member sizing using Bentley Software's "Ram Elements" which enables a defined geometry to have member characteristics (weight/ft, Ix and Iy, material properties such as modulus of elongation, tensile strength, etc. . . . ) defined and modeled. Using the requirements of the ASCE-7 national code, a large number of different "load cases" and "load combinations" are modeled, with the resulting member maximum tensile, compressive and bending moments output, as well as the expected translations in the x & y directions for each node 10, and the rotations of the nodes 10 about the Z axis.

WES developed a mathematical way to calculate the expected slope error results which would result from various combinations of geometry, frame design and member sizing of all members of the frame; "shells" are utilized to model the effect of the parabolic mirrors themselves on the overall frame/mirror system. The results of these models and analyses allows us to compare various designs to determine the member sizing and thus overall frame weight (critical to the overall frame cost) as well as the optical performance (mRad slope error RMS).

The Ability to Run a Great Variety of Different Models and Quickly Estimate the Weight and Optical Accuracy LED to a Critical Finding which can be Summarized as Follows:

While the deflection of the frame/mirror system from wind load blowing normal to the mirror surface certainly has a large effect on the resulting optical accuracy of the system, the LARGEST effect occurs from the APPLIED torque resulting from a frame attached to the rotational drive mechanism 36 withstanding the resulting torque that the wind causes on the attached frames. Most existing systems (the SEGS field in CA and Nevada Solar One, for example), utilize a central drive for 8 or 10 frames in a row. The drive unit rotates the frame attached to it, which in turn rotates the 1-5 other frames it is attached to. The frame closest to the drive must thus withstand the torque of MULTIPLE frames being affected by the wind and weight loading conditions and combinations. THIS LARGE APPLIED TORQUE HAS A VERY DETRIMENTAL EFFECT ON THE OPTICAL ACCURACY.

Once the critical importance of the applied torques from subsequent frames was understood, WES went back to our $2^{nd}$ patent application dealing with the "Rolling Rib" 34 and decided that besides the reduction in deflection from the rolling rib 34 support, the "rolling rib drive mechanism 36" disclosed in this patent was perhaps even more important. Frame designs were revisited using a single rolling rib 34 intended ONLY to allow EACH frame to be driven from the center, "rolling rib" 34, reducing the torque effects greatly, as the torque is only induced from the center, rolling rib 34 to the ends of the frame, ½ the length of the frame. This is in GREAT contrast to, for example, a 10 frame drive where the innermost frames next to the drives are faced with enduring 4 TIMES THE TORQUE OF AN INDIVIDUAL FRAME, added as applied torque, which ADDS to the existing torque of the single frame, driven from one end (a full 1× the length of the frame).

Simply put—the use of the rolling rib 34 drive mechanism 36, whether individually driving frames from the center "rolling rib" 34 of each frame or driving "torque tubes" 121 which can drive several frames in a row, GREATLY reduces the slope errors induced-vs.-the use of one frame driving the next, driving the next, . . . . etc. . . . . .

As an example, using the same wind loads and idealized tubes:

A rolling rib 34 frame 32 weighing 1,050 lbs has a projected slope error of 2.73 mRad RMS.

A similar frame 32, without rolling rib 34, weighing 1,210 lbs has a projected slope error of 4.75 mRad RMS.

A similar frame 32, without rolling rib 34, driving 4 other frames 32 attached to it weighs 1,210 lbs and has a projected slope error of 6.60 mRads RMS.

A different geometry and member configuration of solar frame 32 weighs 808 lbs. and achieves 2.749 mRad RMS without a rolling rib 34 but weighs 782 lbs and achieves 2.173 mRad RMS with a rolling rib 34 drive 36.

What Differentiates this Concept/why is it Valuable?

Rolling Rib 34 Drive 36

Optical efficiency measured by "slope error" in milliRadians RMS.

Extensive structural analysis and analysis of resulting deflection (translation and rotation) data from the structural analysis software demonstrated how the applied torque of one frame 32 driving another leads to much poorer optical efficiency.

Incorporating the rolling rib 34 rack/pinion (or other means) of frame rotation from the $2^{nd}$ WES patent enables each frame 32 to be driven from one or more positions (center, one end, both ends, . . . )

This GREATLY reduces mRad RMS slope error as the deformation of each frame 32 is NOT related to stresses from trying to turn adjacent frames.

Multiple frames 32 can be driven from a single drive using a "torque tube" 121 (likely a larger diameter (8-15") steel tube transferring the torques to the rolling rib 34 drives 36).

Figure 33:
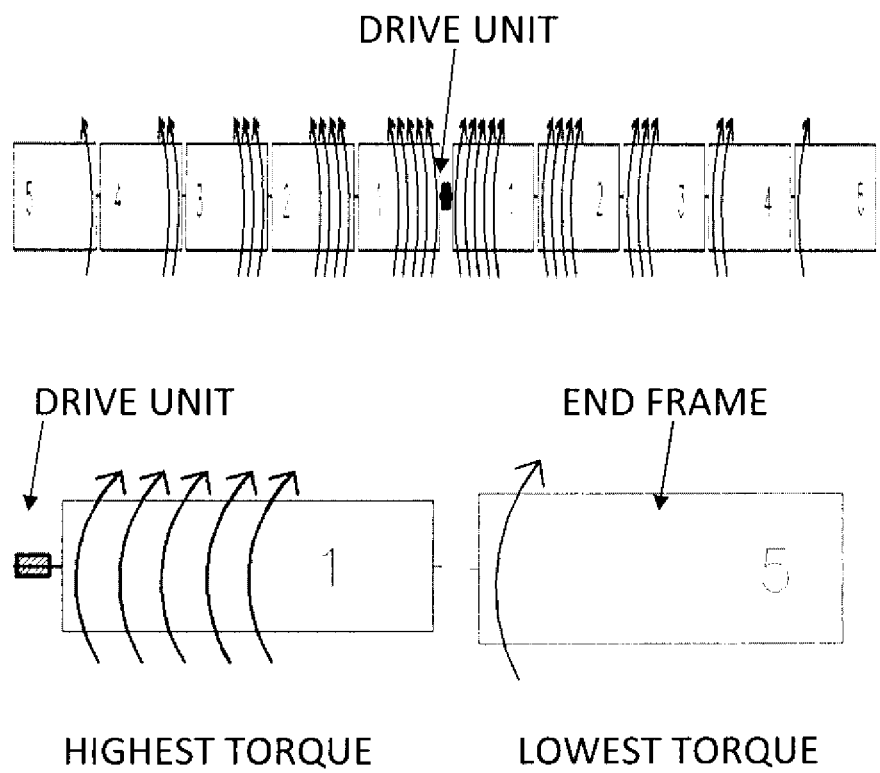
FIG. 33 shows a frame assembly 32 showing which solar frame 18 has the highest & lowest torque based on the position of each frame-vs-the drive unit—Side views.

FIG. 33 shows a frame assembly 32 showing which solar frame 18 system 32 has the highest & lowest torque based on the position of each frame 32-vs.-the drive unit. The solar frames 18 labeled as 1 are closest to the drive mechanism. They are held/rotated by the drive mechanism attached to the torque plate 125 and thus subjected to the torque from all 5 frames. The solar frames 18 labeled as 4, in contrast, are held and rotated by the solar frames 18 labeled as 3 and thus subjected to the torque from both the solar frames 18 labeled 4 and 5. The solar frames 18 labeled as 5 are furthest from the drive and subject to the torque loads from wind and other sources, and are held/rotated by the next solar frames 18 labeled 4; Solar frames 18 labeled 5 are thus subjected ONLY to the torques from themselves. Increasing levels of torque create additional deflections, which in turn result in optical inaccuracies (measured as mRadians of "slope error") on the solar reflectors 20 being supported by the system (supporting reflectors) 32.—Top view.

Figure 34:
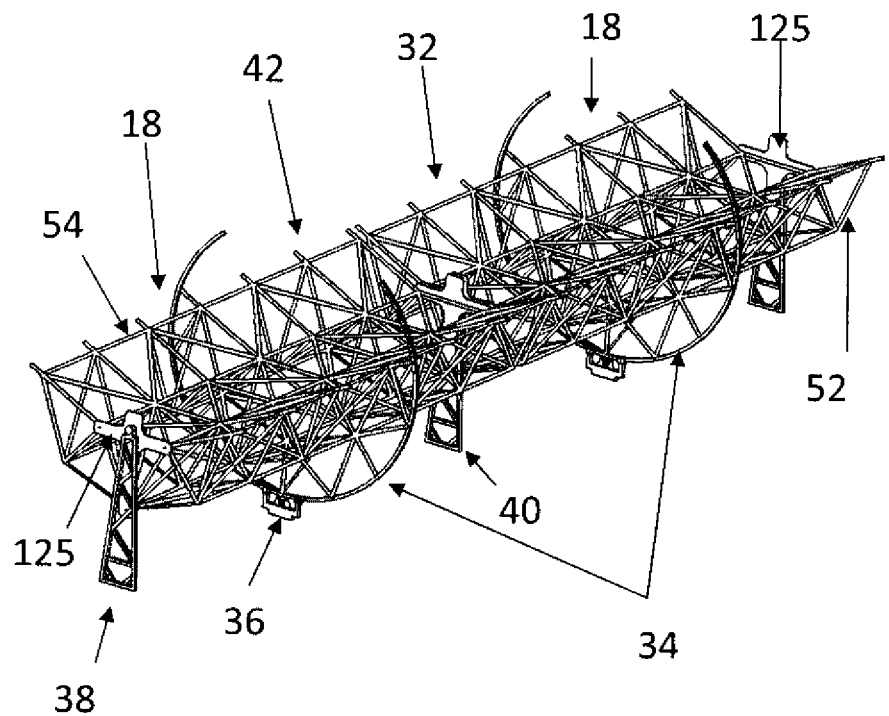
FIG. 34 shows two solar frames 18 with rolling ribs 34 mid-span of each solar frame 18 mounted on pylons 38 and 40—ISO view.

FIG. 34 shows two solar frames 18 showing a rolling rib 34 mid-span of each solar frame 18—ISO view. Each frame system 32 is simply supported on the pylons 38 and 40 using torque plates 125 on each end of each frame system 32. In this graphic, each is NOT driven physically by the frame 32 next to it, but is instead rotated by a drive mechanism 36 acting on the rolling rib 34, which is, for example, a modified I-beam bent into the same radius, sharing the same rotational center as the solar frame system 32 (see the WES prior patent describing this for a full description). The bent beam is configured to be supported via rolling rib rollers 127, and a mechanism 36 such as a bent rack and pinion or sprocket arrangement with chain fixed on either end of the rolling rib 34 tips is used to rotate the frame system 32—ISO view.

Figure 35:
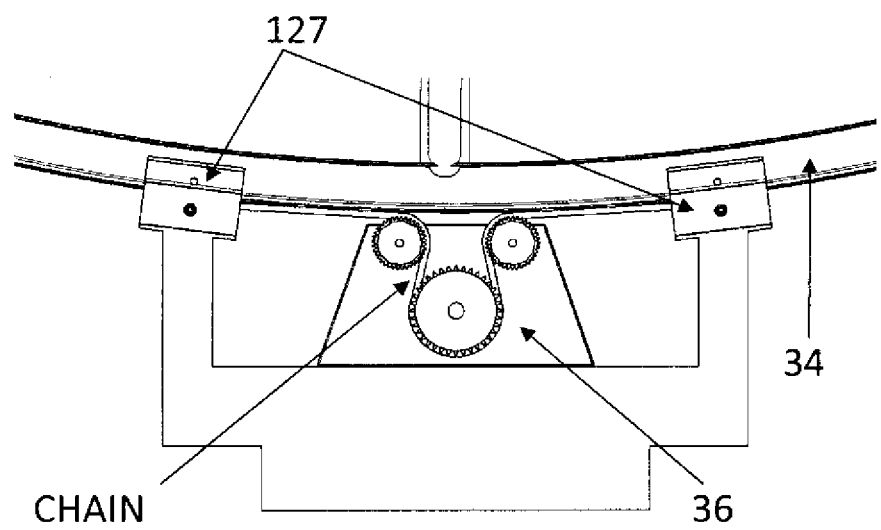
FIG. 35 shows a rolling rib 34 drive mechanism 36 showing a large drive sprocket and smaller idler sprockets—End view.

FIG. 35 shows a rolling rib 34 drive mechanism 36 showing a large drive sprocket and smaller idler sprockets (chain as dotted line). Rolling rib rollers 127 supporting the bent rolling rib 34 are show with their center pins only.—End view.

Figure 36:
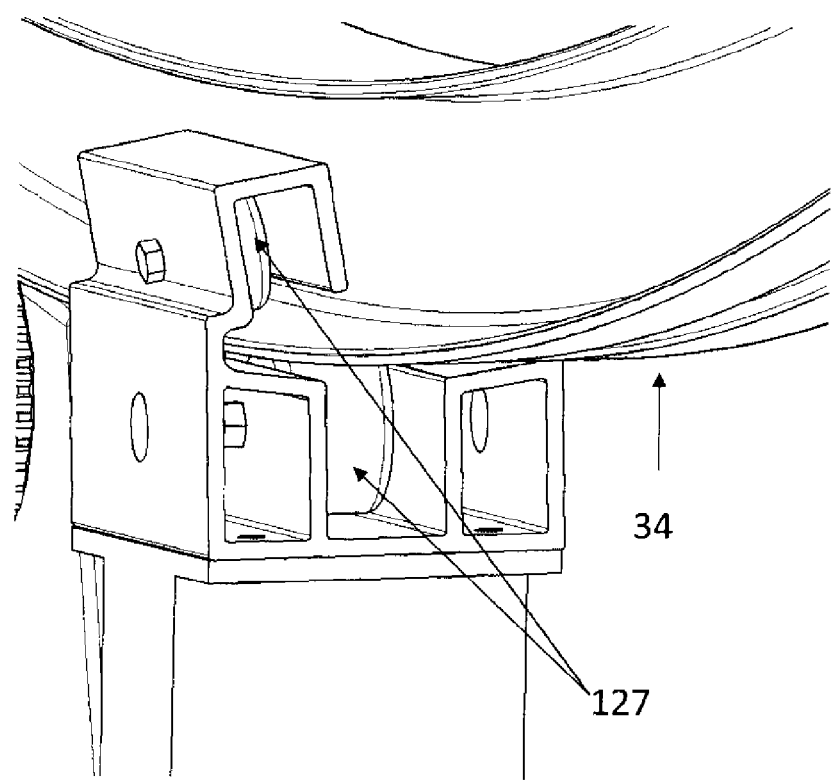
FIG. 36 shows support rollers in a roller housing supporting the curved rolling rib 34.—ISO view.

FIG. 36 shows rolling rib rollers 127 in a roller housing supporting the curved rolling rib 34.—ISO view.

Figure 37:
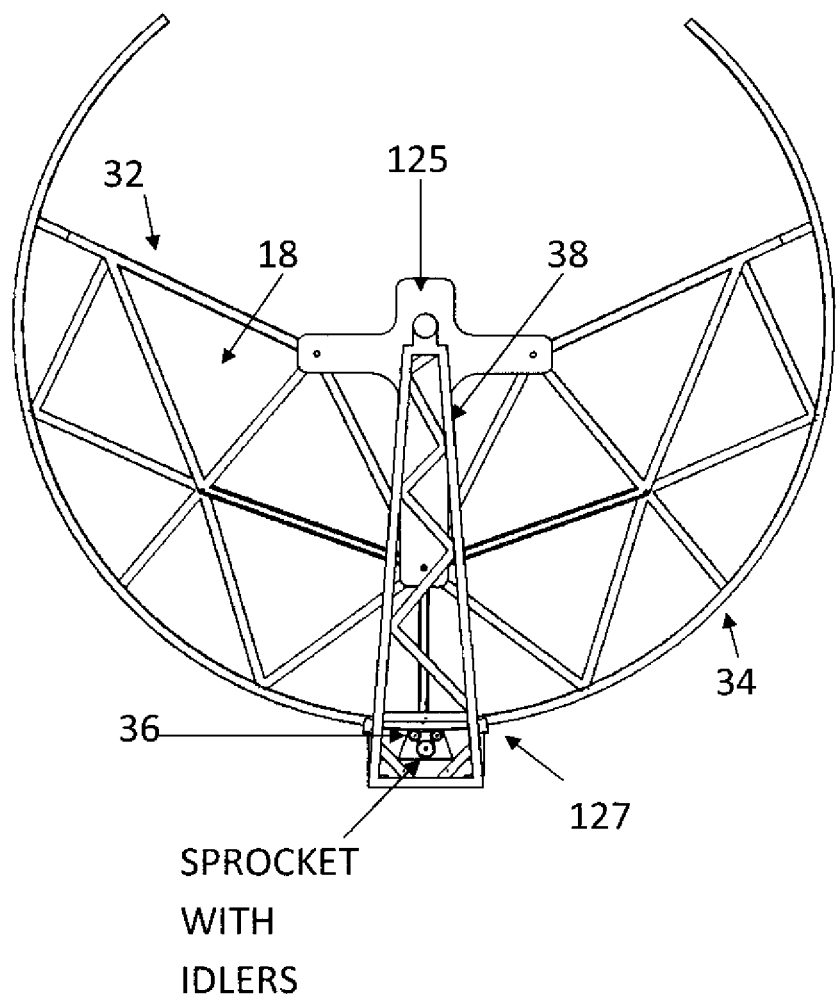
FIG. 37 shows a rolling rib 34, solar frame 18 and solar frame system 32 with support rollers and a drive mechanism 36—End view.

FIG. 37 shows a rolling rib 34, solar frame 18 and solar frame system 32—end view with rolling rib rollers 127 and a drive mechanism 36. The solar frame system 32 is attached to the torque plates 125 which in turn rotate on bearings of the pylons 38 and 40. Extra struts 52 are shown attaching the rolling rib 34 to the solar frame system 32—End view.

Figure 38:
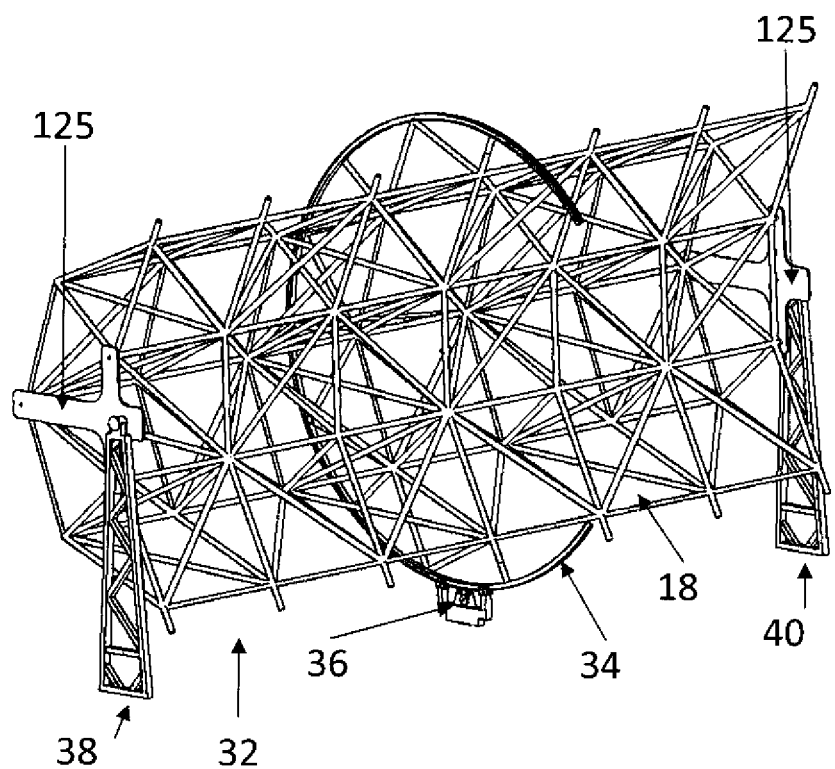
FIG. 38 shows a solar frame system 32 and a single rolling rib 34 with the frame rotated so that the solar reflectors 20 would face the horizon—ISO view.

FIG. 38 shows a solar frame system 32 and a single rolling rib 34 with the frame rotated so that the solar reflectors 20 would face the horizon—ISO view. Also shown: pylons 38 & 40, torque plates 125 and drive mechanism 36 and extra struts 52 attaching the rolling rib 34 to the solar frame system 32.

Figure 39:
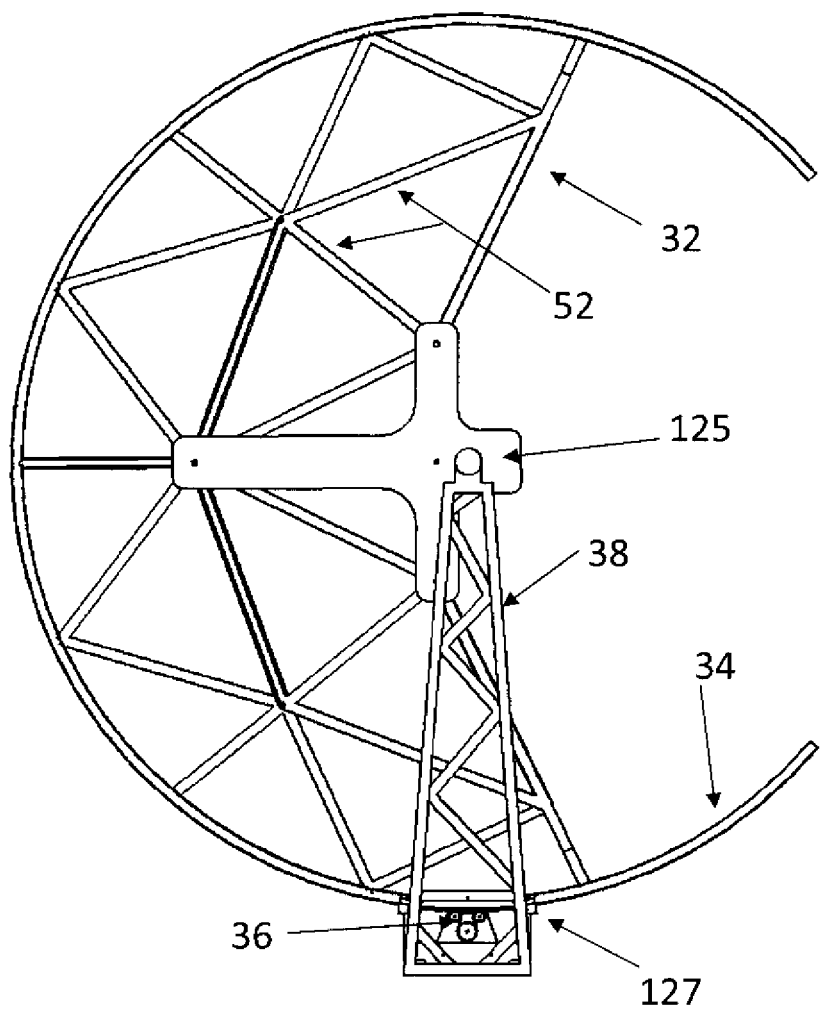
FIG. 39 shows a solar frame system 32 and rolling rib rotated so that the solar reflectors 20 would face the horizon—End view.

FIG. 39 shows a solar frame system 32 and rolling rib rotated so that the solar reflectors 20 would face the horizon—End view. Also shown: one end pylon 38, torque plate 125, rolling rib 34, struts 52, rolling rib rollers 127, drive mechanism 36 and extra struts 52 attaching the rolling rib 34 to the solar frame system 32.

Figure 40:
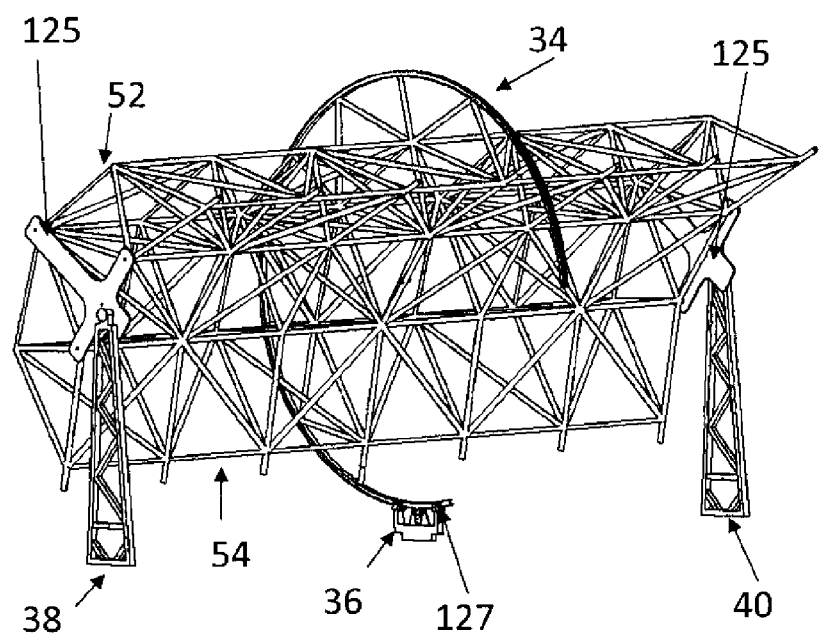
FIG. 40 shows a solar frame system 32 and rolling rib 34 in stow position—ISO view.

FIG. 40 shows a solar frame system 32 and rolling rib 34 in stow position—ISO view. Also shown: pylons 38 & 40, torque plates 125, strut 52, segmented chord 54, rolling rib rollers 127, drive mechanism 36 and extra struts 52 attaching the rolling rib 34 to the solar frame system 32.

Figure 41:
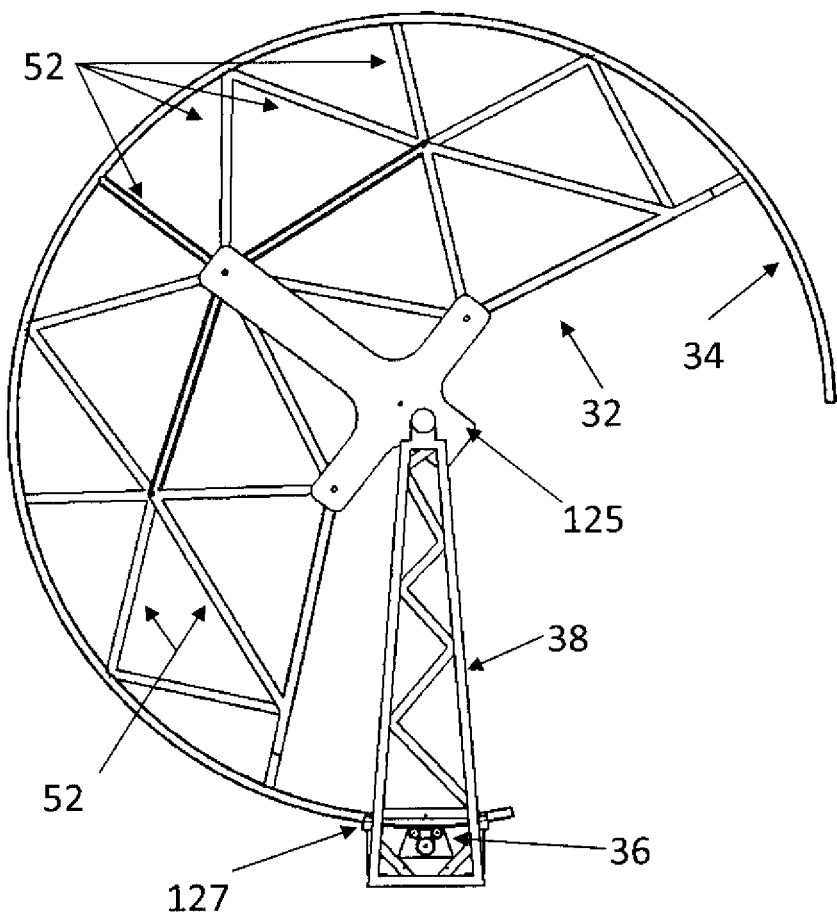
FIG. 41 shows a solar frame system 32 and rolling rib 34 in stow position—End view.

FIG. 41 shows a solar frame system 32 and rolling rib 34 in stow position—End view. Also shown: pylon 38, torque plate 125, struts 52, rolling rib rollers 127, drive mechanism 36 and extra struts 52 attaching the rolling rib 34 to the solar frame system 32.

Figure 42:
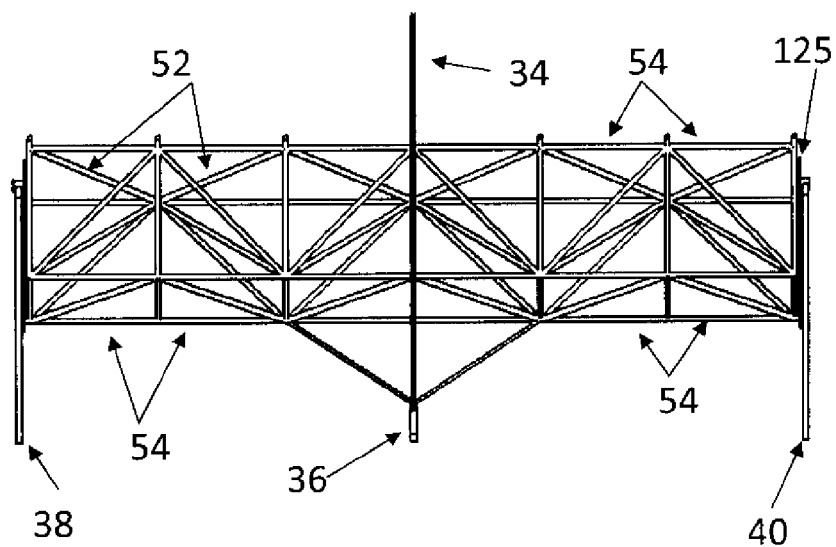
FIG. 42 shows a solar frame system 32 and rolling rib 34—Side view.

FIG. 42 shows a solar frame system 32 and rolling rib 34—side view. Also shown: pylons 38 and 40, struts 52 and segmented chord 54 and drive mechanism 36 and extra struts 52 attaching the rolling rib 34 to the solar frame system 32.

Figure 43:
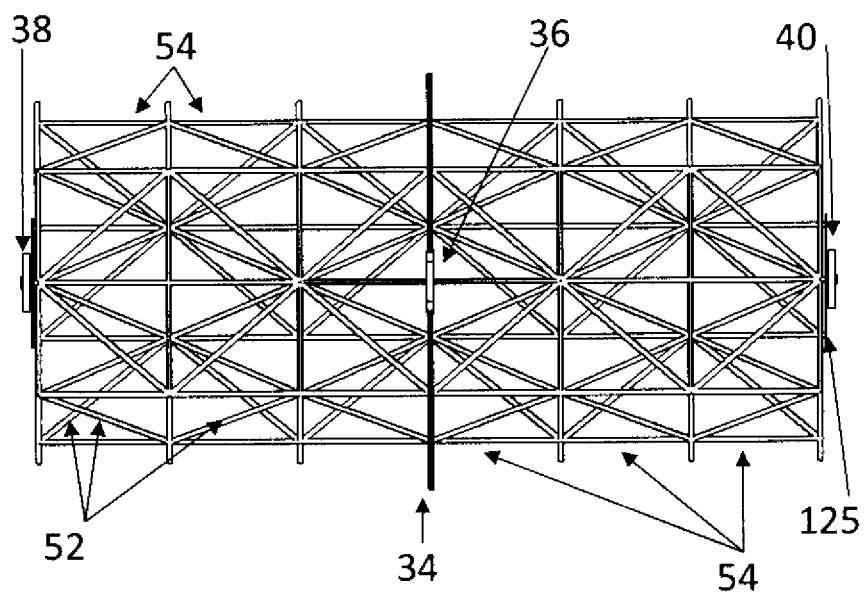
FIG. 43 shows a solar frame system 32 and rolling rib 34—Bottom view.

FIG. 43 shows a solar frame system 32 and rolling rib 34—bottom view. Also shown: pylons 38 and 40, torque plates 125, struts 52, segmented chords 54 and extra struts 52 attaching the rolling rib 34 to the solar frame system 32.

Figure 44:
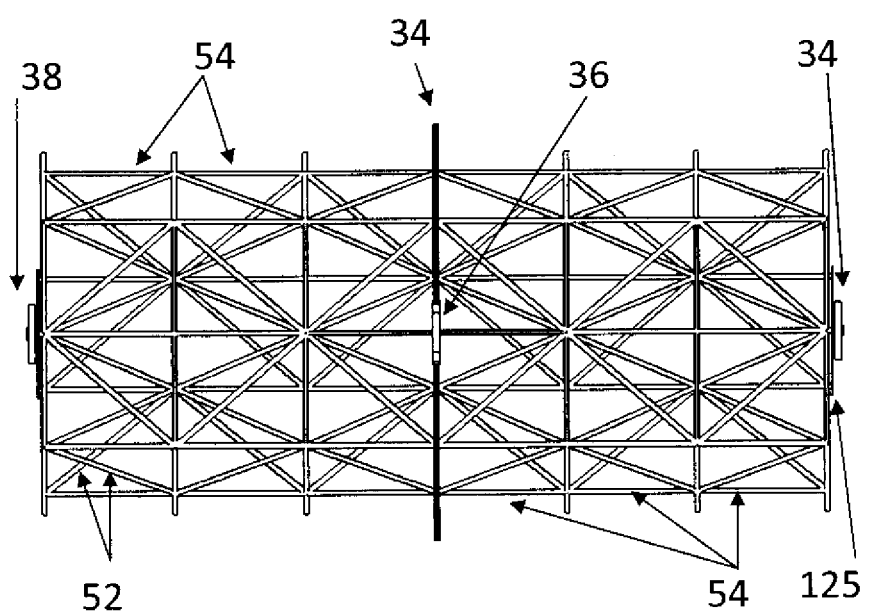
FIG. 44 shows a solar frame system 32 and rolling rib 34—Top view.

FIG. 44 shows a solar frame system 32 and rolling rib 34—top view. Also shown: pylons 38 and 40, torque plates 125, struts 52, segmented chords 54 and extra struts 52 attaching the rolling rib 34 to the solar frame system 32.

Figure 45:
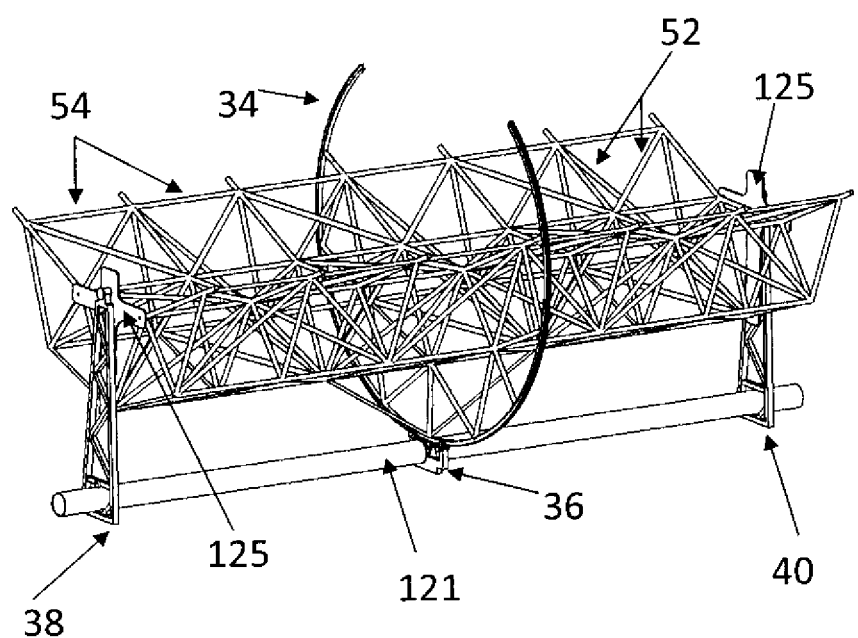
FIG. 45 shows a solar frame system 32 and rolling rib 34 with torque tube drive 121 which could link and drive multiple frame systems 32 to a single drive mechanism 36—ISO View.

FIG. 45 shows a solar frame system 32 and rolling rib 34 with torque tube drive 121 which could link and drive multiple frame systems 32 to a single drive mechanism 36—ISO View. Also shown: pylons 38 and 40, torque plates 125, struts 52, segmented chords 54 with drive mechanism 36 driven by the torque tube 121 (a drive 36 can also be used to power the torque tube 121); the torque tube 121 transfers the torque/power between solar frames systems 32 and extra struts 52 attaching the rolling rib 34 to the solar frame system 32.

Figure 46:
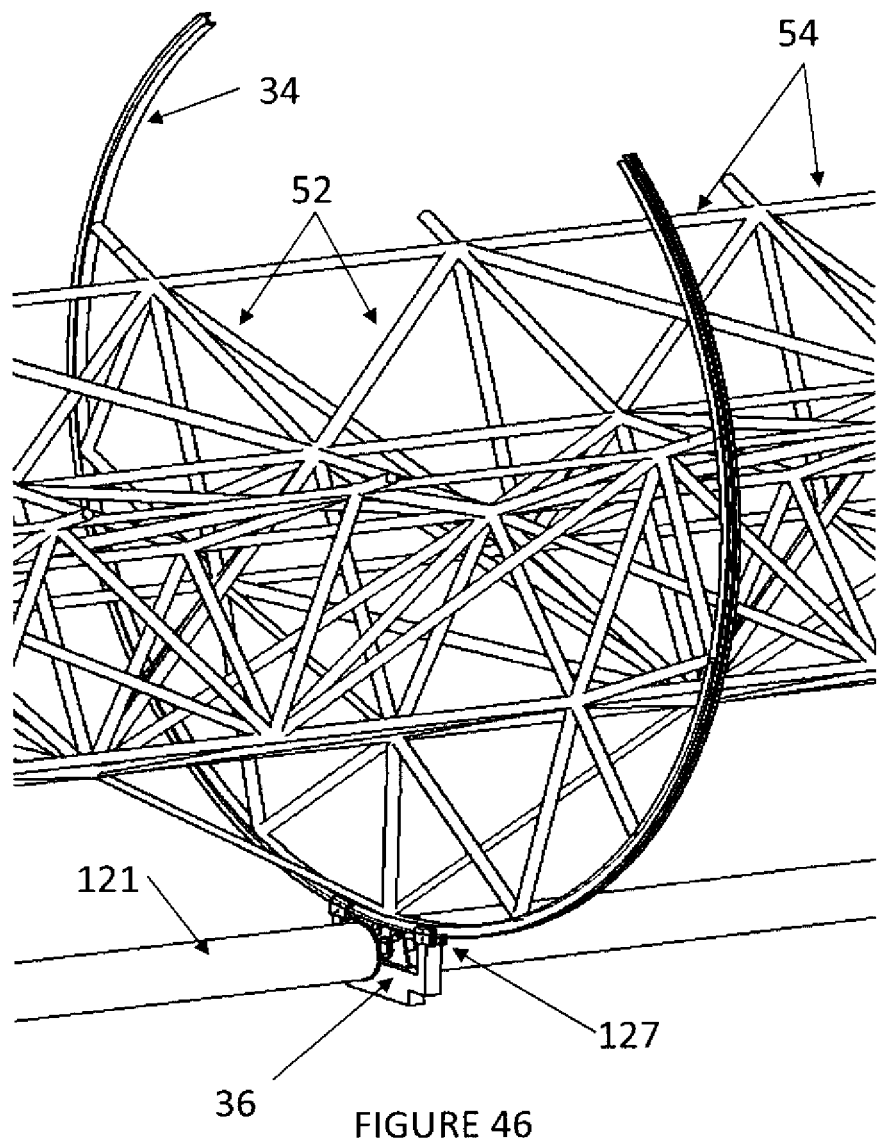
FIG. 46 shows a solar frame system 32 and rolling rib 34 with torque tube drive 121 which could link and drive multiple frame systems 32 to a single drive mechanism 36—closeup ISO View.

FIG. 46 shows a solar frame system 32 and rolling rib 34 with torque tube drive 121 which could link and drive multiple frame systems 32 to a single drive mechanism 36—closeup ISO View. Also shown: rolling rib rollers 127, struts 52, segmented chords 54 and drive unit 36 driven by the torque tube 121 and extra struts 52 attaching the rolling rib 34 to the solar frame system 32.

Figure 47:
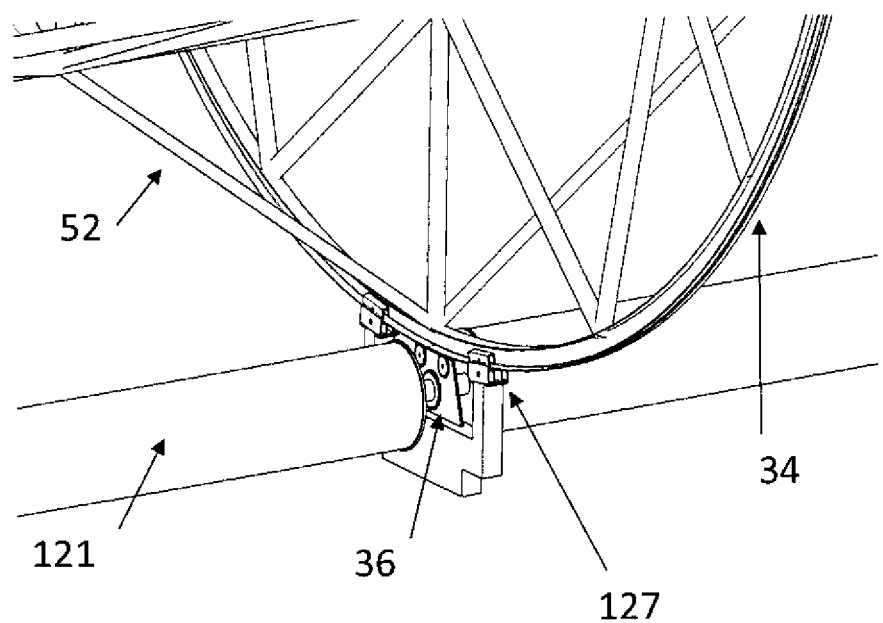
FIG. 47 shows a solar frame system 32 and rolling rib 34 with torque tube 121 and drive 36 which could link and drive multiple frame systems 32 to a single drive mechanism 36—detailed—ISO view.

FIG. 47 shows a solar frame system 32 and rolling rib 34 with torque tube 121 and drive 36 which could link and drive multiple frame systems 32 to a single drive mechanism 36—ISO detail. Also shown rolling rib rollers 127, extra struts 52 attaching the rolling rib 34 to the solar frame system 32; note that there is a stabilizing strut 52 shown supporting the rolling rib 34 longitudinally.

Figure 48:
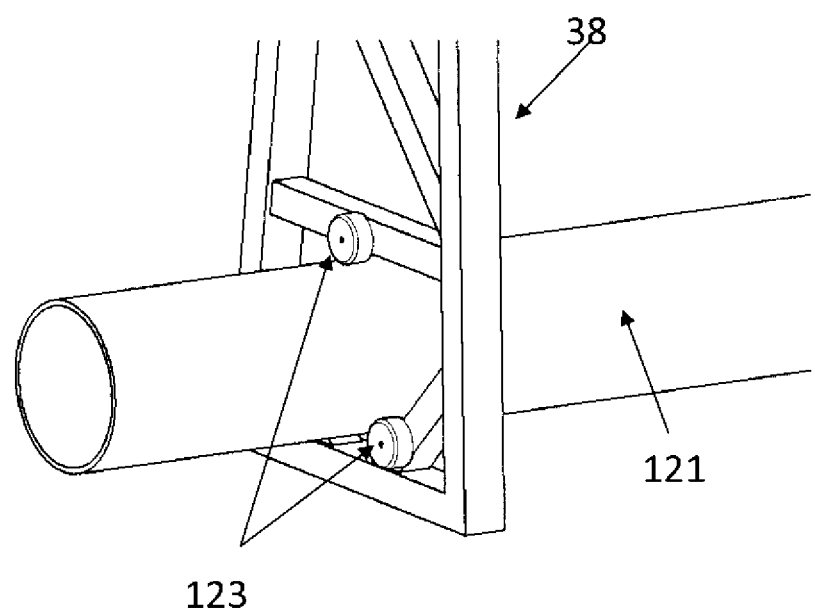
FIG. 48 shows a pylon 38 or 40 supporting a torque tube 121 which could link and drive multiple frame systems 32 to a single drive mechanism 36 with rollers 123, acting to stabilize and support the torque tube 121—ISO view.

FIG. 48 shows a pylon 38 or 40 supporting a torque tube 121 which could link and drive multiple frame systems 32 to a single drive mechanism 36 with torque tube rollers 123, acting to stabilize and support the torque tube 121.

Figure 69:
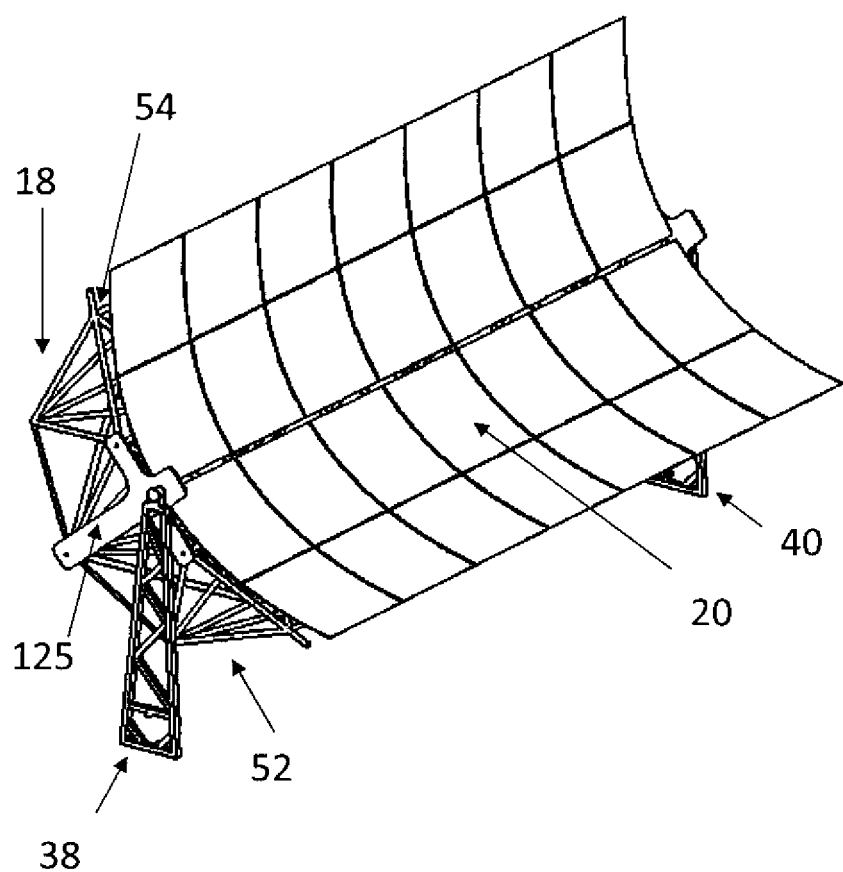
FIG. 69 shows an assembled frame 18 system supporting reflectors 32 shown mounted on pylons 38 and 40—ISO view.

Torque Plate Mechanics-Vs.-Rolling Rib 34:

Referring to FIG. 34, ignoring the rolling rib 34 in the figure: conventional parabolic trough CSP fields are composed of a drive unit, onto each end of which frames 32 are mounted via their torque plates 125 @ the pylons 38/40 (see FIGS. 34 and 69). Each of these frames 32 is, in turn, supported at the other end by a pylon 38/40 connected to another frame 32 supported from the same pylon 40/38. The frame 32 nearest the drive is rotated by the drive mechanism 36; this frame 32 in turn, via its connection by torque plate 125 to the next frame 32 rotates it, etc. across 1, 2, 3, 4, 5, 6 or more frames on either side of the drive; this can be seen clearly in FIGS. 33 and 34.

The "crosses" seen above in FIG. 34 (torque plates 125) are simply included to hang the frame from; the torque plates 125 are inserted into a bearing on top of each pylon 38/40. Without the rolling rib 34, the torque plates 125 would transfer the torque from frame 32 to frame 32 across the pylons 38 or 40. These torque plates 125 will likely be constructed of steel fabrications and will weigh perhaps 200 lbs. Torque plates 125 meant to transmit torque from one frame 32 to another do this via steel tubes connected to the portion of the torque plate 125 inserted in to the pylon bearing and then to the next frame's torque plate 125; depending on the number of frames to be driven, these fabricated steel torque plates 125 could weigh 800 or more lbs each (1,600+ lbs/frame). Using the rolling rib 34 substantially reduces the loads (torque) that these torque plates 125 must withstand, reducing the material required for these torque plates 125 and saving on material costs.

The rolling rib 34 drive separates motive force used to turn the parabolic mirror frame 32 from these torque plates 125 to one or more driven rolling ribs 34/frame 32 (see these in portion of FIG. 34). By doing this, the torque plates 125 can be much lighter and most importantly, the member loading and resulting slope error deflections greatly reduced.

Assembly Methods for Segmented Chord 54/Fabricated Node 10 Designs and Conventional "Through Chord" Solar Frame Systems 32:

The segmented chord 54 design and associated nodes 10 allows an innovative approach to field construction of the frame. For the frame design shown in FIGS. 49 to 68 (5T5B (and similar other designs)), the 3D frame design can take the form of full or partial "slices" of the frame (see the cross section in FIG. 51 for example) which can then be joined via struts 52 and perhaps segmented chords 54 to the connection nodes 10. "Partial slices" can even be as simple as having an area onto which the horizontal beams and slanted beams are hung, allowing the assemblers to construct the frame "top down".

This concept allows the "slices" to be fabricated and assembled in a factory setting (including the attachment of the uprights onto which the mirror support rails fit)—whether the slices are "full" or even just very partial (for example, beams with mirror support rail bracketry attached). It will be more efficient and effective to manufacture these in a factory setting-vs-full field assembly of the frame 32 and various components. The "factory" may be a nearby building or even just a shaded region with associated fixturing and power (compressed air and/or electric) as needed. The intent would be to take the preassembled "slices" or partial slices to the field for assembly and then to suspend the slices from a "strongback"; the slices would be hung loosely from the "strongback" and could be slid laterally to allow fastening of the strut 52 assemblies and segmented chords 54 (see FIG. 50).

The strut assemblies could be fabricated and assembled in this "factory" or at the extrusion or main fabrication/assembly center. The strut end pieces 78 are cut to length as is the strut 52 and segmented chord 54 and end piece 78. The strut end pieces 78 and struts 52 are slid together on a fixture and clamped; chord attachment holes 92 are then made and fasteners 80 inserted and fastened to join the strut end pieces 78 to the strut "body". This 3 piece rigid assembly is then drilled in a precision fixture, ensuring that the hole-to-hole distance of the entire strut assembly is as accurate as possible when fabricating fastener holes 68. See FIG. 58 for a graphic depicting this and FIG. 59 for an alternative means of accomplishing this.

The "slices", fasteners 80, strut end pieces 78, mirror support rails, collector tube supports and mirrors 20 are transported to the field, where they can then be assembled into the solar frame 18 and attached mirrors (see FIGS. 51 to 57).

The sequence would thus be to fabricate and assemble the strut assemblies and the "slices" of the solar frame 18. The slices would be hung onto the "strongback" and the strongback moved and hung from the "C-shaped" Support Structure. The worker carts (See FIGS. 55-57) would then be moved into and out of the various positions, allowing the workers to reach the various assembly node 10 points. When the entire frame is completed, the strongback would then be lifted off the "C-shaped" Support Structure and brought to the field to be mounted on the pylons or put into storage for later mounting. The next pylon would be immediately moved onto the "C-shaped" Support Structure so that the assembly workers could continue their assembly task on the next frame.

Assembly Method for Strut Only CSP Frame

Designs utilizing "through chords" often have the chords the full length of the solar frame 18 (8, 12 or even more meters long).

Handling these chords is cumbersome and expensive.

The equipment to fabricate these chords (create chord attachment holes 92 through drilling, punching or other means, etc. . . . ) is large and expensive.

In assembling the frames using "through chords", it is possible to machinate the process (see "ASSEMBLY METHOD FOR A CONVENTIONAL "THROUGH CHORD" CSP FRAME DESIGN" including FIGS. 60-68).

Handling, fabricating and assembly solar frames with "Segmented Chords" is easier, better ergonomically and less expensive.

Some geometries allow cross sectional "slices" to be factory assembled and then joined with struts 52 in the field more efficiently.

It can be much more effective to fabricate and assembly these "slices" in a factory environment, even one adjacent to the field assembly area, rather than completely in the field.

The assembly area for the "segmented chord" system can be even simpler than that which were developed for the "through chord" system.

Figure 49:
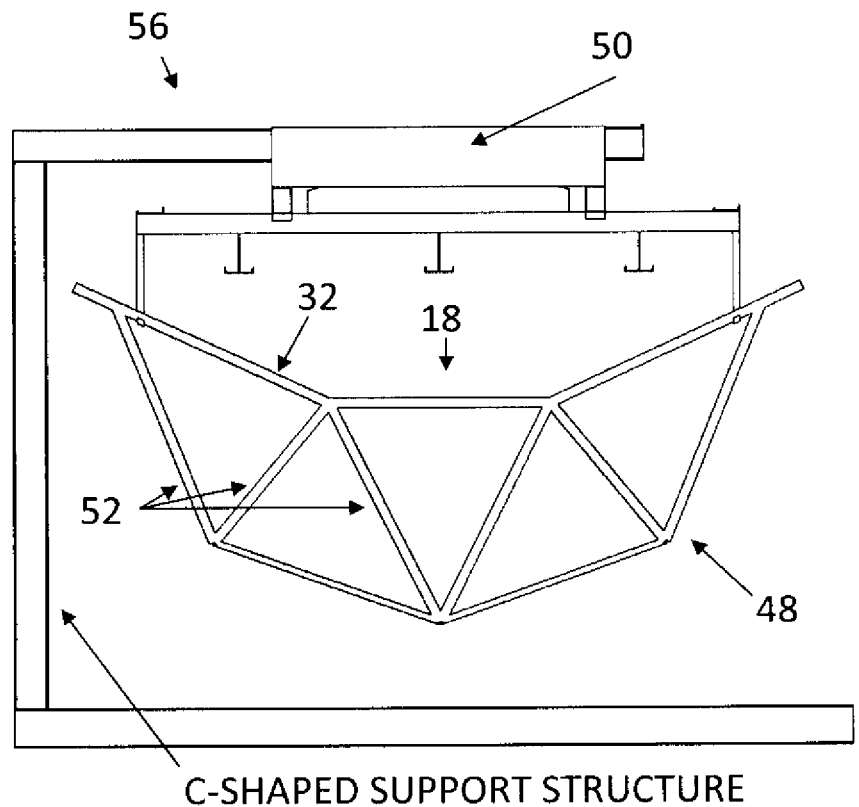
FIG. 49 shows a frame slice 48 hung from strong back 50 which is supported by a system 56 for constructing the frame system 32—End view.

FIG. 49 shows a frame slice 48 hung from strong back 50 which is supported by a system 56 for constructing the frame system 32. The strong back 50 is itself "hung" from C-shaped support structures—End view.

Figure 50:
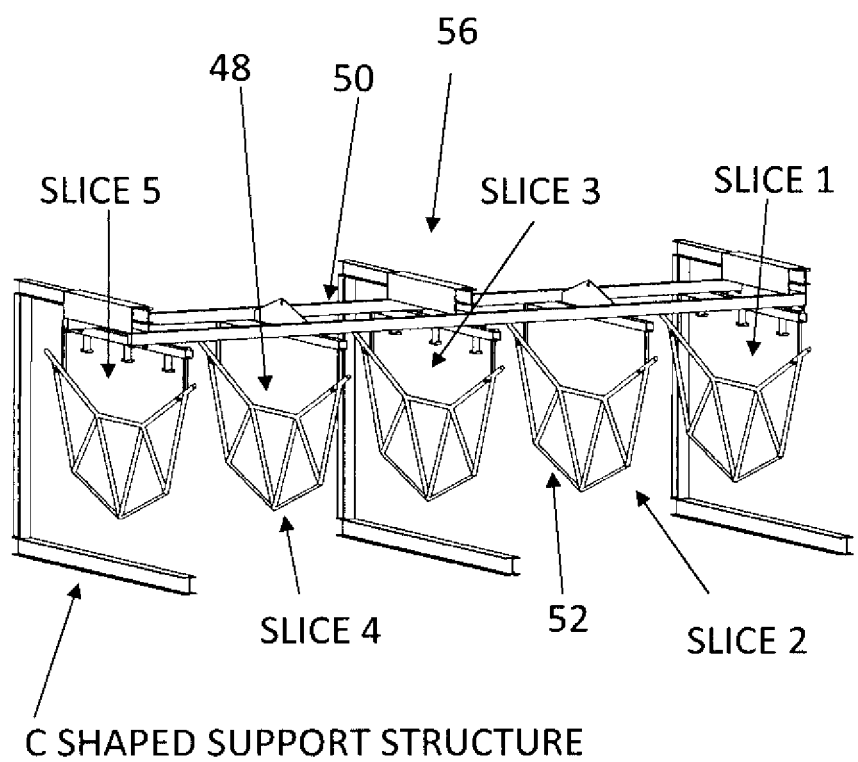
FIG. 50 shows (5) frame slices 48 hung from strong back 50—ISO view.

FIG. 50 shows (5) frame slices 48 hung from strong back 50—ISO view. FIGS. 50-57 depict a "5T5B" geometry of solar frame system 32 (5 Top and 5 Bottom main connection points). The five frame cross sectional "slices" 48 are hung from the strongback 50 which can be lifted and moved via cranes, forklifts or similar means. The intent is to hang the solar frame system's 32 slices 48 (5 slices 48 are shown in this graphic) a prefabricated cross sectional members onto the strongback 50, itself hung from multiple "C-shaped" supports. The struts 52 and segmented chords 54 subassembled with their respective strut end pieces 78 can then be connected between the cross sectional slices 48 to complete the frame system 32, working from the center outward (shown in subsequent FIGS. 51-57). Once the solar frame system 32 is completed, including all mirror support rails, the strongback 50 can be used to lift the completed module off of the assembly station and reposition it either to a storage area or to be transported and placed onto the final pylon uprights 38 and 40 in the solar field. Note that the assembly areas shown in FIGS. 51-57 will have movable stairs or other means 58 so that the assemblers can properly reach the ends of the chord segment assemblies 54 and strut assemblies 52 to fasten them to the prefabricated/assembled frame cross sectional "slices" 48.

Figure 51:
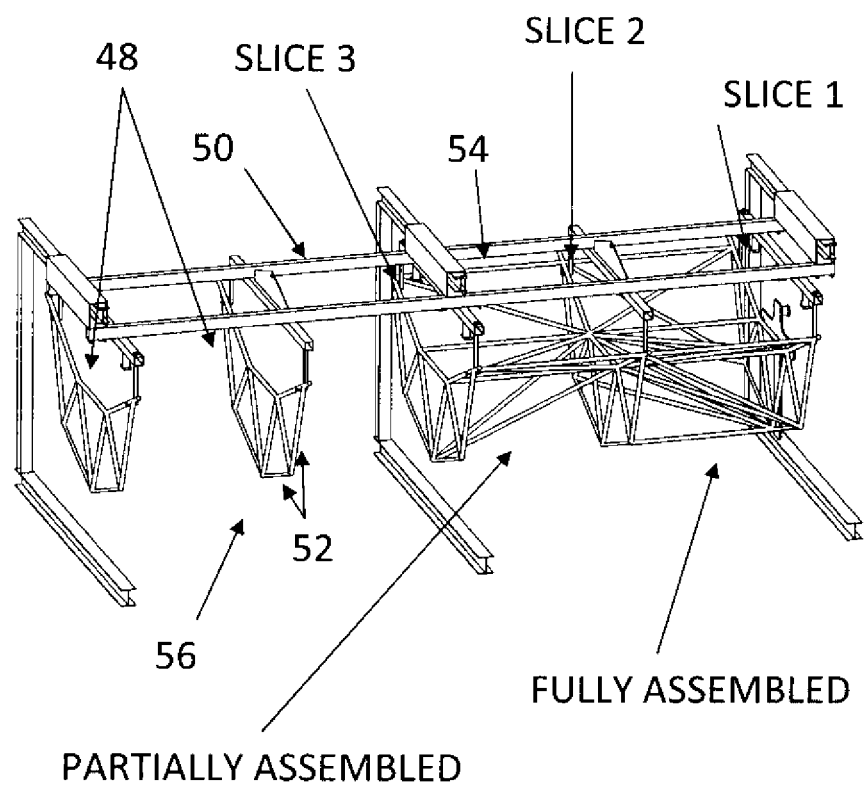
FIG. 51 shows a frame system 32 partway through assembly, with the (5) slices 48 hung from the strongback 50—ISO view.

FIG. 51 shows a frame system 32 partway through assembly, with the (5) slices 48 hung from the strongback 50—ISO view. The partially completed solar frame structure 32 is shown with right most (1$^{st}$, numbered from the right) frame cross sectional 48 fully joined to the second cross sectional slice 48 via struts 52 and segmented chords 54, previously subassembled with their respective strut end pieces 78. The vertices of the cross sectional slices 48 are made of connectors designed to fasten to the segmented chord 54 strut end pieces 78 and the strut 52 strut end pieces 78, Note that the 3$^{rd}$ cross sectional slice 48 has yet begun to be assembled to the 2$^{nd}$ slice 78. Note that in this graphic the area between slice 1 and slice 2 48 is shown as complete with struts 52 and segmented chords 54, while the area between slices 2 and 3 48 are shown partially assembled, with only the inner most segmented chords 54 and struts 52 shown, depicting how assemblers would likely work "from inside to outside" to limit interference with already assembled parts. The areas between slices 3 and 4 and 4 and 5 48 are shown with no struts 52 or segmented chords 54 yet assembled. Depending on the manning of the assembly area, the progression may occur as pictured above or all of the "inner" connections between the 5 slices 48 may be done first, working outward until the entire solar frame system 32 is completely assembled.

Figure 52:
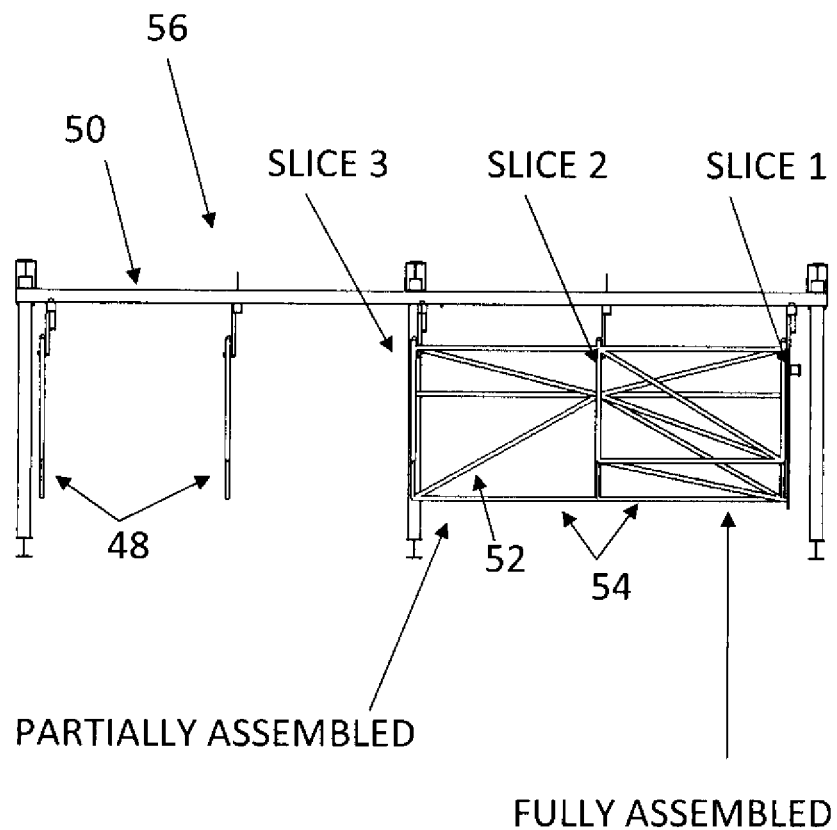
FIG. 52 shows a frame system 32 partway through assembly, with the (5) slices 48 hung from the strongback 50—Side view.

FIG. 52 shows a frame system 32 partway through assembly, with the (5) slices 48 hung from the strongback 50—Side view. Frame slices 48 numbered 1 and 2 are shown attached to each other via struts 52 and segmented chords 54, with the 3$^{rd}$ slice 48 partially assembled to the 2$^{nd}$ via struts 52 and segmented chords 54, beginning at the inside, working to the outside—see FIG. 54.

Figure 53:
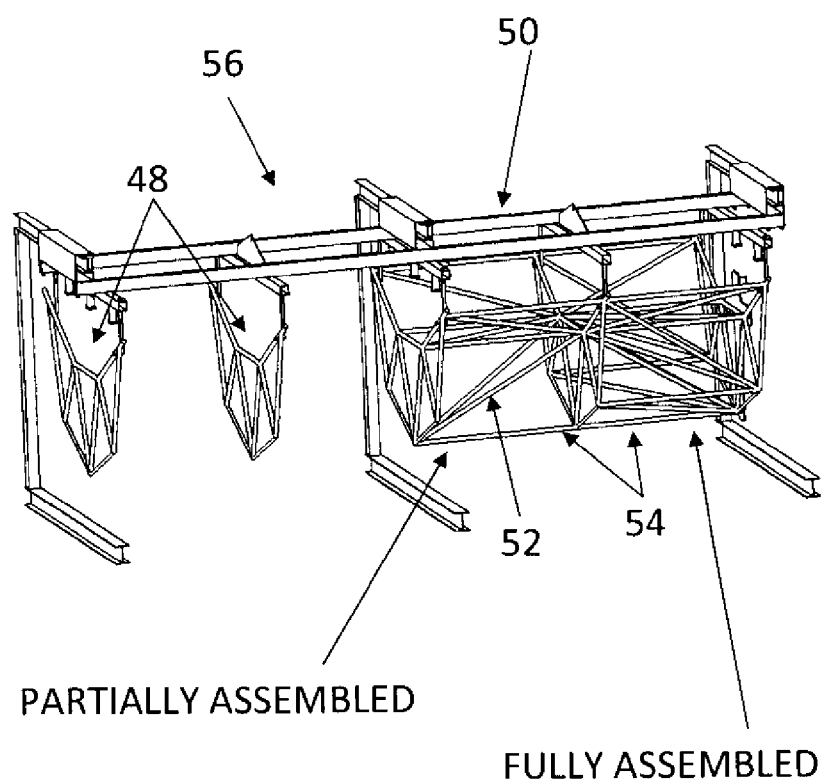
FIG. 53 shows a frame system 32 partway through assembly, with the (5) slices 48 hung from the strongback 50 and the overall system for constructing the frame 56 called out—ISO view.

FIG. 53 shows a frame system 32 partway through assembly, with the (5) slices 48 hung from the strongback 50 and the overall system for constructing the frame 56 called out—ISO view.

Figure 54:
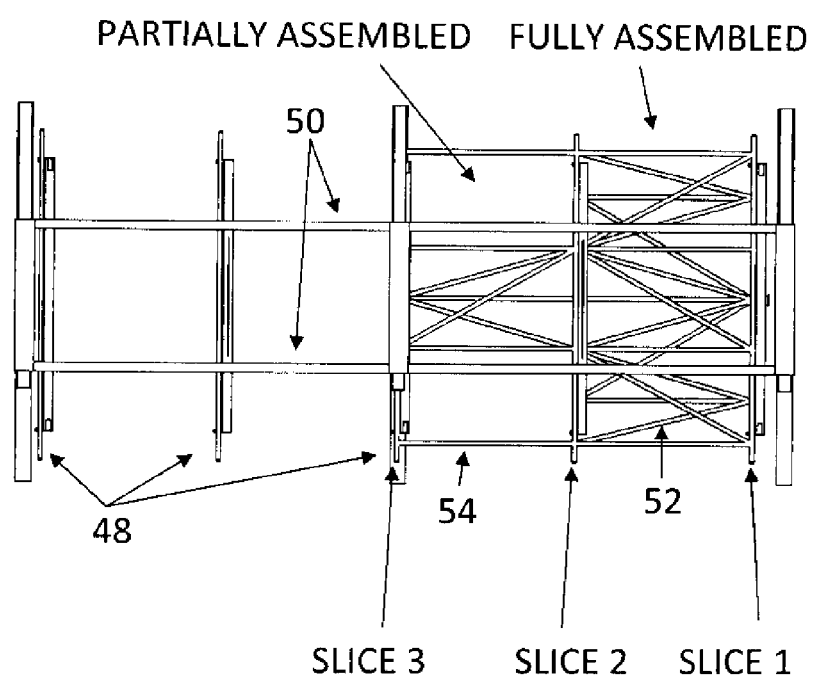
FIG. 54 shows a system 32 partway through assembly, with the (5) slices 48 hung from the strongback 50—Top view.

FIG. 54 shows a system 32 partway through assembly, with the (5) slices 48 hung from the strongback 50—Top view.

Figure 55:
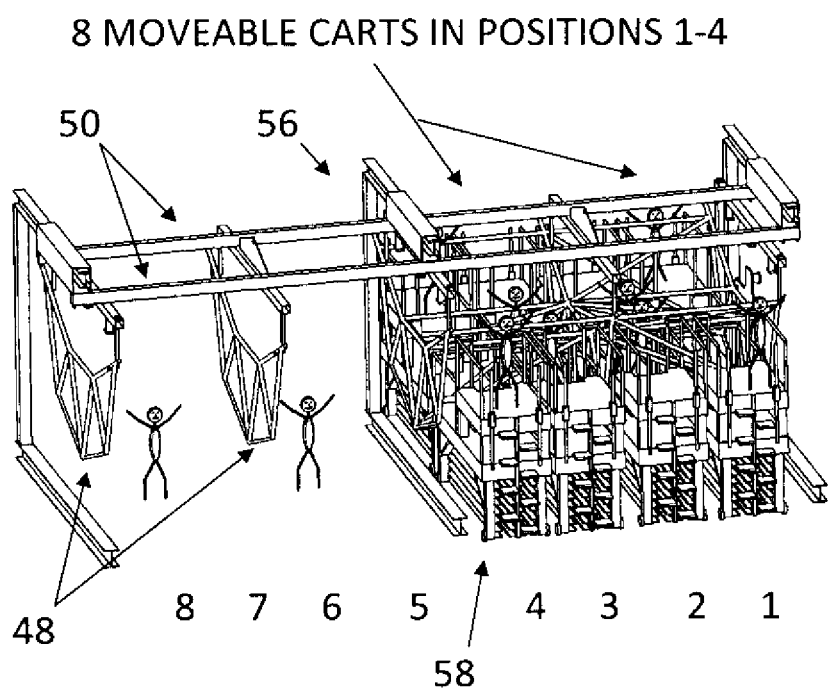
FIG. 55 shows a system 56 for constructing the frame system 32 partway through assembly, with the (5) slices 48 hung from the strongback 50 and some of the work stations/carts shown in their positions/with their assembly platforms 58—ISO view.

FIG. 55 shows a system 56 for constructing the frame system 32 partway through assembly, with the (5) slices 48 hung from the strongback 50 and some of the work stations/carts shown in their positions/with their assembly platforms 58—ISO view.

The assembly starts at this point, with the moveable platforms 58 in positions 1-4. The assemblers attach the top struts 52 starting from the inside, working outwards for positions 1-4. There are (8) platforms/carts 58—for example, in the graphic, there are (4) carts in positions 1-4 on each side of the solar frame.

Figure 56:
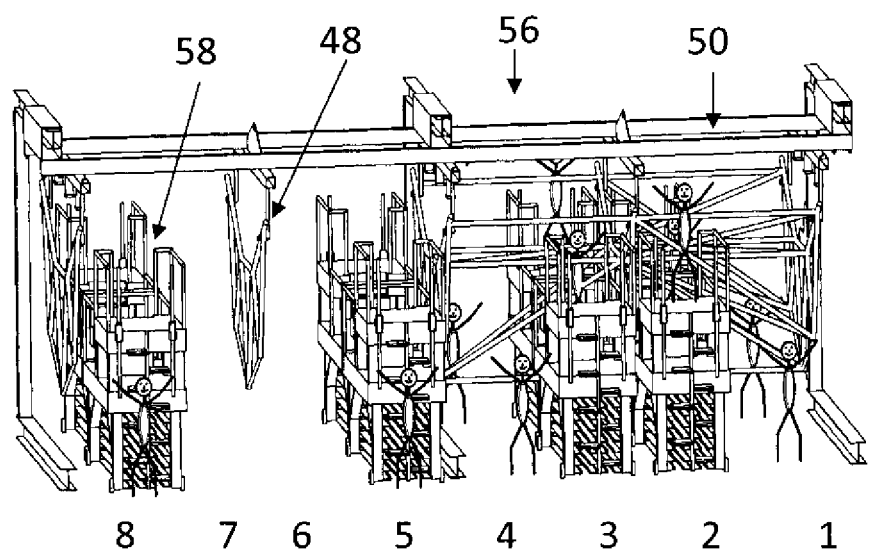
FIG. 56 shows a system 56 for constructing the frame system 32 partway through assembly, with the (5) slices 48 hung from the strongback 50 and some of the work stations/carts shown in their positions/with their assembly platforms 58—ISO view.

FIG. 56 shows a system 56 for constructing the frame system 32 partway through assembly, with the (5) slices 48 hung from the strongback 50 and some of the work stations/carts shown in their positions/with their assembly platforms 58 (these platforms 58 are in different positions from FIG. 55, depicting a system 32 further along in the assembly process (assembly platforms 58 shown in positions 2, 3 5 & 8))—ISO view. The 1$^{st}$ and 4$^{th}$ row platform carts 58 have been moved out and positioned in the next half of the solar frame system 32 assembly area (positions 5 and 8). Struts 52 that run from the top to the bottom are attached by two assemblers on carts 58 in positions 2 and 3 and with two assemblers standing on the floor in positions 1 and 4. When this is complete, the carts 58 in positions 2 and 3 are relocated to the 2$^{nd}$ half assembly area in positions 6 and 7.

Figure 57:
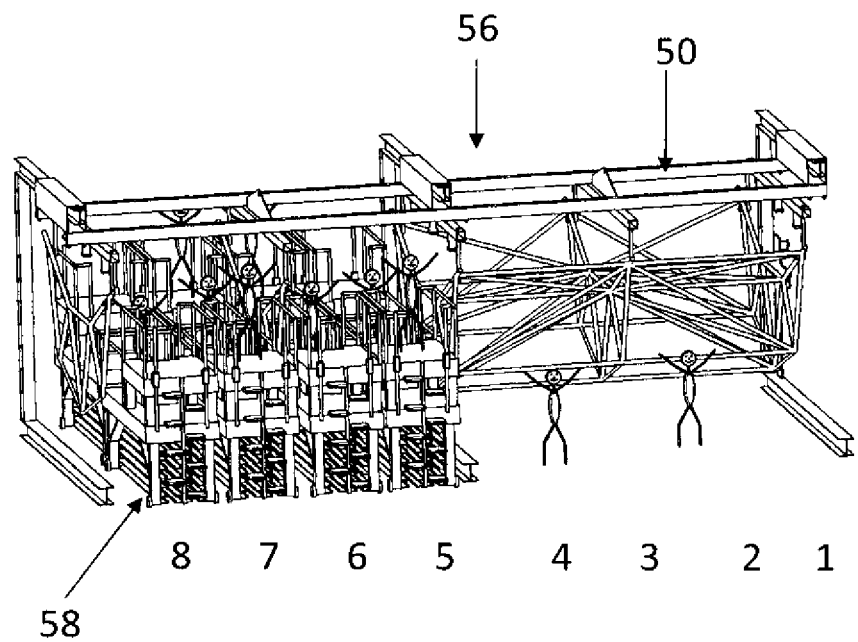
FIG. 57 shows a system 56 for constructing the frame system 32 partway through assembly, with the (5) slices 48 hung from the strongback 50 and some of the work stations/carts shown in their positions/with their assembly platforms 58—ISO view.

FIG. 57 shows a system 56 for constructing the frame system 32 partway through assembly, with the (5) slices 48 hung from the strongback 50 and some of the work stations/carts shown in their positions/with their assembly platforms 58 (these platforms 58 are in different positions from FIGS. 55 and 56, depicting a system 32 even further along in the assembly process (assembly platforms 58 shown in positions 5-8))—ISO view.

Figure 58:
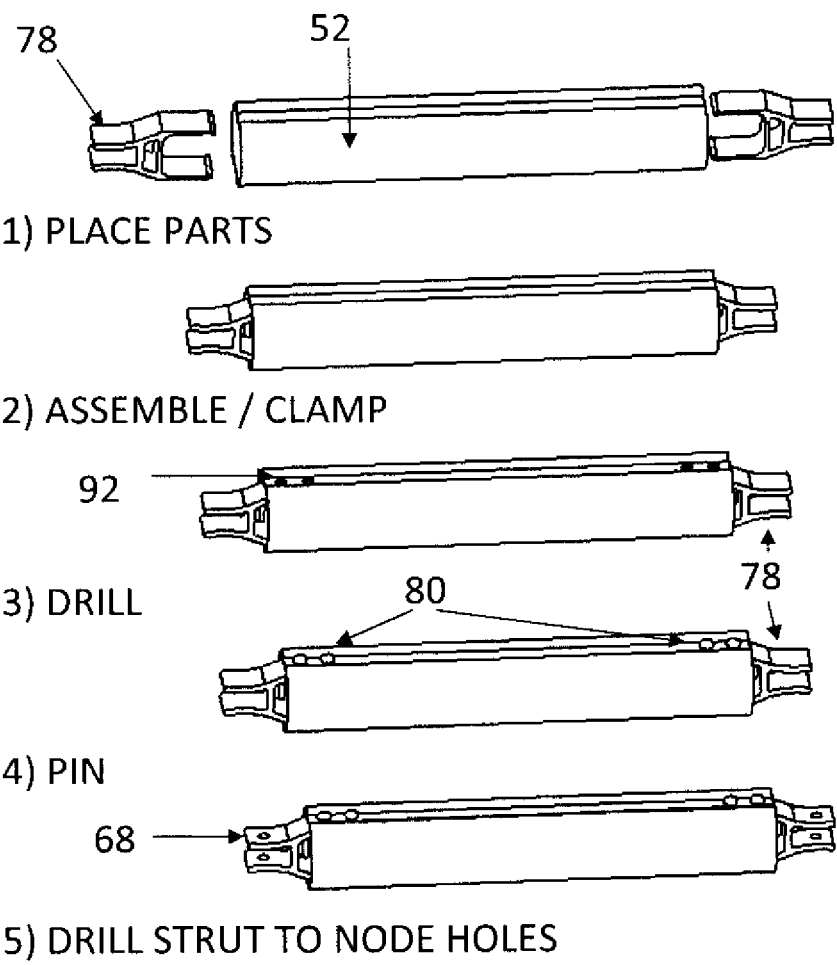
FIG. 58 shows a strut 52 assembly sequence (steps 1-5)—ISO views.

FIG. 58 shows a strut 52 assembly sequence (steps 1-5), depicting the strut end pieces 78 separate from the strut 52, clamped into position, with a fabrication (shown as a drill) step to create the attachment means 66, next with the fasteners 80 installed and finally with the final fastener holes 68 fabricated (shown as a drill) into the strut/strut end piece (52/78) subassembly to hold the final, critical dimension between the fastener holes 68 on the strut end pieces 78 fins—ISO view Note: because the struts 52 and strut end pieces 78 are subassembled BEFORE the final fastener holes 68 are fabricated into the strut end pieces 78 of the subassembly, the final end-to-end hole tolerance is the same as if there was a single piece being fabricated.

Figure 59:
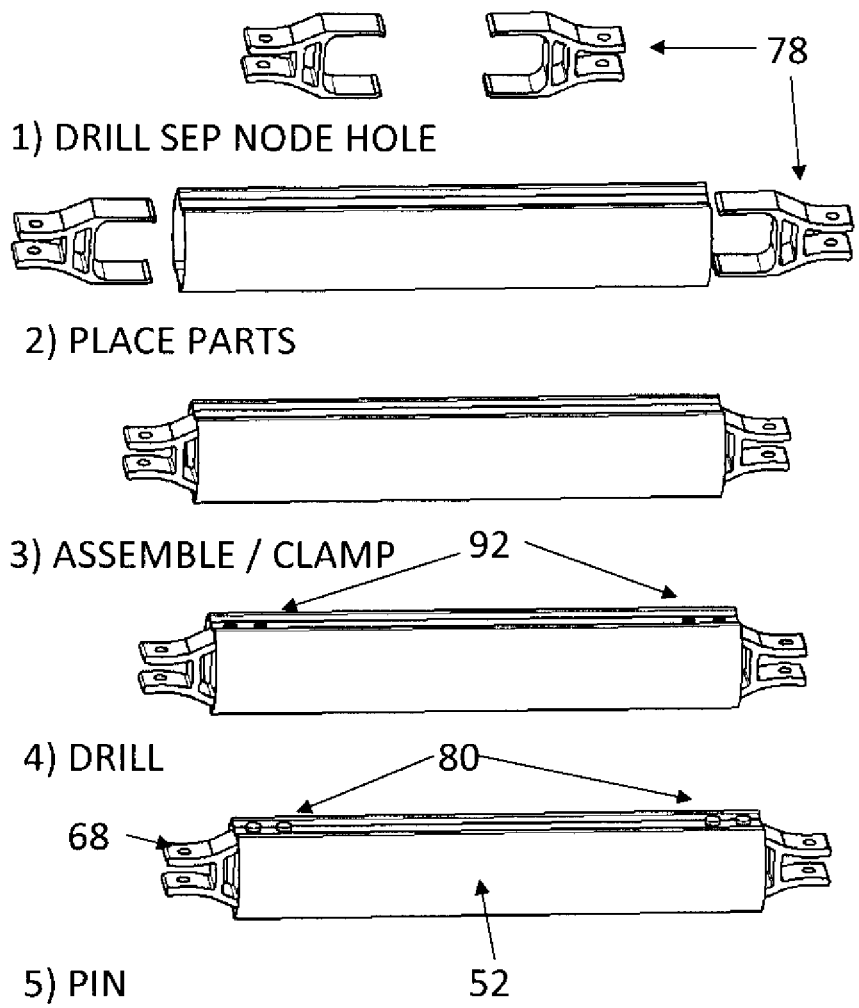
FIG. 59 shows a strut 52 assembly sequence alternative (steps 1-5)—ISO views.

FIG. 59 shows a strut 52 assembly sequence alternative (steps 1-5), where the strut end pieces 78 already have the fastening holes 68 for attachment to the node fins 30 fabricated before subassembly with the struts 52. The strut 52 and strut end pieces 78 are slid together and clamped, then the strut 52 and strut end pieces' 78 fins are fabricated (shown as drilled) in the same operation, creating the attachment means 66, into which the fasteners 80 are placed, ensuring that the final, critical dimension between the fastener holes 8 on the strut end pieces 78 fins are accurate—ISO view.

Assembly Method for a Conventional "Through Chord" CSP Frame Design

The "Through Chord CSP Frame":

Past parabolic CSP solar frames installed at Nevada Solar One, in Florida for Florida Power and Light and in Spain constructed from fabricated aluminum extrusions utilize structural "chords" which run the full length of the frame (currently 8 or 12 meters, although other lengths are possible). These chords are extremely long, difficult to handle and fabricate. See earlier explanations of why the "segmented" chords represent advantages in some cases.

WES LLC Patent Application 61/190,573 contemplates a "Through Chord" frame and references the assembly method further documented as follows.

If a project is planned to use "Through Chords", an efficient, effective manner has been devised to accomplish the field assembly—see the following explanation.

The following is a description of a method of assembly for solar troughs in order to apply for a patent. This description is specific to the Series 5 frame, but this specificity exists only so that an example may be given to make the idea behind the method more clear. The following description for a patent is meant to apply to any formation of the solar trough. This must be kept in mind whenever a specific number or formation is mentioned. For example, when the description of how many rollers there are is given, that can be modified to better fit into different designs for the frame. Also, the number of workers, set-up of the platforms, and set-up of the staging area can be modified to name just a few examples of possible changes based on frame design. The main idea that would remain constant, the driving idea behind what makes this system unique, is that assembly workers remain stationary as the Frame Mover Structure (FMS) pulls the frame past them and they assemble it.

The purpose of the Extruded$^2$ Frame Assembly method of assembling a solar frame 18 is to aide in ease of construction in relation to number of workers needed, amount of time needed, ease for workers, specialization of labor, and easy access to parts needed for construction. A large part of the cost of the final product of the solar frames lies in the labor involved in construction, so this method should greatly reduce the time and cost of achieving the final product. Initial estimated man-hours for the completion of one frame is ten man-hours, including the work of the material handlers, for a 12 meter WES Series 5 frame.

Let the space being described be defined in the following terms. The XY plane will be a cross-section of the frame with the Y being oriented vertically off the ground, and the X being oriented horizontally parallel to the ground. The z-direction will run parallel along the length of the staging area and frame. The front end of the assembly refers to the side on the z-axis that is far from the material bay at which point is located the moving Frame Mover Structure (FMS). The back end is the side on the z-axis that is near the material bay (see FIG. 60).

In general, as far as defining and labeling parts goes, parts will be labeled as follows. Each major picture will be labeled by Figure # in ascending numerical order. Within each major picture, there are often parts that must be distinguished. These parts will be labeled using letters from A-Z. Corresponding parts will have the same letter whenever possible and parts will be labeled within the picture generally from left to right by row then from left to right in the next row down. When referencing these parts, they will be referenced as follows. The number of the figure will be followed by a period then the specific letter of the part. Examples: 1.B 3.H 2.C would refer to Figure one, part B; FIG. 3, part H; and FIG. 2, part C, respectively.

What Differentiates this Concept/why is it Valuable?

Assembly Method for Conventional "Through Chord" CSP Frames

"Through Chords", node connectors, struts 52, mirror support rails and other parts are delivered to the field.

Assemblers hand-move the various pieces, matching fastener ends to the appropriate matching part.

Often the frame assembly must be manually manipulated, flipped over, climbed upon, etc. . . . . .

Assembly Method for the "Extruded$^2$" Frame Assembly

While this was discussed in the 1$^{st}$ WES patent, it was not as fully described as in this section and as in FIGS. 60-68.

The bundles of various parts are stored and handled in an organized fashion.

"A place for everything and everything in its place" improves the efficiency and reduces possible frame assembly errors (wrong parts being fastened together).

The ergonomics of this assembly system are vastly improved from the manual manipulation, climbing upon.

Training is simplified

Simple staging systems can be reused at subsequent job sites.

Overall Design

Quick Summary

The basic idea behind the Extruded$^2$ Frame Assembly is that there is a plate at the front end called the Frame Mover Structure (FMS). The parts of the solar trough that run the length of the trough (chords and mirror support rails) will clip into the FMS and it will pull them along so that workers can stand in place at various positions on platforms in the XY plane and have the materials with them on the platform or on the ground and assemble the structure as it moves past them. This will eliminate the need for workers to climb up onto a stationary structure while dragging along large heavy parts with them. The assemblers will always have the parts they need right where they need them, so heavy parts don't have to be carried far and also the workers never have to waste time climbing down from the frame to a bin of parts and then climbing back up. A huge reason specialization of labor works is that there is not movement between jobs. By doing this method, almost all of the movement between obtaining and attaching the parts of the structure is eliminated. Once the frame is fully assembled, it will be detached from the FMS and a crane or other means will be able to lift the entire structure up and load it onto a transport device (perhaps a truck) so it can be brought to its final destination. At this point, another frame can start to be assembled without moving the material bay, loading area, staging area, or the platforms and workers set up in the assembly area. Once the entire field of frames is assembled, the material bay, loading area, staging area, and assembly area can easily be disassembled and relocated to another job site to make a new field.

Goals

Systemize assembly

Separate out material handling (3 workers) from assembly (5 workers)

Specialization of assembly labor

Simple training

Efficiency

Line balance for utilization

Have a specific place for every part (greatly reduces the opportunity for assembly errors)

Simple staging mechanism that is reusable for subsequent job sites 10 man-hours per frame including time done by material handlers What is Believed to be New and Different Frame Mover Structure (FMS)

Stationary workers in a work environment where the frame moves around them

Use of a material bay, loading area, staging area, and assembly area

Implementing the assembly process detailed below will lead to an optimized assembly in terms of man-hours, specialization of labor, and standardization.

Figure 60:
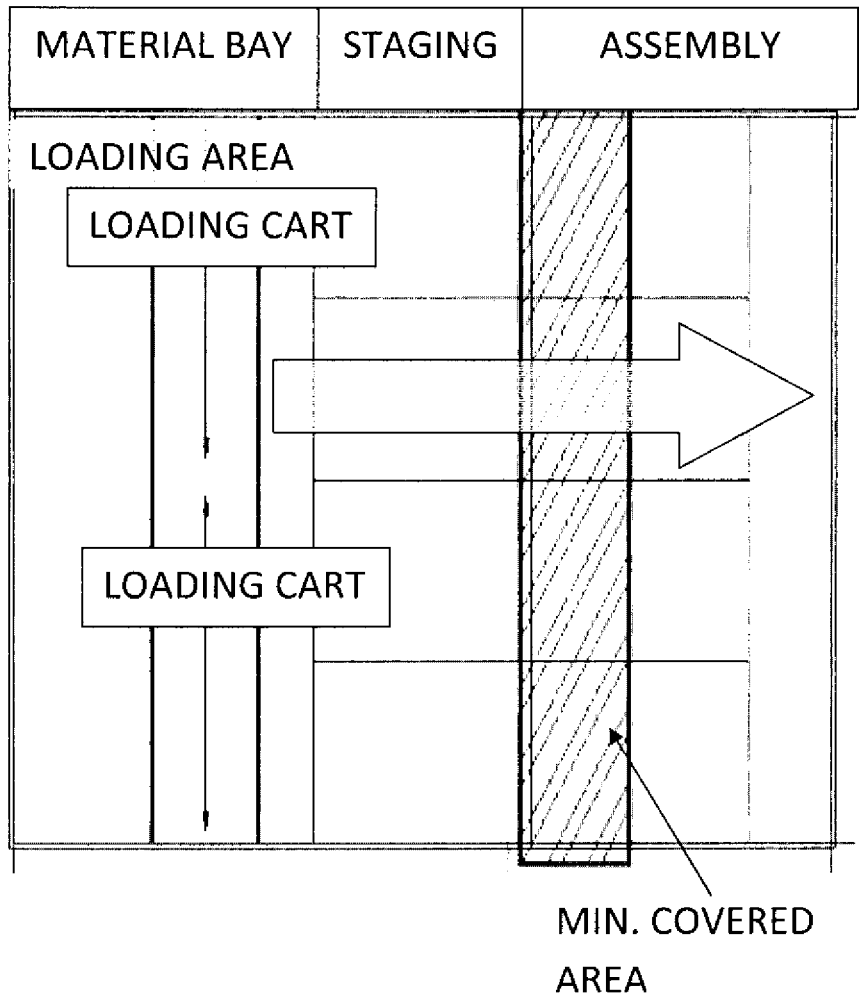
FIG. 60 shows the material, staging and assembly bays for the "extruded squared" assembly method of creating a solar frame system 32 from various components—Top view.

FIG. 60 shows the material, staging and assembly bays for the "extruded squared" assembly method of creating a solar frame system 32 from various components—Top view.

Two Types of Workers

Material Handlers

The material handlers have many jobs. They will load the bundles of chords and mirror supports onto the rollers on the supports in the staging area. Also, they will bring bins of smaller parts directly to the assemblers so they do not have to waste time getting the parts themselves. The Assemblers will then place these bins right next to where they will be used so they don't waste time moving around reaching for parts. Material Handlers will also drive the trucks, move boxes, etc.

Assemblers

The assemblers will stand in the assembly area on platforms of varying heights or on the ground. These workers will stand mostly in place, though they may have to move a small amount in the XY plane. Each assembler will have 2-4 workstations at which they must place specific parts as the frame moves past them. The work areas they remain in will be approximately 6-8 feet wide and 3-4 feet high so the workers will have to waste little time moving around their work area. The assemblers will work with all the types of parts described below in the material bay section. After the sleeves 70 for the entire length are placed on the end of the chords, the chords and mirror supports will be taken off their rollers and the both will be clipped onto the FMS. Then, as the FMS pulls the chords and mirror supports along, the assemblers will fix the sleeves 70 in their correct places and attach the struts 52 and other parts appropriately. The sleeves 70 are the extrusions that are slipped over the chords and have protrusions coming off of them that the struts 52, mirror supports, etc. can be attached to. The assemblers will have bins of each material (including fasteners 80) placed on their platforms close to the places that the parts will be affixed ensuring quick efficient work because it eliminates the need to get down from the platform each time another part is needed. A basic idea of the platforms they will stand on (the solid figure in the center of FIG. 61) can be seen in FIG. 62.

Figure 61:
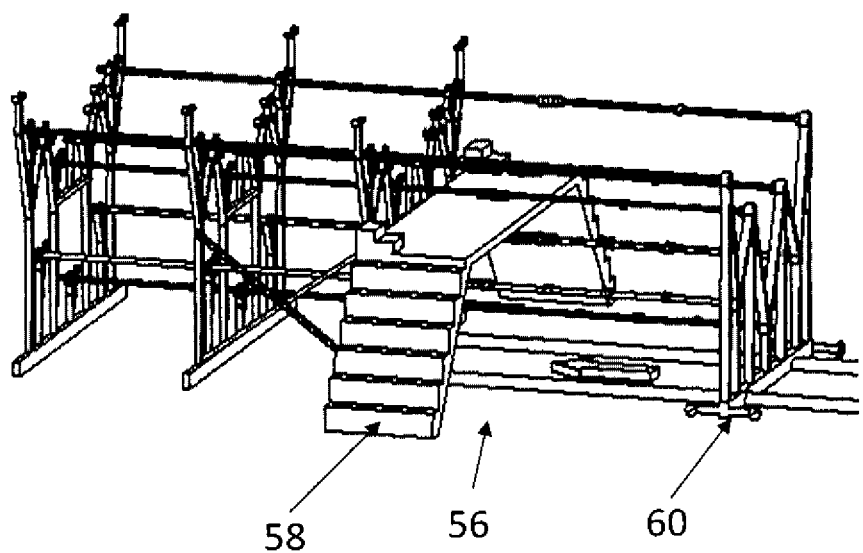
FIG. 61 shows the material, staging and assembly bays for the "extruded squared" assembly method of creating a solar frame system 32 from various components—ISO view.

FIG. 61: Isometric View of Assembly Area

Throughout the following pages, figures and paragraphs, explanations of how this system works will be given. In overview:

Bundles of extruded, fabricated and subassembled parts will be moved from the material bay area to the assembly area and the staging area.

Bundles of long chords and mirror support rails will be put onto a liftcart in the loading area and pushed off of the roller topped cart onto the staging, area rollers.

Assemblers on the assembly platform 58 and below it will individually roll each chord and mirror support rail into their roller assemblies that guide each.

The assemblers will slide the sleeves 70 (nodes) onto the front end of the chords in the proper order.

The assemblers will pull the chords forward attaching them to the frame mover structure, which is mounted on V-tracks, Thompson rods or other means, and which is powered back and forth.

The assemblers can move the frame mover system forward as needed, and will be attaching the sleeves 70 to the chords and the struts 52 to the chords (and the mirror support rails to the frame system) as the assembly progresses.

After all parts are assembled, the completed frame is supported on the back end and completely pulled from the assembly area by the frame mover system.

The frame is then lifted and aside or transported to the field for mounting on the pylons.

The next chords and mirror support rails are rolled into their roller assemblies that guide each, and the process continues with the next frame.

Material Bay

Off to each side of the main structure will be compartments that will contain bundles of mirror support rails and bundles of chords. Other parts will be in reserve bins not necessarily in or next to the material bay, as well as in smaller bins placed appropriately where they are needed by the assemblers. These parts include: struts 52 and strut assemblies, mirror support rails and mirror support rail risers, I-beams (or other similar rail), and sleeves 70 that slide onto chords.

Bundles

Figure 63:
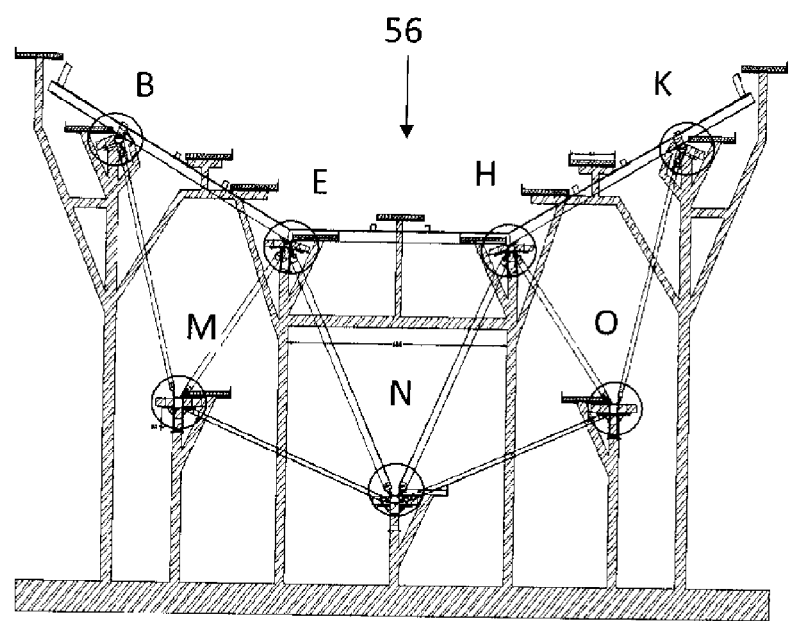
FIG. 63 shows a frame in the staging area of the system 56 used for constructing/assembling the frame 32, highlighting the chord placement staging stations—End view.
Figure 64:
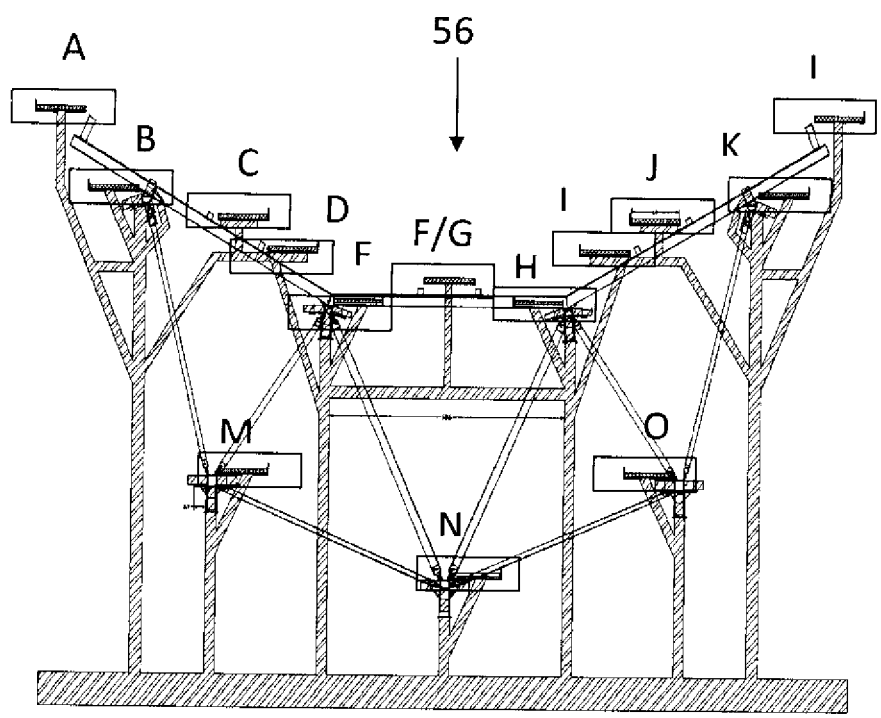
FIG. 64 shows a frame in the staging area of the system 56 used for constructing/assembling the frame 32, highlighting the staging stations where minibundles of chords and mirror support rails are placed—End view.

The bundles will be placed onto various bundle rollers, which have rectangles around them and are labeled A-O in FIG. 64. The bundles on bundle rollers B, E, H, K, M, N, and O will only contain chords because these areas only call for chords. The bundles on bundle rollers A, C, D, F/G, I, J, and L will contain only mirror supports as they are what are needed in those areas. Once the materials are rolled down to the assembly area, they will remain on the bundle rollers, but as needed, will be rolled off, one-by-one, sideways (in the x-direction) onto the chord rollers (for chords) or onto the mirror support rollers (for mirror supports). The chord rollers are labeled B, E, H, K, M, N, and O as shown by the circles in FIG. 63. The mirror support rollers are not specifically illustrated, but can be imagined in the places in FIG. 62 with the circles around them, labeled A, C, D, F, G, I, J, and L. These rollers will allow the chords and mirror supports to easily move along and be supported as the FMS pulls them.

FIG. 61 shows the material, staging and assembly bays for the "extruded squared" assembly method of creating a solar frame system 32 from various components—ISO view.

Figure 62:
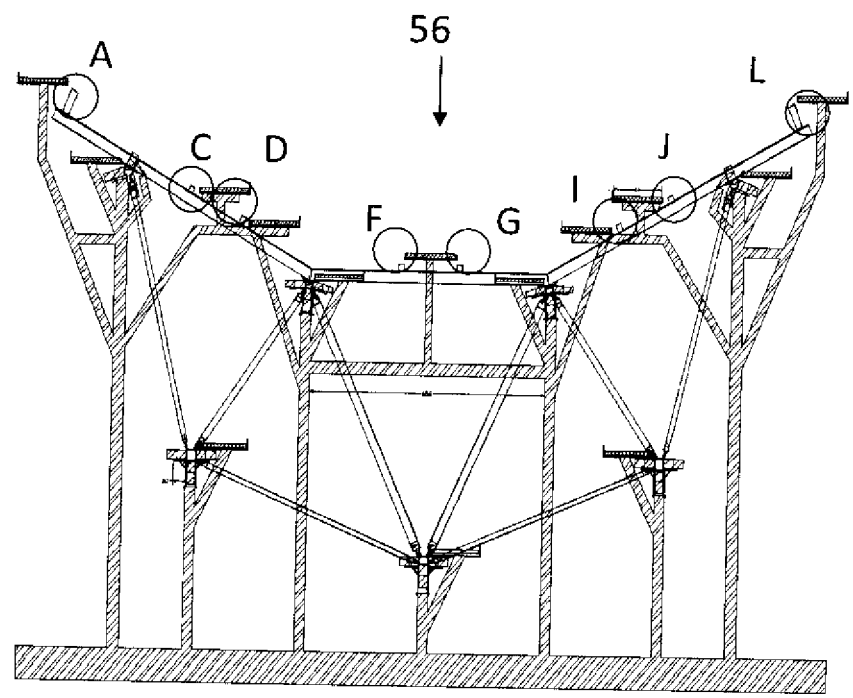
FIG. 62 shows a frame 32 in the staging area of the system 56 used for constructing/assembling the frame 32, highlighting the mirror support rail placement staging stations—End view.

FIG. 62 shows a frame 32 in the staging area of the system 56 used for constructing/assembling the frame 32, highlighting the mirror support rail placement staging stations—End view.

FIG. 63 shows a frame in the staging area of the system 56 used for constructing/assembling the frame 32, highlighting the chord placement staging stations—End view.

FIG. 64 shows a frame in the staging area of the system 56 used for constructing/assembling the frame 32, highlighting the staging stations where minibundles of chords and mirror support rails are placed—End view.

Figure 65:
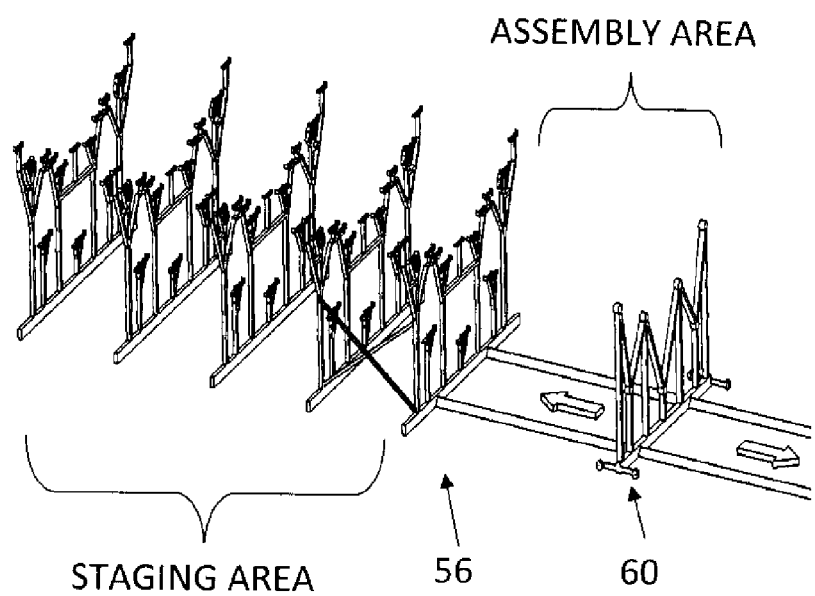
FIG. 65 shows a staging and assembly areas of the system 56 for constructing/assembling the frame 32, showing the moving mechanism 60 that advances the frame as assembly progresses—ISO view.

FIG. 65 shows a staging and assembly areas of the system 56 for constructing/assembling the frame 32, showing the moving mechanism 60 that advances the frame as assembly progresses—ISO view.

Figure 66:
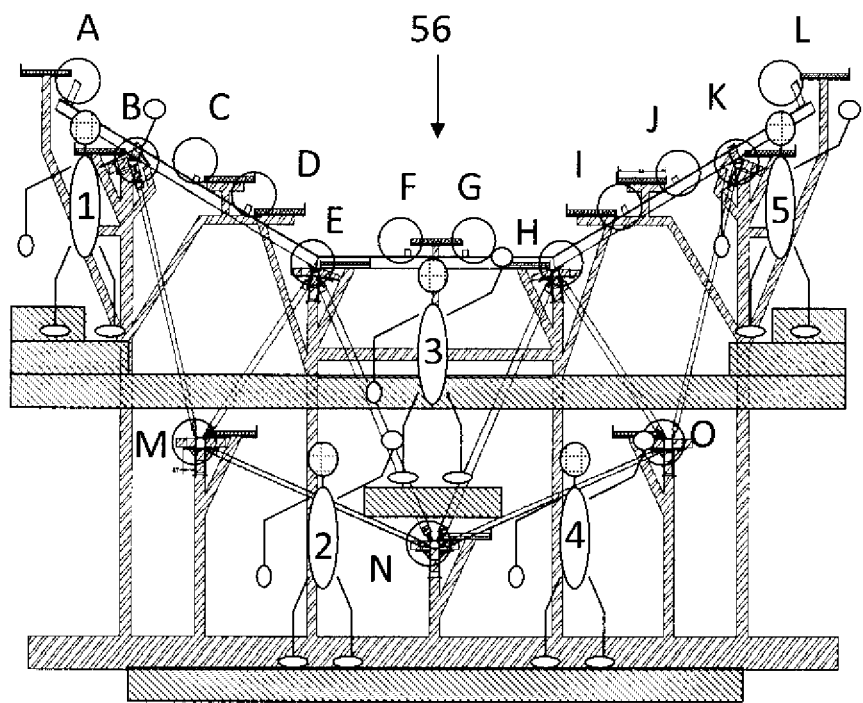
FIG. 66 shows assemblers/assembly locations of the system 56 for constructing/assembling the frame 32 in reference to frame—End view.

FIG. 66 shows assemblers/assembly locations of the system 56 for constructing/assembling the frame 32 in reference to frame—End view.

Figure 67:
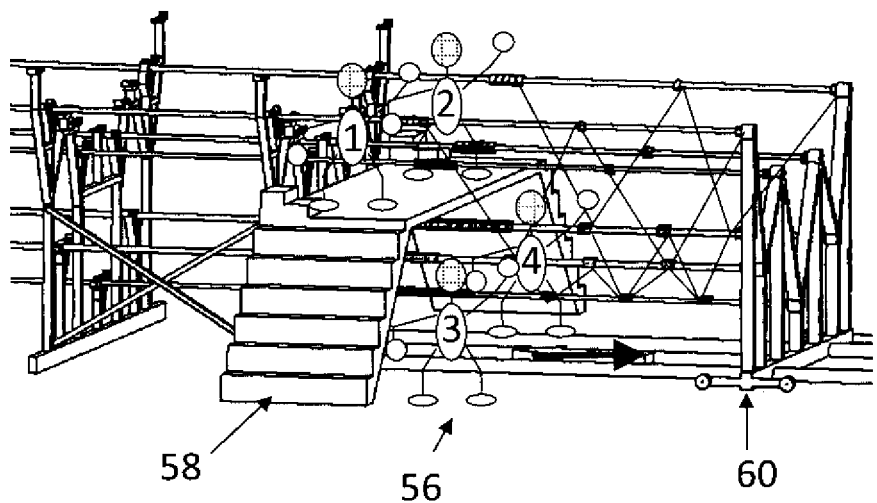
FIG. 67 shows a staging and assembly area of the system 56 for constructing/assembling the frame 32 with assemblers on and not on a platform 58—ISO view.

FIG. 67 shows a staging and assembly area of the system 56 for constructing/assembling the frame 32 with assemblers on and not on a platform 58—ISO view.

Figure 68:
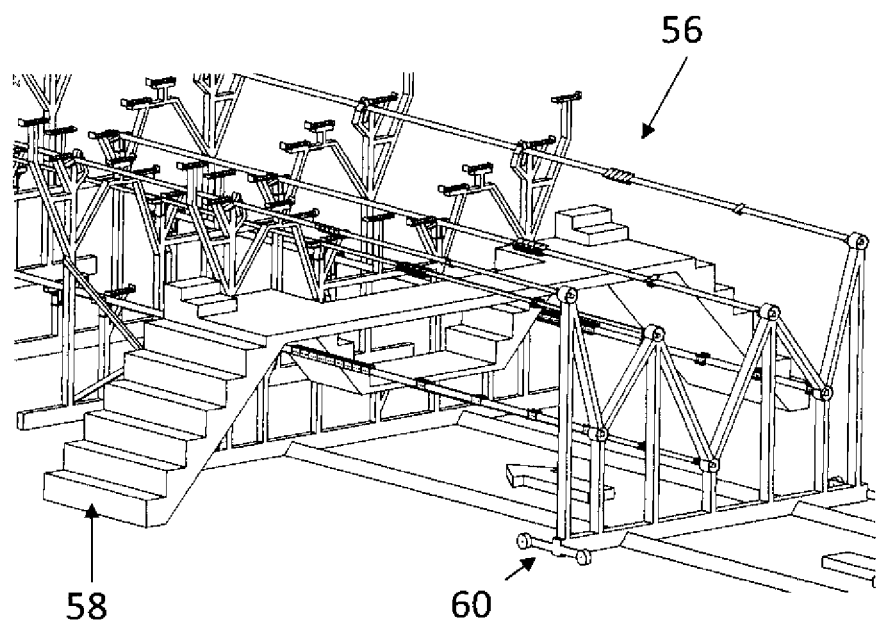
FIG. 68 shows a staging and assembly area of the system 56 for constructing/assembling the frame 32 with assemblers on and not on an alternative (-vs-FIG. 67) platform 58—ISO view.

FIG. 68 shows a staging and assembly area of the system 56 for constructing/assembling the frame 32 with assemblers on and not on an alternative (-vs-FIG. 67) platform 58—ISO view.

FIG. 69 shows an assembled frame 18 system supporting reflectors 32 shown mounted on pylons 38 and 40—ISO view.

Loading Area

Between the two material bays, there will be an area deemed the loading area. In this area, there will be material handlers that obtain pre-grouped bundles of chords and mirror support rails from the material bays and place them onto rollers so they can easily be moved through the staging area.

The rollers will be many pipes placed in a line in the XZ plane with the length of each pipe in the x-direction and placed next to each other along the z-axis as such ||||||||. This will allow materials to be easily slid along the length of the frame.

After a chord or mirror support rail is loaded onto the rollers and rolled to the appropriate area, it can easily be slid off the rollers onto separate rollers designed specifically for each part.

Staging Area

The staging area exists as a series of approximately 5 structures each existing independently in the XY plane (braced diagonally to avoid the structures falling in the "z" direction), but being oriented in relation to each other in the z direction, so that each progressive structure is closer to the front end of the Extruded$^2$ Frame Assembly. Each of these structures will have support for rollers that will allow for materials to be moved to the assembly area. The staging area can be seen in FIG. 65. The staging area exists as a middle ground where the back ends of chords and mirror supports can rest while the front ends are being pulled along by the Frame Mover Structure (FMS).

The Frame Mover Structure is the large plate at the front end of the entire assembly. Along with the stationary workers, this is the most unique part of the process. It is mounted on "V-tracks", "Thompson rods" or other means to provide a defined movement path. After the front ends of the chords and mirror supports are initially clamped into the Frame Mover Structure, it is pulled along by a motor (think about a garage door opener chain drive) and the frame being assembled is pulled along behind it so that it doesn't have to be manually moved.

Assembly Area

The assembly area exists as a place for the workers who assemble the structure to stand. There will be a series of platforms spanning the width and height of the assembly in the XY plane. These platforms will allow for most likely 5 workers to stand in an X formation so that without moving much, they can collectively reach all points on the structure at which parts must be added or attached. Originally, the sleeves 70 for the entire length of the chords will all be slid on and stacked at the end and then the chords and mirror supports will be clamped into the FMS. Then, as the chords are pulled along, the sleeves 70 can be slid to the correct position, pinned in, and then the correct parts can be attached to them. As the FMS moves, each worker has specific jobs to do. In order from left to right, the workers are workers 1, 2, 3, 4, and 5 respectively. Worker 1 attends to workstations 1.A-1.D. Worker 2 attends to workstations 1.M and 1.N. Worker 3 attends to workstations 1.E-1.H. Worker 4 attends to workstations 1.N and 1.O. Worker 5 attends to workstations 1.I-1.L.

Full Extruded Assembly System

FIG. 67, is a picture of what the entire system would look like. On the left side, one can see the chords rolling along the staging area as they are pulled by the FMS on the right side. As they move, they move past the workers that would be standing on the platforms and below the platforms in the middle of the picture. As one can see, to the left of the platforms, there are just chords, but as it moves past the platforms, the struts 52 and other pieces are added to the chords so that the finished product emerges from the right side of the platform as the solar trough has pieces added to its left side as it is pulled to the right by the FMS. The major difference between the picture below and the final idea is that there would also be mirror supports attached to the FMS and pulled along, rolling on their own rollers. These were left out to reduce clutter in the picture, but would be in place as described in FIG. 62. Also, there would be a fifth assembler who would stand on the slightly lowered platform that can be seen in FIG. 68, but is not pictured in FIG. 67.

Finished Product

Once one frame is assembled, it will be detached from the FMS. At this point, it will be completely finished except for the addition/attachment of the mirrors and the fact that it is not at its final destination. It can be lifted by a crane or other machine, placed on a truck or other motive means and brought to its final destination. As soon as it is moved, another frame can have work started on it because the material bay, loading area, staging area, assembly area, and FMS are already set up and ready to go. Once the entire field of frames is completed, the Extruded$^2$ Frame Assembly layout can itself be easily disassembled and moved. Because it is comprised of just a few frames that are themselves built only in the XY plane, they can be laid down and packed into a small area to be shipped. Also, the FMS, material bays, and platforms that the workers will stand on can also be easily broken down into a couple major parts and shipped to the next location.

Alternative

As an alternative to this set-up, it may be simpler and more cost-effective to assemble the entire frame upside-down. The only difference here would be the configuration of clamps on the FMS because the locations of chords would be inverted (as would the mirror supports) and the configuration of the platforms for the assemblers. By inverting it, it might make it easier to reach some workstations. Also, it might allow for a safer, less complicated assembler platform. This platform would lack the thin walkway and small dip shown in the original platform.

FIG. 69: Overview of a Conventional Parabolic Solar Field

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A support frame comprising:
   struts;
   a first segmented chord;
   a second segmented chord separate and distinct from the first segmented chord; and
   a plurality of nodes, at least one of the nodes removably attaching at least one of the struts and the first segmented chord and the second segmented chord together, the one node has an elongate portion having a first end configured to removably attach to the first segmented chord, a second end configured to removably attach to the second segmented chord and a middle portion disposed between the first end and second end having only four fins extending outward from the middle portion configured to removably attach to the struts with one of the fins attaching to the one strut, the four fins extending asymmetrically from the middle portion, each fin attaching to a different strut of the struts, one of the four fins having a shorter length than the length of the other three fins, the one strut has a strut end piece having strut end piece fins which are separate and spaced apart from each other and a primary strut portion separate and distinct from the strut end piece, the strut end piece removably attached to the primary strut portion and the fin of the node with fasteners, the strut end piece fins attached on opposite sides of the fin of the node, the strut end piece with strut end piece fins being a one-piece extrusion, the middle portion and the first and second ends and the node fins of the one node being a separate one-piece extrusion.

2. The support frame of claim 1 wherein the elongate portion is a sleeve, at least a portion of which is hollow, and which has a sleeve opening extending along the sleeve's central axis, the first segmented chord and the second segmented chord disposed in the sleeve opening.

3. The support frame of claim 2 wherein the first segmented chord has a first segmented chord end piece and a first primary segmented chord portion separate and distinct from the first segmented chord end piece, the first segmented chord end piece removably attached to the first primary segmented chord portion and the first and of the elongate portion with fasteners; and wherein the second segmented chord has a second segmented chord end piece and a second primary segmented chord portion separate and distinct from the second segmented chord end piece, the second segmented chord end piece removably attached to the second primary segmented chord portion and the second end of the elongate portion with fasteners.

4. The support frame of claim 3 wherein the sleeve's outer surface is curved.

5. The support frame of claim 1 wherein the elongate portion is solid.

6. The support frame of claim 5 wherein the first segmented chord has a first segmented chord end piece and a first primary segmented chord portion separate and distinct from the first segmented chord end piece, the first segmented chord end piece removably attached to the first primary segmented chord portion and the first and of the elongate portion with fasteners; and wherein the second segmented chord has a second segmented chord end piece and a second primary segmented chord portion separate and distinct from the second segmented chord end piece, the second segmented chord end piece removably attached to the second primary segmented chord portion and the second end of the elongate portion with fasteners.

7. The frame as described in claim 1 including a coupler disposed in the one node that extends out from the one node, the first segmented chord removably attached to the front side of the coupler and second segmented chord removably attached to the second side of the coupler with fasteners.

8. The frame as described in claim 7 wherein the first side and the second side of the coupler are separate and distinct from each other.

9. The support frame of claim 4 wherein at least one of the plurality of nodes has a circle size that allows the node to be extruded on a 10 inch diameter extrusion press.

10. The support frame of claim 9 wherein the strut end piece having strut end fins having a tongue ratio.

11. The support frame of claim 10 wherein at least a first strut and a second strut of the plurality of struts are hollow.

12. The support frame of claim 11 wherein the first segmented chord is hollow and has a central axis, and the second segmented chord is hollow and has a central axis.

13. The support frame of claim 12 wherein the one node has a central axis and attaches at least the first and the second of the struts through their strut end pieces and the first segmented chord and the second segmented chord together so the central axis of the first and second segmented chords in the one node align.

14. The support frame of claim 13 wherein the node fins of the one node form planes that intersect essentially at or about the central axis of the one node.

15. The support frame of claim 14 wherein the struts, nodes and first and second segmented chords form a space trust frame.

* * * * *